(12) United States Patent
Wiltjer et al.

(10) Patent No.: US 9,864,158 B2
(45) Date of Patent: Jan. 9, 2018

(54) HIGH DENSITY FIBER ENCLOSURE AND METHOD

(71) Applicant: Panduit Corp., Tinley Park, IL (US)

(72) Inventors: Jerry A. Wiltjer, Frankfort, IL (US);
Shaun P. Brouwer, St. John, IN (US);
Gregory L. Kuffel, Plainfield, IL (US);
Joel D. Kwasny, Plainfield, IL (US);
Kai C. Lui, Des Plaines, IL (US);
Benjamin S. Novak, Lansing, IL (US);
Joseph E. Sanders, Elwood, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/188,432

(22) Filed: Jun. 21, 2016

(65) Prior Publication Data

US 2016/0299308 A1    Oct. 13, 2016

Related U.S. Application Data

(63) Continuation of application No. 14/848,757, filed on Sep. 9, 2015, now Pat. No. 9,690,065, which is a continuation of application No. 62/049,442, filed on Sep. 12, 2014.

(51) Int. Cl.
*G02B 6/44* (2006.01)

(52) U.S. Cl.
CPC ......... *G02B 6/4453* (2013.01); *G02B 6/4452* (2013.01); *G02B 6/4455* (2013.01)

(58) Field of Classification Search
CPC ... G02B 6/4453; G02B 6/4455; G02B 6/4452
See application file for complete search history.

(56) References Cited

U.S. PATENT DOCUMENTS

| | | |
|---|---|---|
| 2,056,219 A | 10/1936 | Stout et al. |
| 2,550,339 A | 4/1951 | Ehrman |
| 3,392,543 A | 7/1968 | Miller |

(Continued)

FOREIGN PATENT DOCUMENTS

| | | |
|---|---|---|
| CN | 103004041 A | 3/2013 |
| EP | 2159613 A2 | 8/2009 |

(Continued)

OTHER PUBLICATIONS

Belden® Infrastructure Solutions Catalog, cover page; p. 21; and back page, 2013 (3 pgs.).

(Continued)

*Primary Examiner* — Ryan Lepisto
(74) *Attorney, Agent, or Firm* — Christopher S. Clancy; James H. Williams; Aimee E. McVady

(57) ABSTRACT

A high density fiber enclosure system includes a chassis, cassette trays, an optional unification clip, cassettes, and an optional trunk cable management system. The chassis, cassette trays, and cassettes are configured such that individual cassettes may be installed, removed, and otherwise positioned for easy access by a user. The unification clip allows two adjacent cassette trays to be connected to one other such that cassette trays move as one unit. The trunk cable management system is designed to organize trunk cables and trunk cable furcation legs as well as relieve strain on the trunk cables and trunk cable furcation legs.

6 Claims, 52 Drawing Sheets

(56) References Cited

U.S. PATENT DOCUMENTS

| | | |
|---|---|---|
| 3,478,535 A | 11/1969 | Perez et al. |
| 4,034,572 A | 7/1977 | Morris et al. |
| 4,266,853 A | 5/1981 | Hutchings et al. |
| 4,585,303 A | 4/1986 | Pinsard et al. |
| 4,655,521 A | 4/1987 | Thomas |
| 4,792,203 A | 12/1988 | Nelson et al. |
| 4,824,196 A | 4/1989 | Bylander |
| 4,846,565 A | 7/1989 | Swanson et al. |
| 4,986,762 A | 1/1991 | Keith |
| 5,046,811 A | 9/1991 | Jung et al. |
| 5,129,030 A | 7/1992 | Petrunia |
| 5,142,606 A | 8/1992 | Carney et al. |
| 5,167,001 A | 11/1992 | Debortoli et al. |
| 5,212,761 A | 5/1993 | Petrunia |
| 5,325,455 A | 6/1994 | Henson et al. |
| 5,339,379 A | 8/1994 | Kutsch et al. |
| 5,370,541 A | 12/1994 | Bossard |
| 5,442,726 A | 8/1995 | Howard et al. |
| 5,448,670 A | 9/1995 | Blew et al. |
| 5,490,229 A | 2/1996 | Ghandeharizadeh et al. |
| 5,497,444 A | 3/1996 | Wheeler |
| 5,511,144 A | 4/1996 | Hawkins et al. |
| 5,647,043 A | 7/1997 | Anderson et al. |
| 5,717,810 A | 2/1998 | Wheeler |
| 5,758,003 A | 5/1998 | Wheeler et al. |
| 5,804,765 A | 9/1998 | Siemon et al. |
| 5,836,786 A | 11/1998 | Pepe |
| 5,902,155 A | 5/1999 | Polgar et al. |
| 5,946,440 A | 8/1999 | Puetz |
| 5,978,540 A | 11/1999 | Bechamps et al. |
| 6,017,238 A | 1/2000 | Johnston |
| 6,080,011 A | 6/2000 | Tsao et al. |
| 6,085,003 A | 7/2000 | Knight |
| 6,086,415 A | 7/2000 | Sanchez et al. |
| 6,095,852 A | 8/2000 | Gregory, II |
| 6,109,978 A | 8/2000 | Stellman et al. |
| 6,167,183 A | 12/2000 | Swain |
| 6,203,130 B1 | 3/2001 | Montgelas et al. |
| 6,210,216 B1 | 4/2001 | Tso-Chin et al. |
| 6,356,697 B1 | 3/2002 | Braga et al. |
| 6,396,992 B1 | 5/2002 | Debal |
| 6,591,051 B2 | 7/2003 | Solheid et al. |
| 6,768,860 B2 | 7/2004 | Liberty |
| 6,769,551 B2 | 8/2004 | Rafferty et al. |
| 6,771,861 B2 | 8/2004 | Wagner et al. |
| 6,788,846 B2 | 9/2004 | Hileman et al. |
| 6,920,274 B2 | 7/2005 | Rapp et al. |
| 6,944,389 B2 | 9/2005 | Giraud et al. |
| 6,946,600 B1 | 9/2005 | Stoller et al. |
| 6,974,348 B2 | 12/2005 | Bentley |
| 7,031,588 B2 | 4/2006 | Cowley et al. |
| 7,087,840 B2 | 8/2006 | Herring et al. |
| 7,113,687 B2 | 9/2006 | Womack et al. |
| 7,147,383 B2 | 12/2006 | Sullivan |
| 7,200,314 B2 | 4/2007 | Womack et al. |
| 7,200,316 B2 | 4/2007 | Giraud et al. |
| 7,318,321 B2 | 1/2008 | Grassmuck et al. |
| 7,320,507 B2 | 1/2008 | White et al. |
| 7,330,629 B2 | 2/2008 | Cooke et al. |
| 7,376,321 B2 | 5/2008 | Bolster et al. |
| RE40,375 E | 6/2008 | Abel et al. |
| 7,416,347 B2 | 8/2008 | Livingston et al. |
| 7,418,182 B2 | 8/2008 | Krampotich |
| 7,509,015 B2 | 3/2009 | Murano |
| 7,529,458 B2 | 5/2009 | Spisany et al. |
| 7,532,799 B2 | 5/2009 | Gronvall et al. |
| 7,570,861 B2 | 8/2009 | Smrha et al. |
| 7,628,644 B1 | 12/2009 | Peluffo et al. |
| 7,672,561 B1 | 3/2010 | Keith et al. |
| 7,682,187 B2 | 3/2010 | Spitaels et al. |
| 7,686,518 B2 | 3/2010 | Case et al. |
| 7,689,089 B2 | 3/2010 | Wagner et al. |
| 7,722,411 B2 | 5/2010 | Merrow et al. |
| 7,729,586 B2 | 6/2010 | Keith |
| 7,744,176 B2 | 6/2010 | Milligan |
| 7,756,378 B2 | 7/2010 | Ruiz |
| 7,756,380 B2 | 7/2010 | Ruiz et al. |
| 7,760,983 B2 | 7/2010 | Jadaud |
| 7,826,705 B2 | 11/2010 | McGranahan et al. |
| D628,462 S | 12/2010 | Sato |
| 7,854,333 B2 | 12/2010 | Kottke et al. |
| 7,856,166 B2 | 12/2010 | Biribuze et al. |
| 7,876,995 B2 | 1/2011 | Keith et al. |
| 7,887,244 B2 | 2/2011 | Milette et al. |
| 7,889,961 B2 | 2/2011 | Cote et al. |
| 7,903,925 B2 | 3/2011 | Cooke et al. |
| 7,945,135 B2 | 5/2011 | Cooke et al. |
| 7,945,136 B2 | 5/2011 | Cooke et al. |
| 7,962,000 B2 | 6/2011 | Wagner et al. |
| 7,974,105 B2 | 7/2011 | Dean, Jr. et al. |
| 7,979,985 B2 | 7/2011 | Spitaels et al. |
| 8,014,646 B2 | 9/2011 | Keith et al. |
| 8,038,015 B2 | 10/2011 | Laursen et al. |
| 8,038,354 B2 | 10/2011 | Nielson et al. |
| 8,061,534 B2 | 11/2011 | Laursen et al. |
| 8,075,198 B2 | 12/2011 | Milette et al. |
| 8,075,344 B2 | 12/2011 | Shih |
| 8,121,458 B2 | 2/2012 | Barth et al. |
| 8,135,257 B2 | 3/2012 | Cooke et al. |
| 8,154,886 B2 | 4/2012 | Hendrix et al. |
| 8,179,684 B2 | 5/2012 | Smrha et al. |
| 8,184,938 B2 | 5/2012 | Cooke et al. |
| 8,203,450 B2 | 6/2012 | German et al. |
| 8,254,742 B2 | 8/2012 | Womack |
| 8,280,216 B2 | 10/2012 | Cooke et al. |
| 8,285,104 B2 | 10/2012 | Davis et al. |
| 8,290,332 B2 | 10/2012 | Mudd |
| 8,290,333 B2 | 10/2012 | Barlowe et al. |
| 8,297,854 B2 | 10/2012 | Bickham et al. |
| 8,301,004 B2 | 10/2012 | Cooke et al. |
| 8,326,107 B2 | 12/2012 | Cooke et al. |
| 8,331,752 B2 | 12/2012 | Biribuze et al. |
| 8,403,599 B2 | 3/2013 | Hawkins et al. |
| 8,411,465 B2 | 4/2013 | Dean, Jr. et al. |
| 8,418,974 B2 | 4/2013 | Felcman et al. |
| 8,433,171 B2 | 4/2013 | Cooke et al. |
| 8,437,147 B2 | 5/2013 | Dean, Jr. et al. |
| 8,437,597 B2 | 5/2013 | Cooke et al. |
| 8,452,148 B2 | 5/2013 | Cooke et al. |
| 8,452,149 B2 | 5/2013 | Krampotich et al. |
| 8,472,776 B2 | 6/2013 | Ruiz |
| 8,520,996 B2 | 8/2013 | Cowen et al. |
| 8,538,226 B2 | 9/2013 | Makrides-Saravanos et al. |
| 8,559,783 B2 | 10/2013 | Campos et al. |
| 8,565,572 B2 | 10/2013 | Krampotich et al. |
| 8,625,950 B2 | 1/2014 | Beamon et al. |
| 8,625,951 B2 | 1/2014 | Pimentel et al. |
| 8,705,926 B2 | 4/2014 | Giraud et al. |
| 8,712,206 B2 | 4/2014 | Cooke et al. |
| 8,746,466 B2 | 6/2014 | Taylor |
| 8,867,883 B2 | 10/2014 | Crain et al. |
| 8,879,881 B2 | 11/2014 | Cote et al. |
| 8,938,147 B2 | 1/2015 | Krampotich et al. |
| 8,953,924 B2 | 2/2015 | Cote et al. |
| 8,965,168 B2 | 2/2015 | Cowen et al. |
| 8,992,099 B2 | 3/2015 | Blackwell, Jr. et al. |
| 9,008,485 B2 | 4/2015 | Ramirez et al. |
| 9,020,320 B2 | 4/2015 | Cooke et al. |
| 9,075,216 B2 | 7/2015 | Cote et al. |
| 9,075,217 B2 | 7/2015 | Giraud et al. |
| 9,116,324 B2 | 8/2015 | Cooke et al. |
| 9,140,870 B2 | 9/2015 | Marmon et al. |
| 9,170,392 B2 | 10/2015 | Krampotich et al. |
| 9,213,161 B2 | 12/2015 | Cote et al. |
| 9,279,951 B2 | 3/2016 | McGranahan et al. |
| 2009/0245743 A1 | 10/2009 | Cote et al. |
| 2010/0051886 A1 | 3/2010 | Cooke et al. |
| 2010/0052346 A1 | 3/2010 | Cooke et al. |
| 2010/0054684 A1 | 3/2010 | Cooke et al. |
| 2010/0296791 A1 | 11/2010 | Makrides-Saravanos et al. |
| 2010/0310225 A1* | 12/2010 | Anderson ............ G02B 6/4455 385/135 |
| 2010/0316334 A1 | 12/2010 | Kewitsch |
| 2010/0322581 A1 | 12/2010 | Cooke et al. |

(56) References Cited

U.S. PATENT DOCUMENTS

| | | |
|---|---|---|
| 2010/0322582 A1 | 12/2010 | Cooke et al. |
| 2010/0322583 A1 | 12/2010 | Cooke et al. |
| 2011/0268405 A1 | 11/2011 | Cote et al. |
| 2011/0268406 A1 | 11/2011 | Giraud et al. |
| 2011/0268408 A1 | 11/2011 | Giraud et al. |
| 2011/0268410 A1 | 11/2011 | Giraud et al. |
| 2011/0268411 A1 | 11/2011 | Giraud et al. |
| 2011/0274402 A1 | 11/2011 | Giraud et al. |
| 2012/0114295 A1 | 5/2012 | Guzzo et al. |
| 2013/0011105 A1 | 1/2013 | Barlowe et al. |
| 2013/0028567 A1 | 1/2013 | Parikh et al. |
| 2013/0121657 A1 | 5/2013 | Seo et al. |
| 2013/0148935 A1 | 6/2013 | Cooke et al. |
| 2013/0214662 A1 | 8/2013 | Pimentel et al. |
| 2013/0251319 A1 | 9/2013 | Compton et al. |
| 2013/0251326 A1 | 9/2013 | Cooke et al. |
| 2013/0287357 A1 | 10/2013 | Solheid et al. |
| 2014/0010511 A1 | 1/2014 | Smrha et al. |
| 2014/0079365 A1 | 3/2014 | Hill et al. |
| 2016/0033732 A1 | 2/2016 | Giraud et al. |
| 2016/0062050 A1 | 3/2016 | Giraud et al. |
| 2016/0062055 A1 | 3/2016 | Giraud et al. |
| 2016/0062058 A1 | 3/2016 | Dagley et al. |
| 2016/0062068 A1 | 3/2016 | Giraud et al. |

FOREIGN PATENT DOCUMENTS

| | | |
|---|---|---|
| EP | 2544035 A1 | 1/2013 |
| JP | 2002124790 A | 4/2002 |
| WO | 9942881 A1 | 8/1999 |

OTHER PUBLICATIONS

Hallam Manufacturing Cable Zone Patch Frames, undated (1 pg.).

Leviton® Nertwork Solutions Patch Panel Selection Guide, cover page; p. 12; and back page, undated (3 pgs.).

Siemon™ VersaPOD Zero-U Sliding Vertical Patch Panels (3 pgs)., Jun. 27, 2016.

Teleconnectivity Zero RU Quick-Fit Bracket, cover page; p. 2; and back page (3 pgs.), 2013.

Pretium Edge® Advanced Optical (AO) Solutions Features and Benefits; Corning Cable Systems LLC; 1 page; May 2013.

Pretium Edge® AO Solutions The Next Evolution of Your Data Center Revolution; Coming Cable System, LLC; 8 pages; May 2013.

Dell™ Poweredge™ 1950 Server; Dell, Inc.; 2 pages; Nov. 2006.

Dell™ Best Practices Guide for Rack Enclosures PE2440 & PE4220; Dell, Inc.; 17 pages; 2009.

Service Description: PowerEdge™ Basic Server Installation with Rack Mounting; Dell, Inc.; 2 pages; 2008.

Dell™ PowerEdge™ 1950 III Server; Dell, Inc.; 2 pages; Jun. 2008.

Service Description: Installation of a Dell Server, Storage or Peripheral Device; Dell, Inc.; 11 pages; Aug. 5, 2013.

Server Administrator Version 7.2 Installation Guide; Dell, Inc.; 106 pages; Jan. 2013.

WorkForce® Pro WP-4530 Instructions; Epson American, Inc.; 4 pages; Aug. 2011.

Hubbell OptiChannel High Density 144 Port 1U Fiber Enclosure; Hubbell Premise Wiring; 2 pages; Jan. 2012.

Hubbell OptiChannel Ultra Compact Fiber LC to MPO Cassette Modules; Hubbell Premise Wiring; 2 pages; Oct. 2010.

Pretium EDGE® HD Solutions for Enterprise Data Centers and Storage Area Networks; Coming Cable Systems, LLC; 20 pages; Nov. 2012.

RapidNet™ Pre-Terminated Network Cabling Systems LITPD203 Rev. 2; HellermannTyton; 8 pages; Apr. 2005.

Value-Added Module (VAM) System Monitor, Splitter, WDM, CWDM and DWDM Modules 6th Edition; TE Connectivity; 32 pages; Aug. 2014.

Mini VAM Connector Cleaning Instructions ADCP-90-412, Issue 3; ADC Telecommunications, Inc.; 8 pages; Sep. 2002.

Express Fiber Management® (XFM) MPO Optical Cassettes; AFL; 2 pages; 2003.

Fiber Optic Cassette Module 12 Fiber, MTP to 6-SC and 6-LC Configuration Customer Drawing; Panduit™ Corp.; 1 page; Oct. 26, 2004.

MTP® Brand Bulkhead Adapters; US Conec; 2 pages; 2010.

QuickNet™ SFQ Series MTP Fiber Optic Cassettes Specification Sheet; Panduit Corp.; 2 pages; Jan. 2009.

High Density SFQ Small Form Factor QuickNet™ Fiber Cable Assemblies Product Bulletin; Panduit Corp.; 2 pages; Feb. 2011.

Development of Mini-MPO Connector; Naoko Shimoji, Jun Yamakawa and Masato Shiino; 5 pages; Jun. 29, 1998.

Opticom™ Fiber Optic Rack Mount Enclosure CM274 Installation Instructions; Panuit Corp.; 2 pages; 2002.

Evolution of Cabling Standards (Q&A); NORDX/CDT; 8 pages; Feb. 2002.

Opticom QuickNet Rack Mount Fiber Cassette Enclosures Installation Instructions FS006; Panduit Corp.; 11 pages; 2008.

Introducing the NG4access ODF platform—the next-generation optical distribution frame that increases density while reducing cost and installation time in the network; TE Connectivity; 4 pages; Aug. 2012.

Pretium Edge® Extension and Flush Mount Bracket for Edge-01U; Corning Cable Systems, LLC; 2 pages; Dec. 10, 2013.

Fiber Enclosures; Hubbell Premise Wiring; 10 pages; http://ecatalog.hubbell-premise.com/ProductInformation/ViewCatalog.aspx?Dest=hubbell-premise.com/literature/ecatalog/i.pdf; printed Sep. 25, 2015.

OptiMo® Ultra High Density Pre-terminated Fiber Optic Solutions; Legrand® Ortronics; 1 page; undated.

* cited by examiner

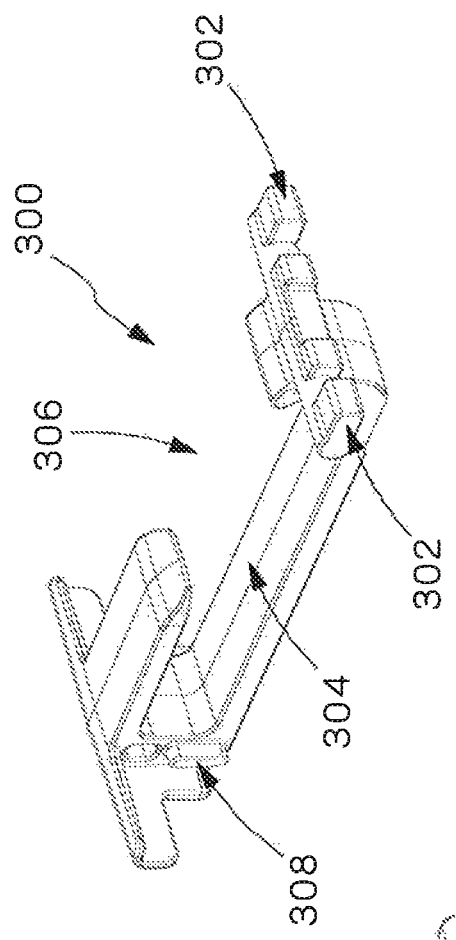
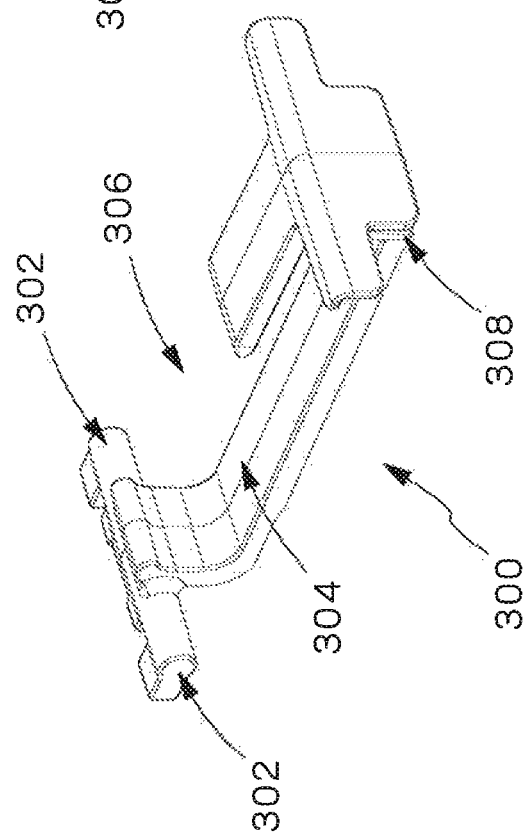
FIG. 12
FIG. 11

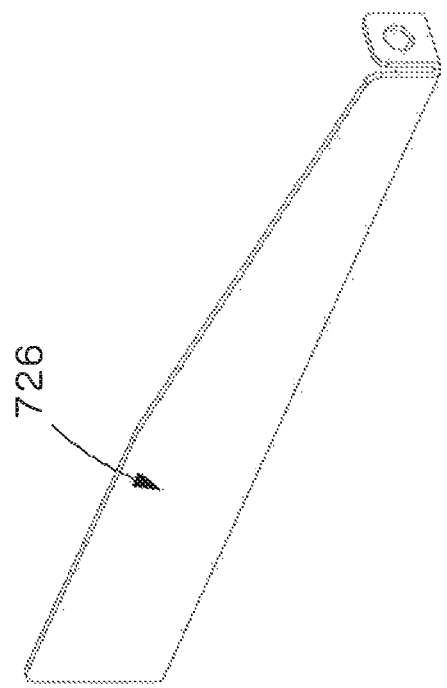
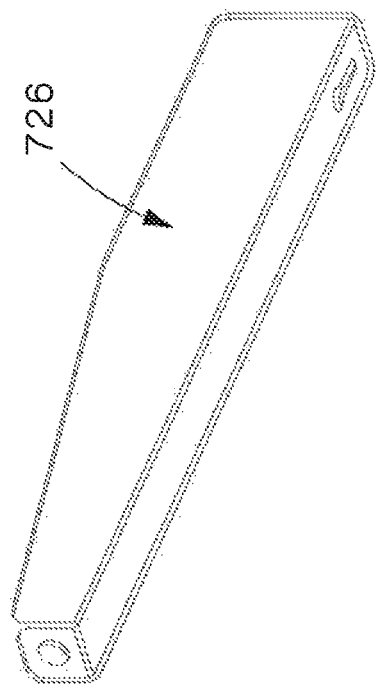
FIG.21B
FIG.21A

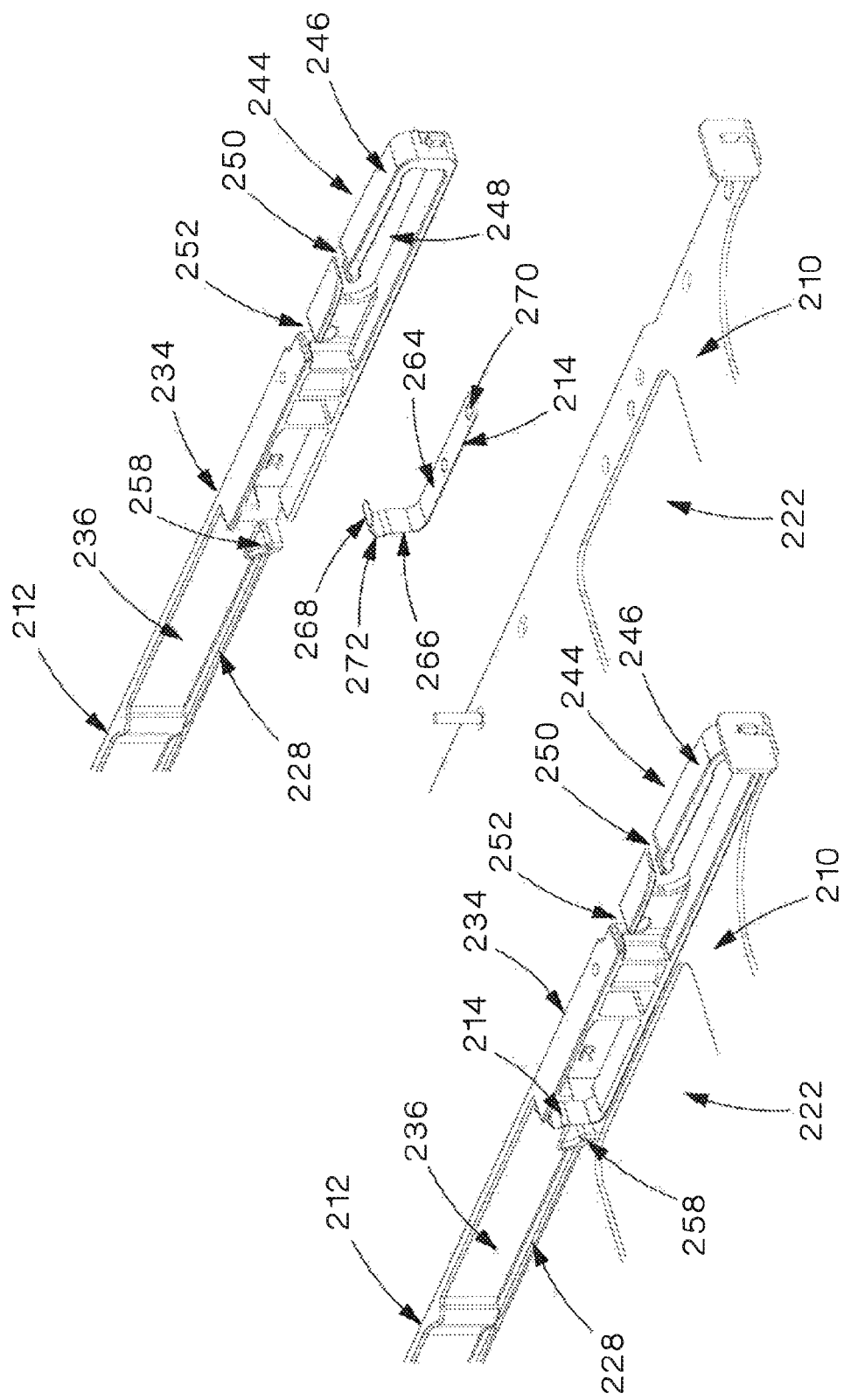

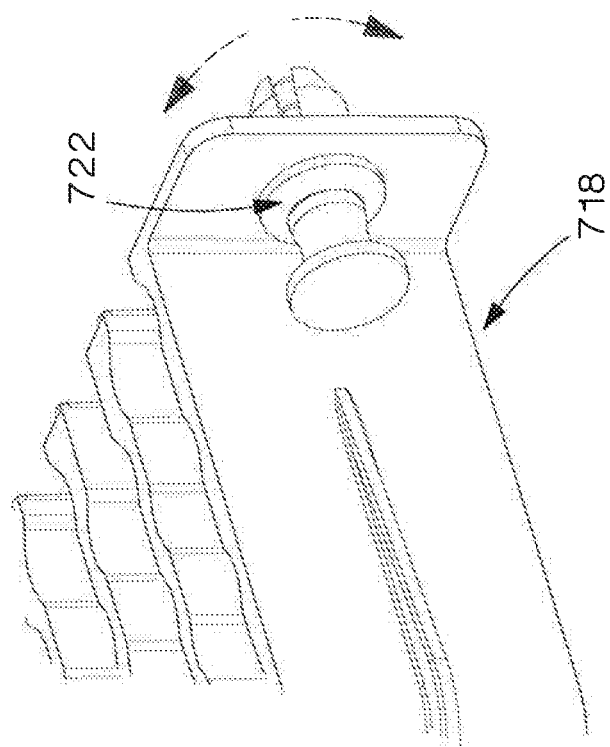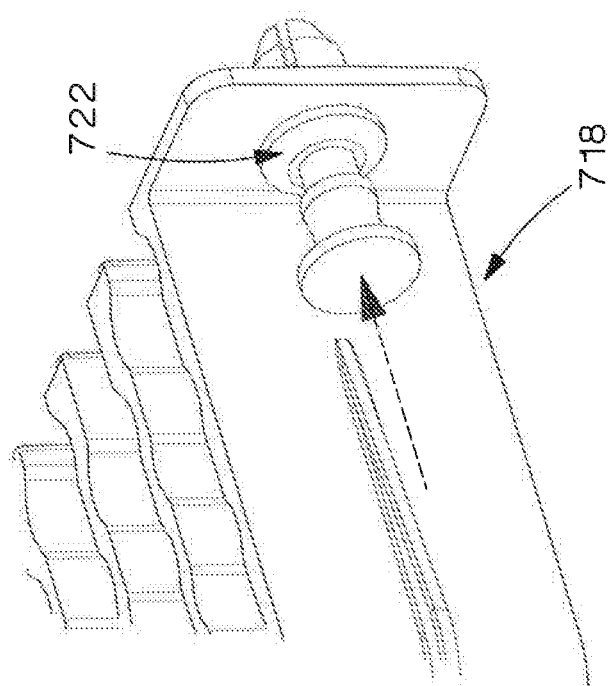

HIGH DENSITY FIBER ENCLOSURE AND METHOD

CROSS-REFERENCE TO RELATED APPLICATIONS

This application is a continuation of U.S. patent application Ser. No. 14/848,757, filed Sep. 9, 2015, which claims the benefit of U.S. Provisional Application Ser. No. 62/049,442, filed Sep. 12, 2014, the subject matter of which is incorporated by reference in its entirety.

BACKGROUND OF THE INVENTION

This invention relates to data center management, and in particular high speed data transport fiber cabling systems. Optical fibers allow for transmission of communications over longer distances and at higher bandwidths than wire cables. Optical fibers are also advantageous for communication systems because signals suffer less loss than wire cables and are immune to electromagnetic interference. Optical fibers are therefore often used for high bandwidth, long distance applications. One of the primary functions of a data center is to provide connections between incoming and outgoing optical fiber connections.

As demand for high bandwidth increases, it is advantageous to use smaller and/or higher capacity adapters to minimize the amount of data center rack space needed per optical fiber port. Due to this, many users of data centers are transitioning to smaller Local Connector adapters ("LC adapters") or Multi-fiber Push-on/Pull-off adapters ("MPO adapters"). Thus, a rack or enclosure which maximizes the number of LC or MPO adapters may be advantageous. Additionally, it may be advantageous if a rack or enclosure allowed for replacing LC adapters with MPO adapters which provide multi-fiber capabilities.

From time to time, maintenance or replacement of the adapters in an optical fiber system becomes necessary. However, disturbing the connection between optical fibers may cause a disruption in service over the optical wire. Therefore, it may also be advantageous to use a rack or enclosure system which disturbs a minimal number of optical fiber connections during maintenance on other adapters.

SUMMARY OF THE INVENTION

The present invention provides an enclosure to maximize the number of connections available per rack space as well as provide for easy, non-disruptive maintenance or replacement of installed optical fiber cables.

BRIEF DESCRIPTION OF THE DRAWINGS

FIG. 11 is an isometric view of the unification clip from the front in accordance with an embodiment of the present invention.

FIG. 12 is an isometric view of the unification clip from behind in accordance with an embodiment of the present invention.

FIGS. 21A and 21B are isometric views of a slack management plate divider.

FIG. 35A is an isometric view of the cassette flex beam and portion of the cassette tray rail.

FIG. 35B is a partially exploded isometric view of the cassette flex beam and cassette tray rail of FIG. 35A.

FIGS. 54A and 54B are close-up views of a portion of a transition bundling clip and a bundling clip fastener.

DETAILED DESCRIPTION OF THE INVENTION

Figure 1:
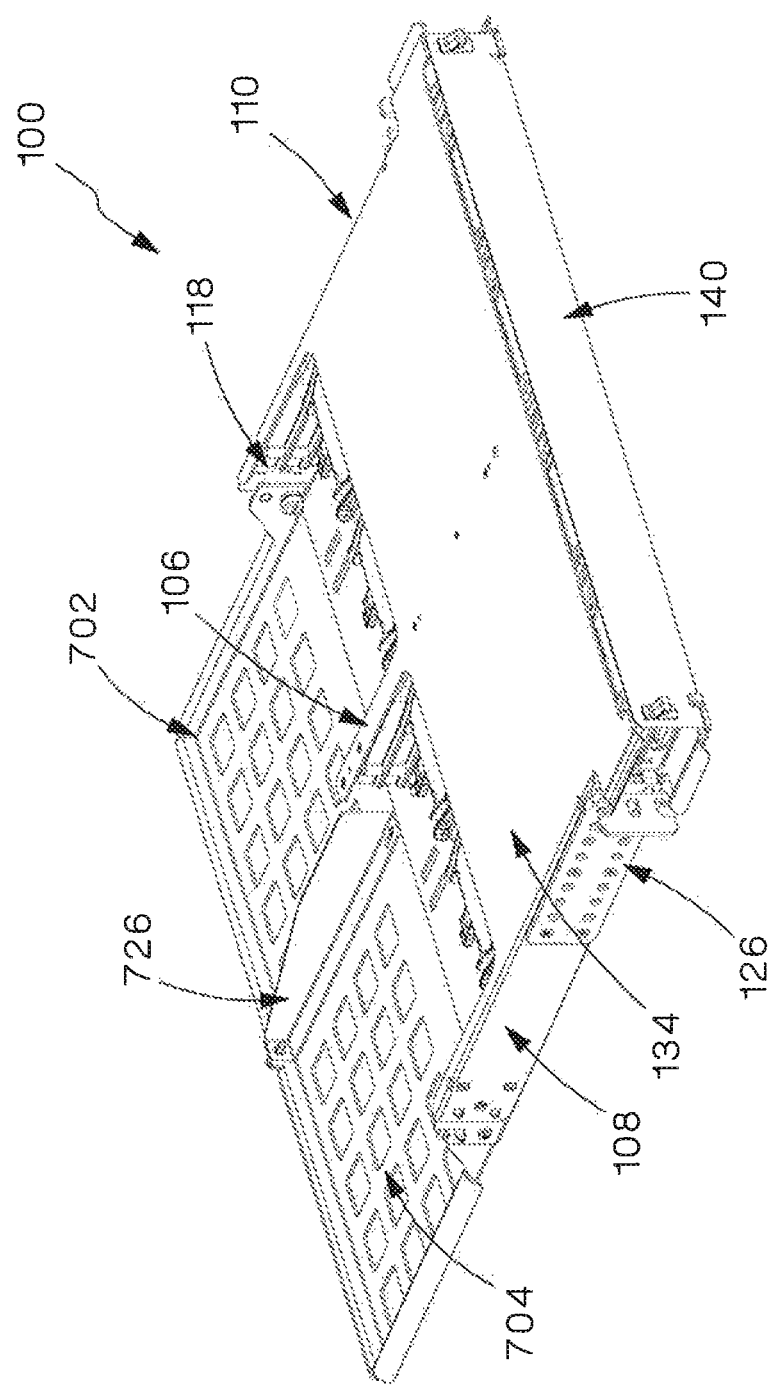
FIG. 1 is an isometric view of the chassis with the front access door closed in accordance with an embodiment of the present invention.

The high density fiber enclosure system 2 consists of chassis 100, cassette trays 200, cassette 400, removable unification clip 300, and removable trunk cable management system 700. The enclosure system 2 may be made up of several chassis 100 stacked upon each other.

Figure 2:
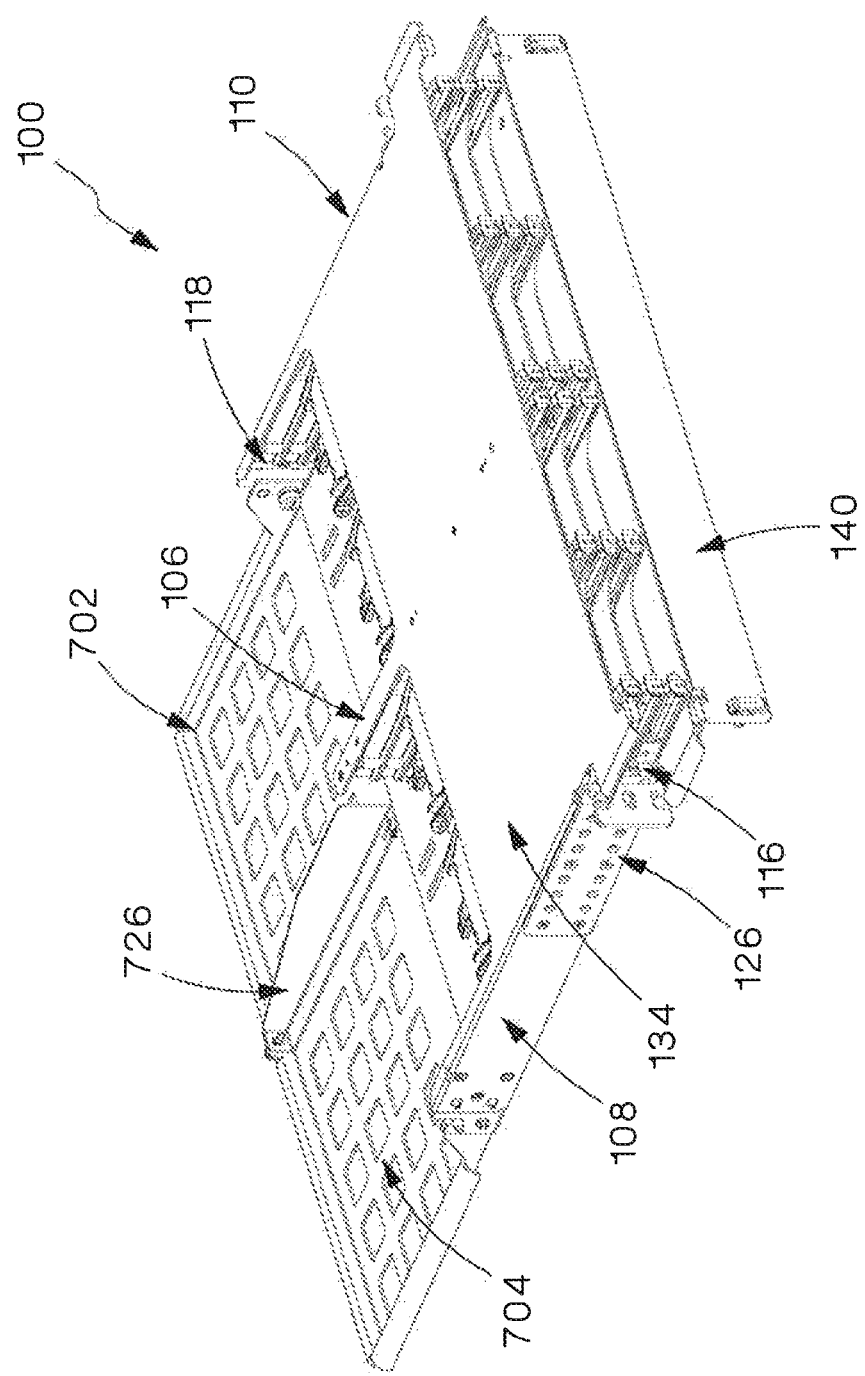
FIG. 2 is an isometric view of the chassis with the front access door open in accordance with an embodiment of the present invention.
Figure 3:
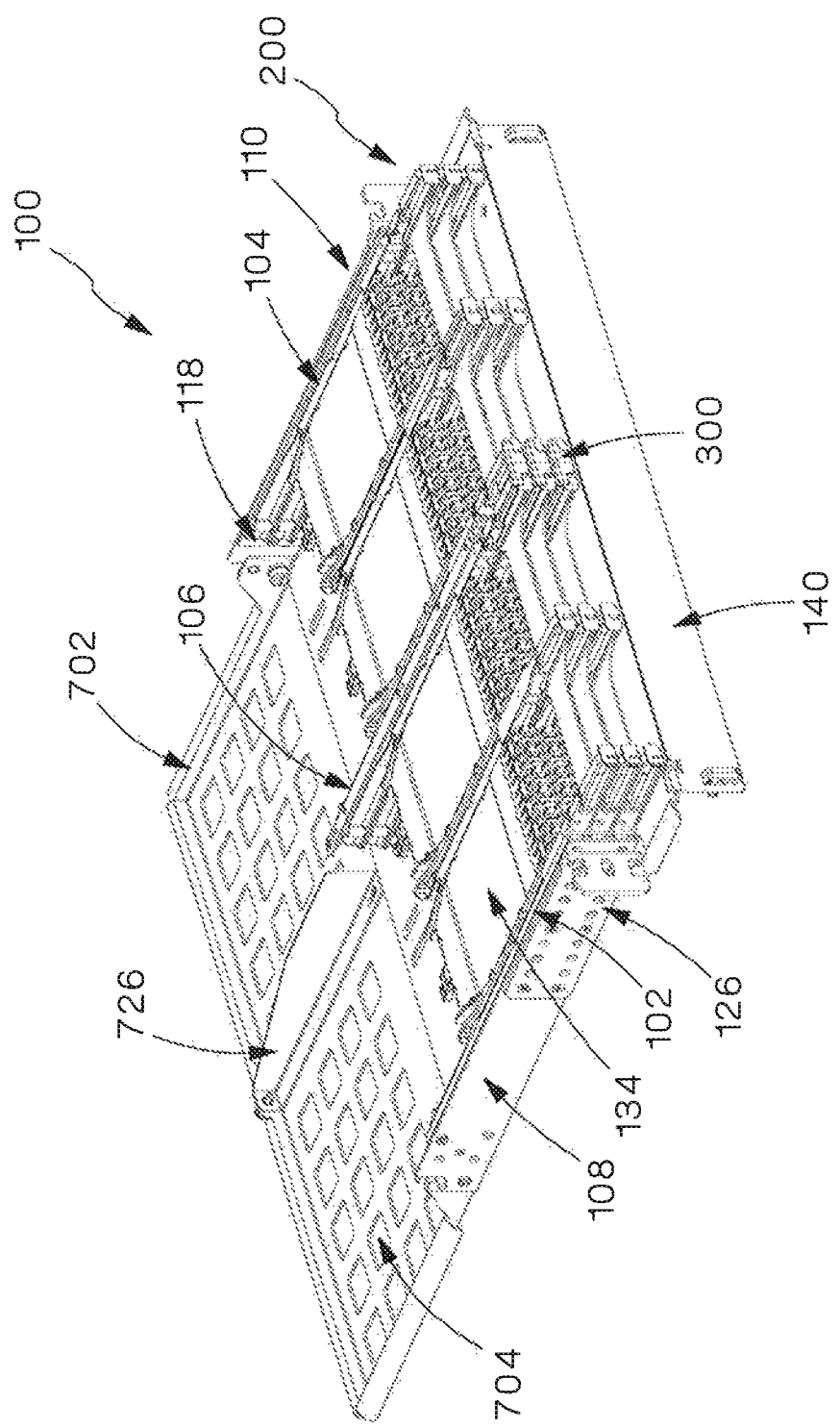
FIG. 3 is an isometric view of the chassis with the front door open and chassis cover removed in accordance with an embodiment of the present invention.

FIG. 1 illustrates the outside of chassis 100 with the front access door 140 closed. FIG. 2 illustrates the chassis 100 with the front access door 140 open. FIG. 3 illustrates the chassis 100 with the chassis cover 134 removed. FIGS. 1, 2, and 3 also illustrate a slack management plate 702 which is mounted to the chassis 100. As shown in FIGS. 2, 3, 4, and 5 the chassis 100 may include multiple sliding cassette trays 200. In the embodiment shown, there are two cassette trays 200 positioned adjacent to each other in the same row. Further, in the embodiment shown, there are three rows of cassette trays 200. Each cassette tray 200 may hold up to two cassettes 400, such that up to a total of six cassette trays 200 and twelve cassettes 400 may be installed in one chassis 100. Other embodiments are contemplated that may include more or less cassette trays 200 in the same row, and more or less rows of cassette trays within the chassis.

Figure 4:
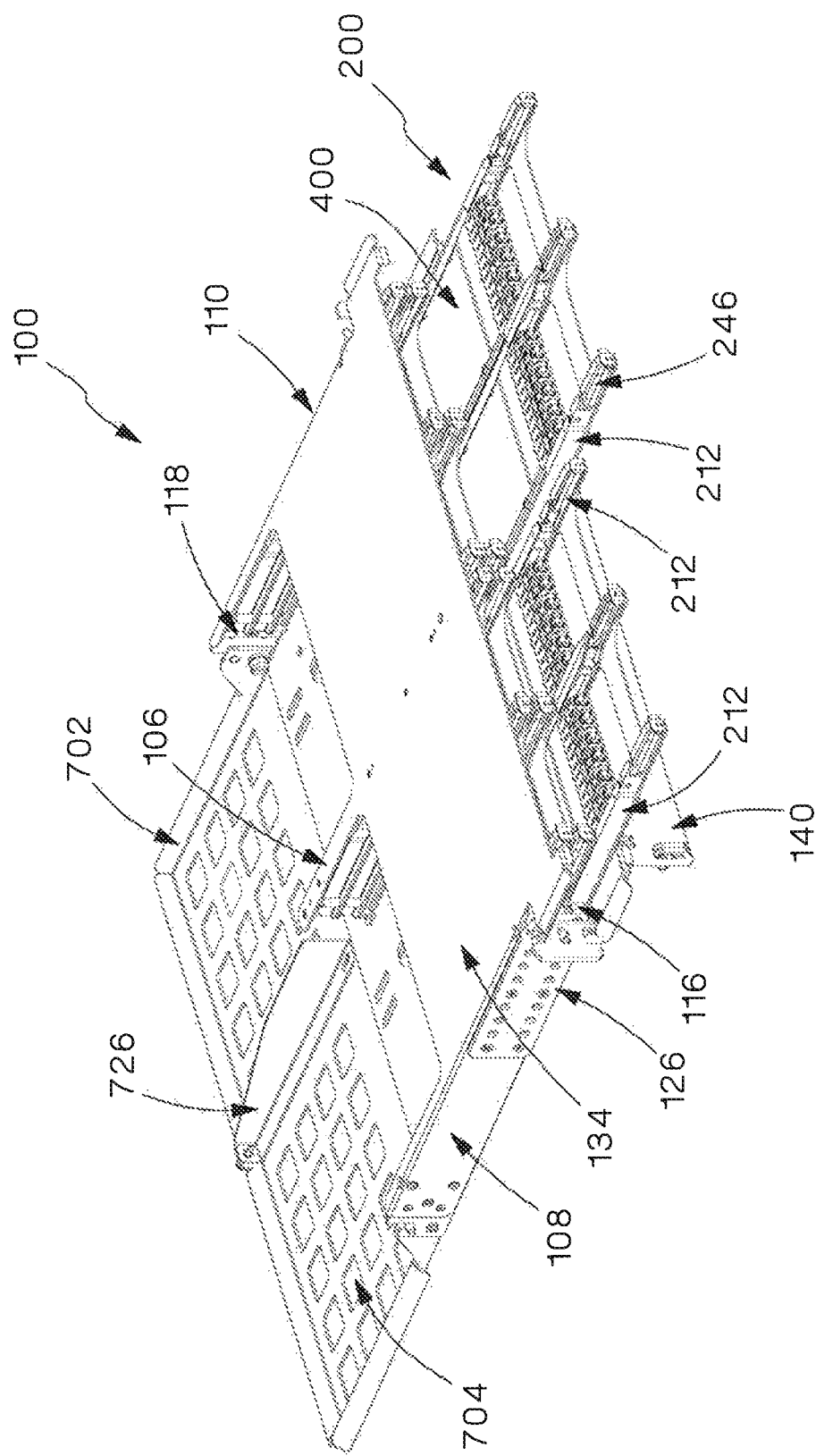
FIG. 4 is an isometric view of the chassis with the front door open and cassette trays located in the cord move or change position and cassette replacement or addition position.
Figure 5:
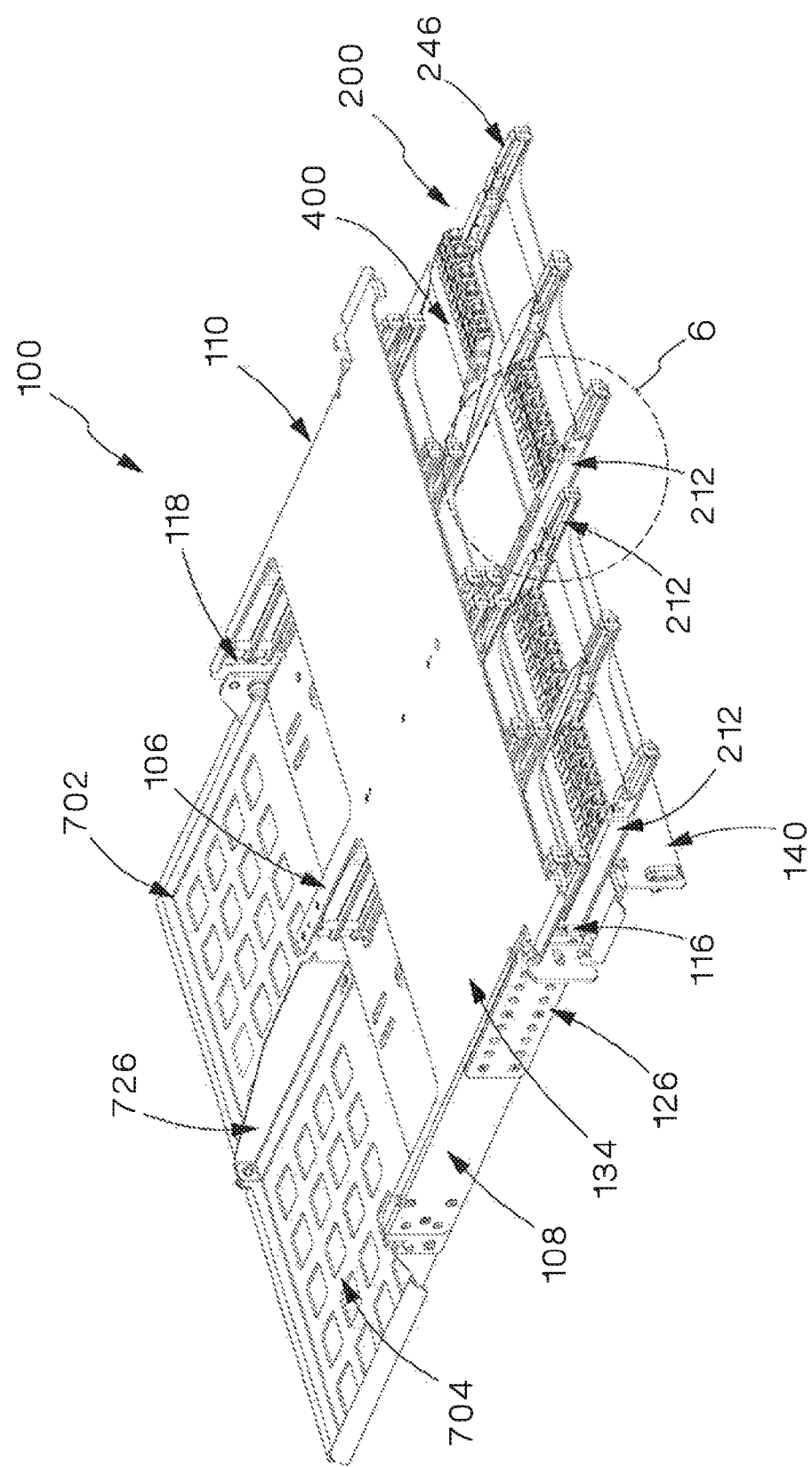
FIG. 5 is an isometric view of the chassis of FIG. 4 with one cassette partially removed from the front of the chassis.
Figure 6:
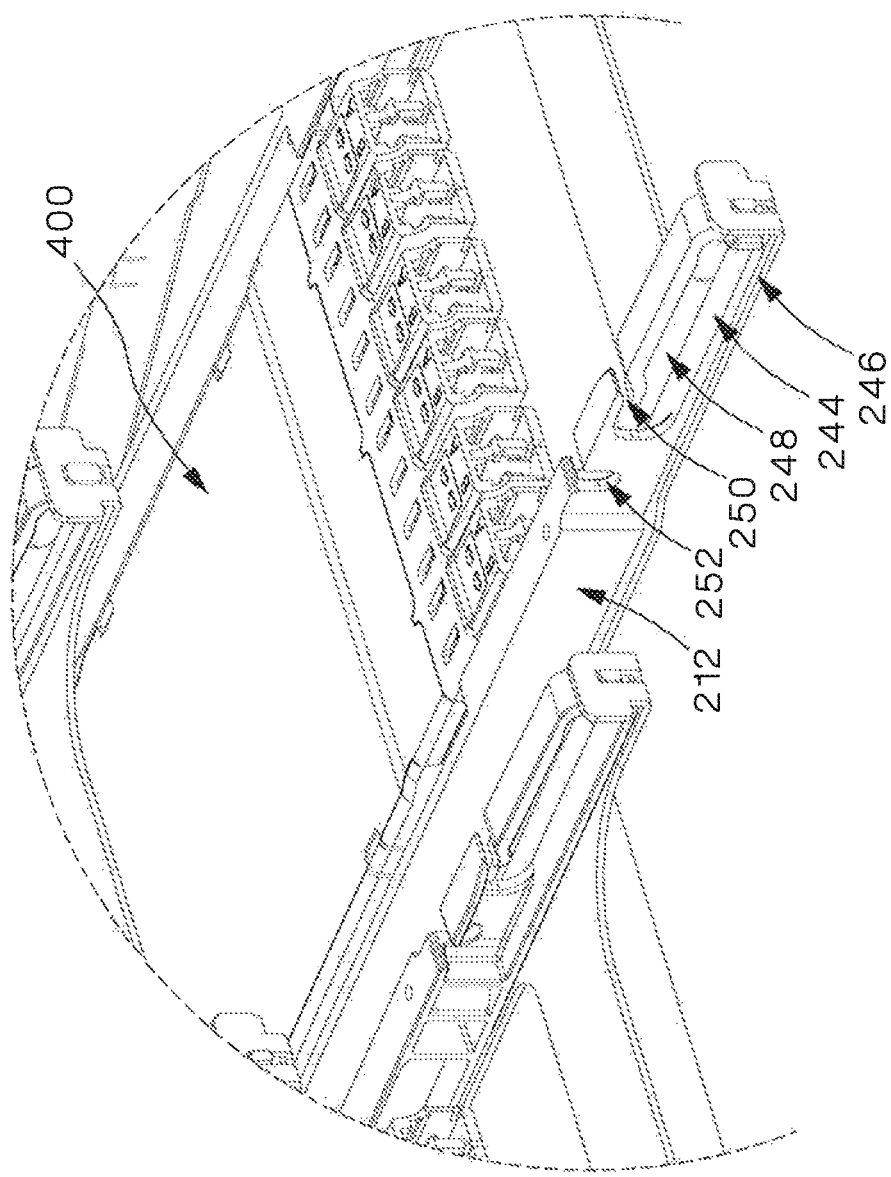
FIG. 6 is a close-up view of the front portion of the cassette tray rails as indicated in FIG. 5.
Figure 7:
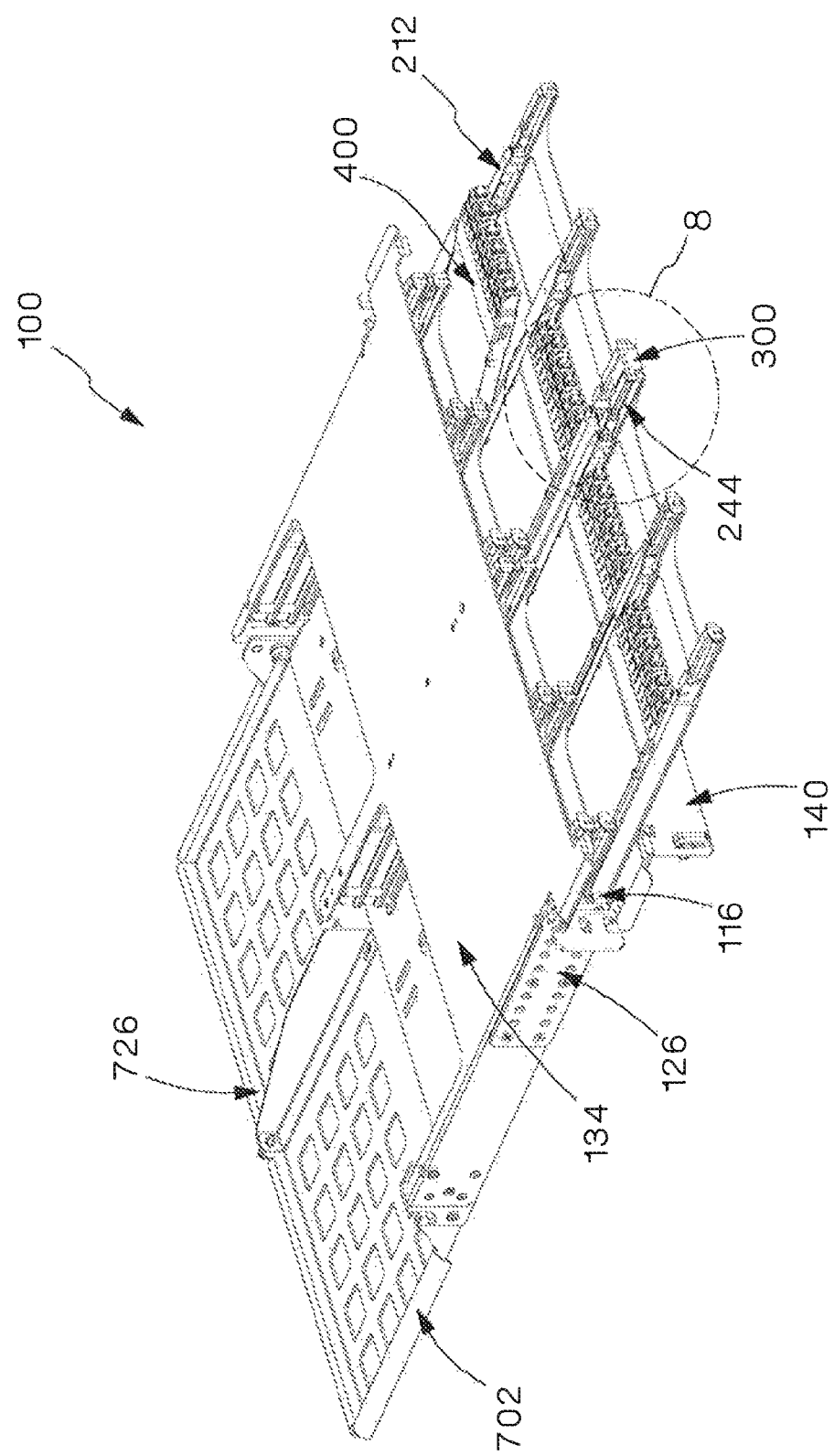
FIG. 7 is an isometric view of the chassis with a unification clip installed.
Figure 8:
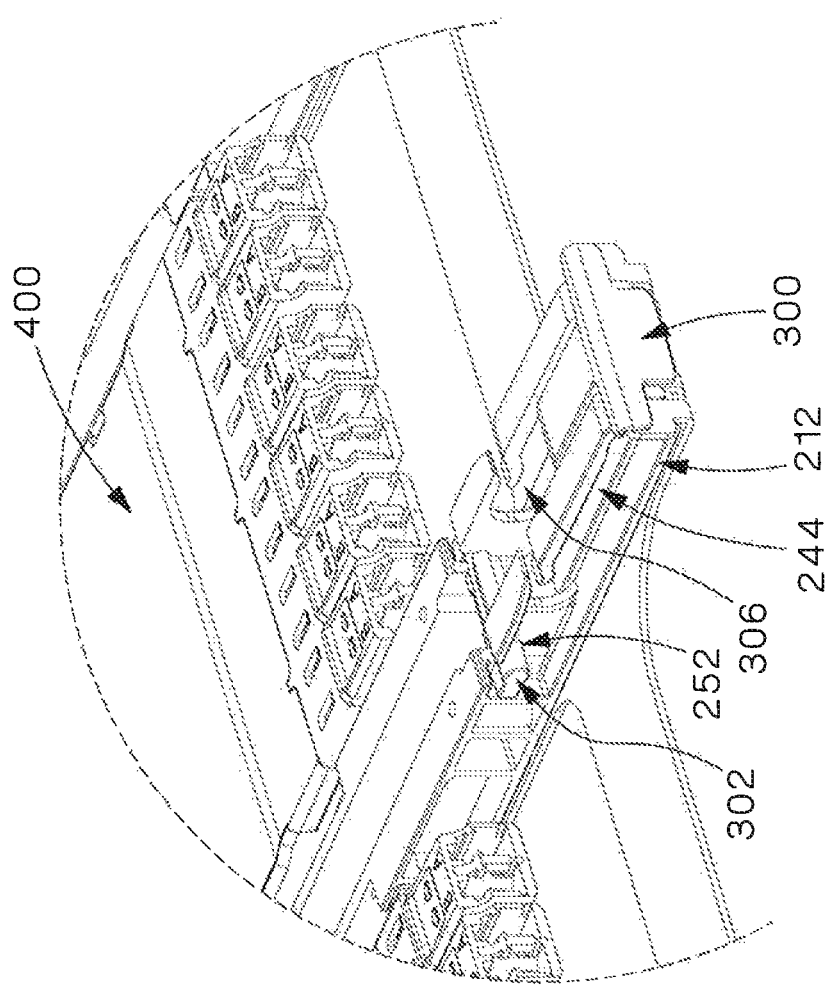
FIG. 8 is a close-up view of an installed unification clip and cassette tray rails as indicated in FIG. 7.
Figure 9:
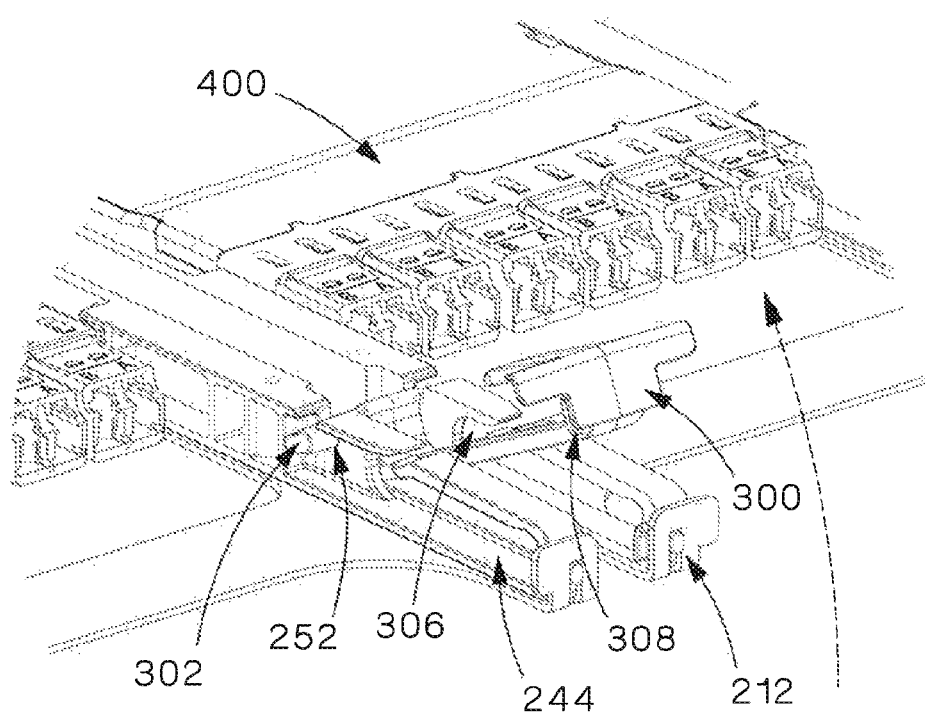
FIG. 9 is a close-up view of an installed unification clip of FIG. 8 with the unification clip partially installed.
Figure 10:
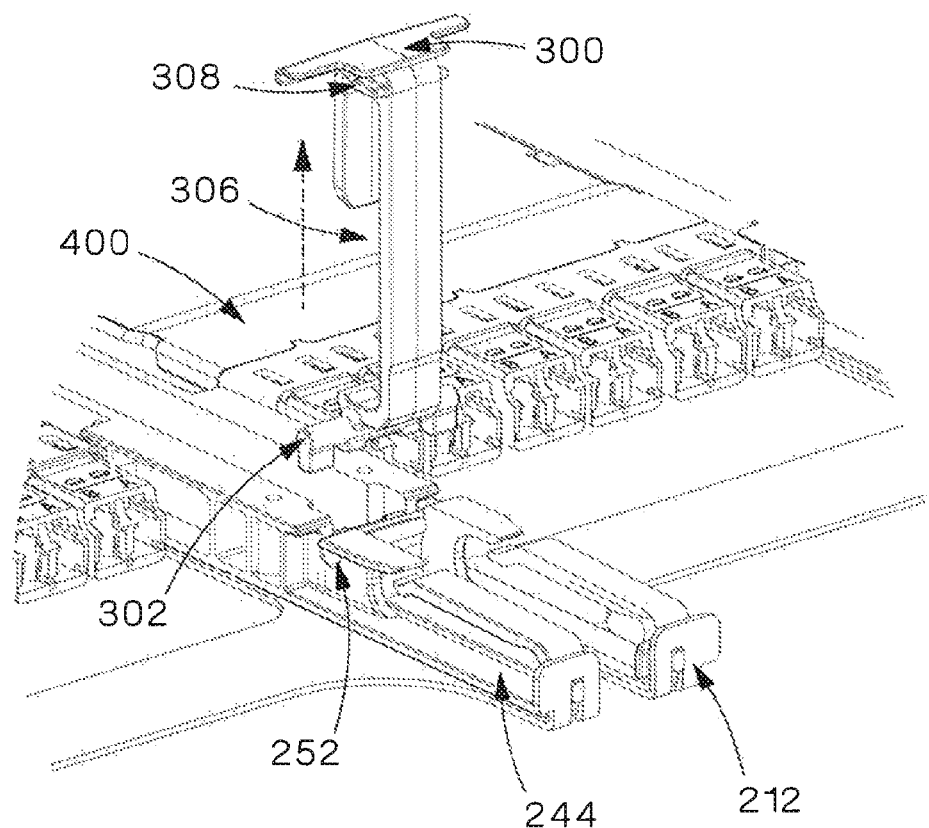
FIG. 10 is a close-up view of an installed unification clip of FIG. 8 with the unification clip removed.

As shown in FIGS. 4 and 5, each cassette tray 200 includes multiple cassette tray rails 212, which may slide in and out of chassis 100. FIG. 6 illustrates an enhanced view of the front portion of two cassette tray rails 212. FIGS. 7 and 8 illustrate a unification clip 300 connected to two cassette tray rails 212. A unification clip 300 may be used to join two cassette trays 200 together. Unification clip 300 is preferably a three-dimensional C-shaped structure, although unification clip 300 may also be D- or O-shaped, or of any other shape which allows unification clip 300 to join two cassette trays 200 together. As shown in FIGS. 8, 9, 10, 11 and 12, the unification clip 300 has two mounting posts 302, a cable management area 304, a top opening 306, and alignment posts 308. Mounting posts 302 are configured to engage with unification clip slots 252 located on the outer cassette tray rail 240 or 242. The mounting posts 302 are located on the rear portion of both sides of unification clip 300. Cable management area 304 is defined by the lumen of the unification clip 300—i.e. the empty space disposed within the unification clip 300. Alignment posts 308 are located on the forward-most portion of the unification clip 300. Alignment posts 308 engage with the front most portion of the cassette tray rails 212 such that the cable management area 304 of the unification clip 300 aligns with the front loops 246 of the cassette tray rails 240 or 242. Top opening 306 is disposed at the rear top portion of the unification clip 300 and is large enough to allow a patch cable 4 to pass through. Thus, patch cables 4 may be managed by routing them through cable management area 304 of unification clip 300. Because the cable management area 304 is aligned with the front loop 246 of the cassette tray rails 212 when the unification clip 300 is installed, the front loops 246 and cable management areas 304 work together to route patch cables 4. As shown in FIG. 8, when the unification clip 300 is installed the mounting posts 302 of the unification clip 300 each engage unification clip slots 252 on different cassette tray rails 212. Similarly, alignment posts 308 of the unification clip 300 each engage with different cassette tray rails 212, although they engage with the same two cassette tray rails 212 as the mounting posts 302. In an embodiment, unification clip 300 may be removed from the cassette tray rails 212 by disengaging the alignment posts 308 as shown in FIG. 9. The mounting posts 302 may also be disengaged as shown in FIG. 10. FIG. 11 illustrates an isometric view of the unification clip 300 from the front and FIG. 12 is an isometric view of the unification clip 300 from the back.

Figure 13:
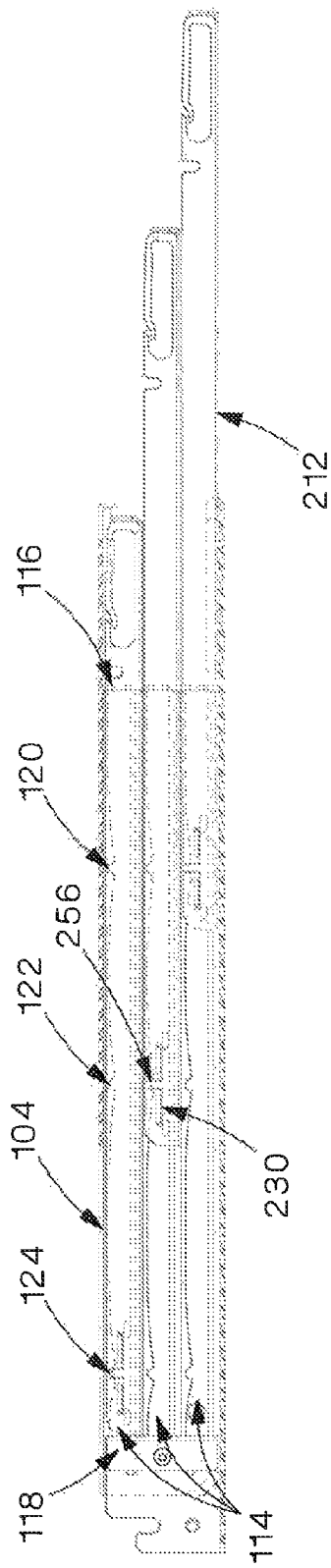
FIG. 13 is a perspective view of a tray guide and cassette tray rails, in which the top cassette tray rail is in the home position, the middle cassette tray rail is in the cord move or change position, and the bottom rail is in the cassette replacement or addition position.
Figure 14:
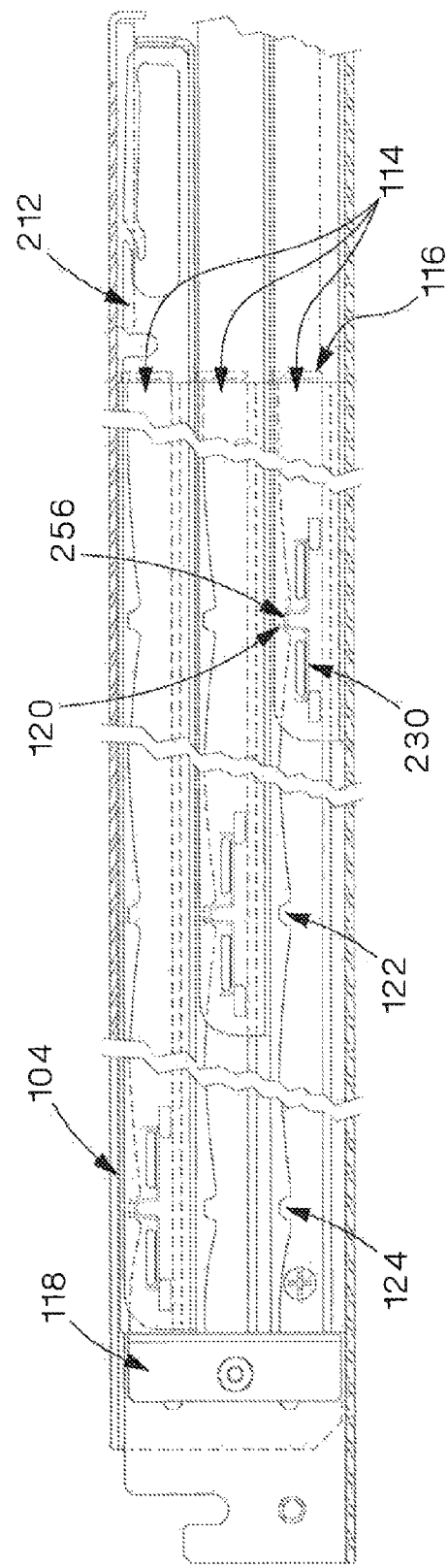
FIG. 14 is a broken perspective view of the tray guide and cassette tray rails of FIG. 13.
Figure 15:
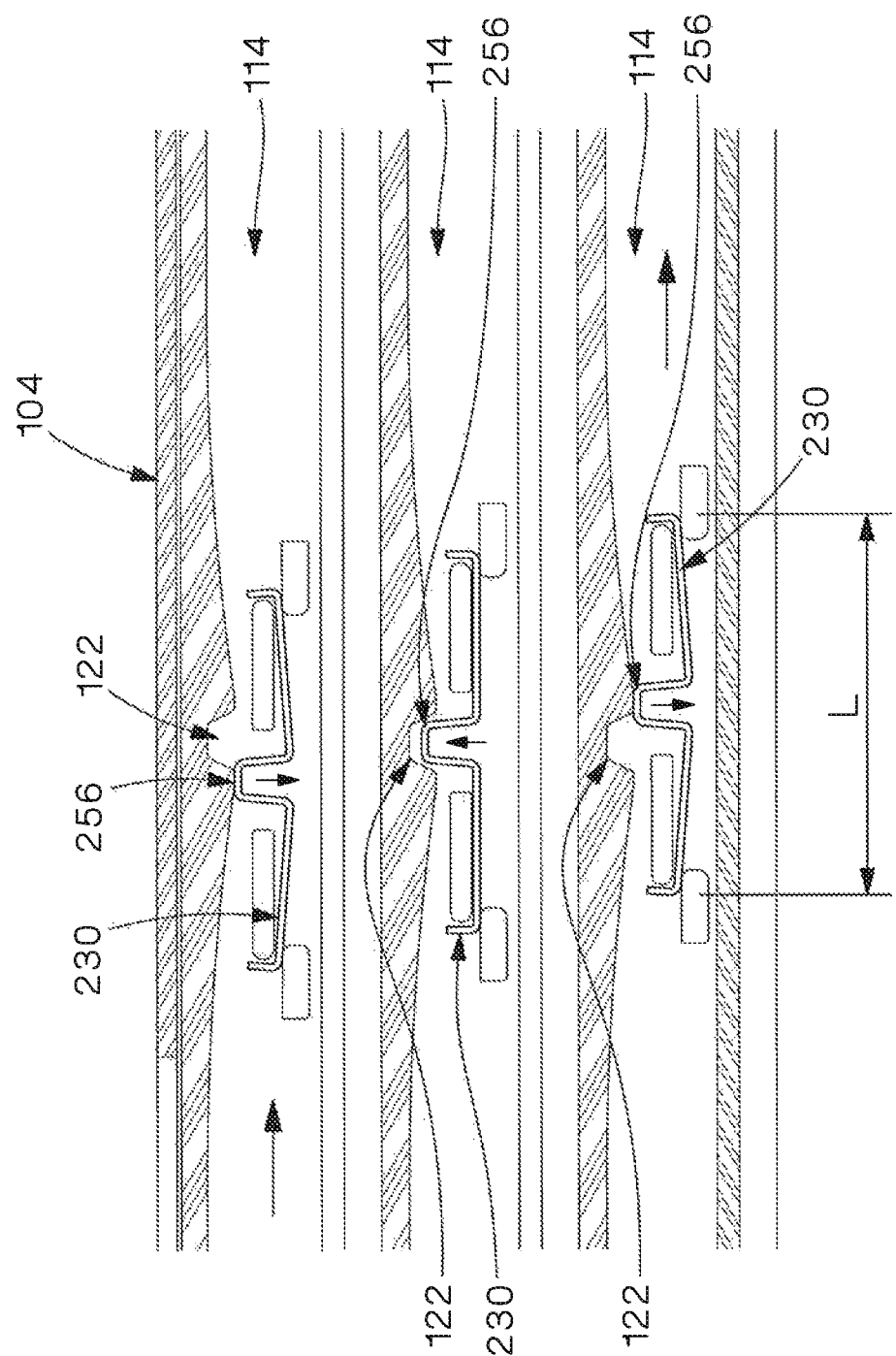
FIG. 15 is a perspective view of the spring protrusion and tray guide detent.

FIGS. 13 and 14 illustrate the cassette tray rails 212 in three different positions within a tray guide 104. Cassette tray rails 212 may be disposed in the same three positions in tray guides 102 and 106. Tray guides 102, 104 and 106 include front, center, and rear detents 120, 122, and 124 which serve to position the cassette trays 200 in three separate positions—the home position, cord move or change position, and cassette replacement or addition position. Tray guides 102, 104, and 106 also each include three tray guide channels 114. FIG. 15 illustrates the interaction of the spring protrusion 230 of the cassette tray rail 212 and the detents 120, 122 and 124 of the tray guides 102, 104, and 106. Spring protrusion 230 comprises a flat piece of flexible material with a protuberance 256 in its center. The spring protrusion 230 is preferably comprised of a flexible metal such as steel. The protuberance 256 of spring protrusion 230 is of a shorter length than detents 120, 122, and 124 in the direction of the cassette tray rail 240 or 242 and is preferably shaped to engage with detents 120, 122, and 124. As shown in FIG. 15, spring protrusion 230 flexes in the opposite direction of the protuberance 256 such that, when enough force is applied to slide the cassette tray 200 and the cassette 400 in the forward or rearward direction, the protuberance 256 escapes from detents 120, 122, and 124 and allows the cassette tray rails 240 or 242 to move freely along tray guides 102, 104, or 106 within tray guide channels 114. When the protuberance 256 encounters another detent 120, 122, or 124, the protuberance 256 engages with the detent 120, 122, or 124 and fixes the cassette tray 200 and the cassette 400 in position until enough force is applied to slide the cassette tray 200 and the cassette 400 to another position.

Figure 16:
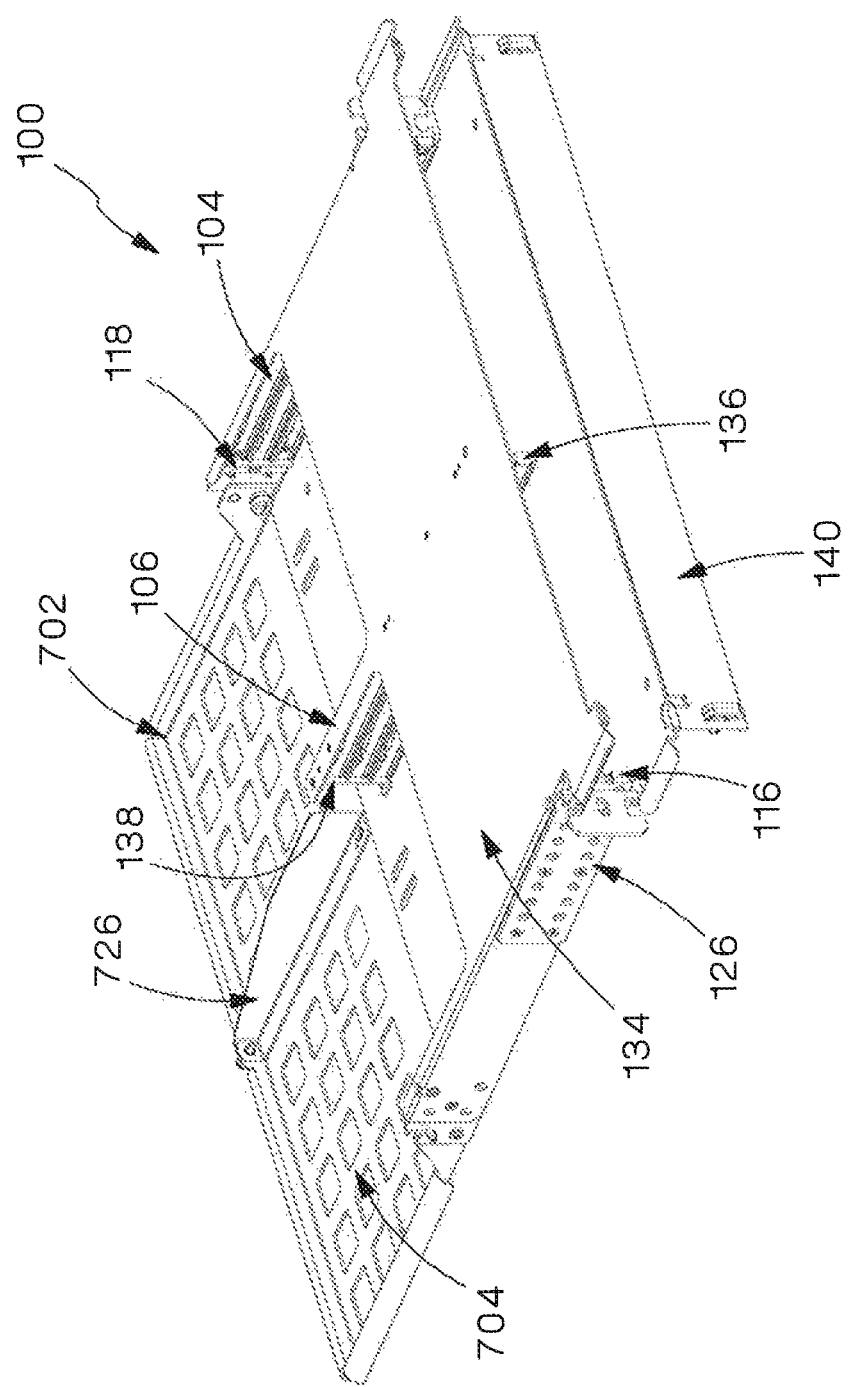
FIG. 16 is an isometric view of the chassis with the front access door open and the cassette trays removed.
Figure 17:
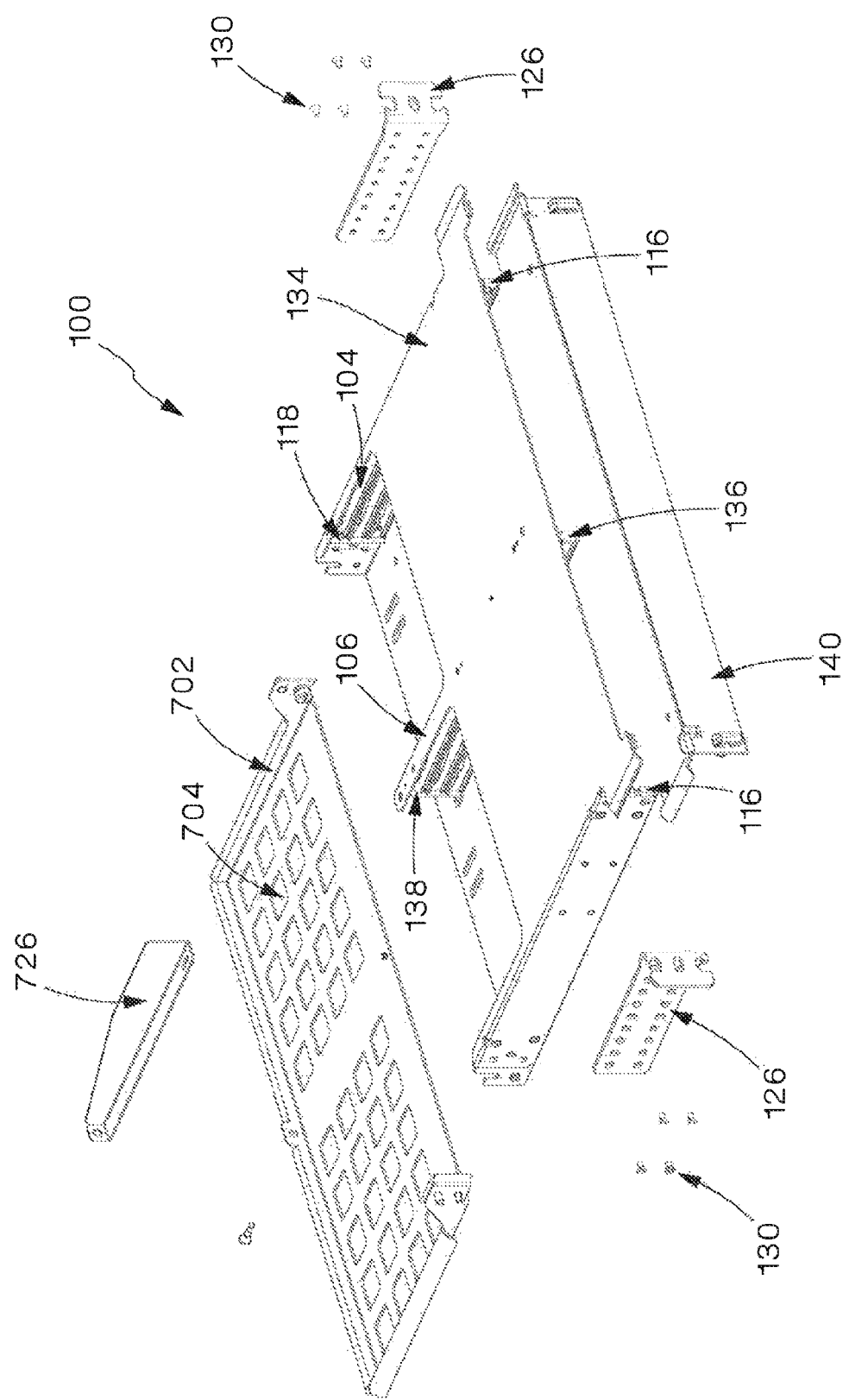
FIG. 17 is a partially exploded isometric view of the chassis of FIG. 16.

As further shown in FIGS. 16 and 17, the chassis 100 also includes forward limiting flanges 116, rear limiting brackets 118, a center forward limiting bracket 136, a center rear limiting bracket 138, and rack mounting brackets 126. Forward limiting flanges 116 are protrusions on the left and right portions of the chassis 100 disposed proximate to the forward-most edge of the left tray guide 102 and right tray guide 104. The protrusions of the forward limiting flanges 116 are bent 90 degrees toward the interior of the chassis 100 to engage with the cassette trays 200 in the cassette replacement or addition position. Rear limiting brackets 118 are brackets disposed or attached proximate to the rearward-most edge of the left tray guide 102, right tray guide 104, and center tray guide 106. The rear limiting brackets engage with the cassette trays 200 in the home position. The center rear limiting brackets 138 attached to the center tray guide 106 are shaped to engage with both of the cassette trays 200 located in the same row of the chassis 100 in the home position. The center forward limiting bracket 136 is also attached to the center tray guide 106 and is shaped to engage with both of the cassette trays 200 located in the same row of the chassis 100 in the cassette replacement or addition position. Once the cassette trays 200 are installed within tray guides 102, 104, and 106 and the rear limiting brackets 118, center forward limiting bracket 136, and center rear limiting bracket 138 are installed on the chassis 100, cassette trays 200 are maintained within the chassis 100 and cannot be removed without first removing the center forward limiting bracket 136 or the rear limiting brackets 118 and center rear limiting bracket 138.

Figure 19:
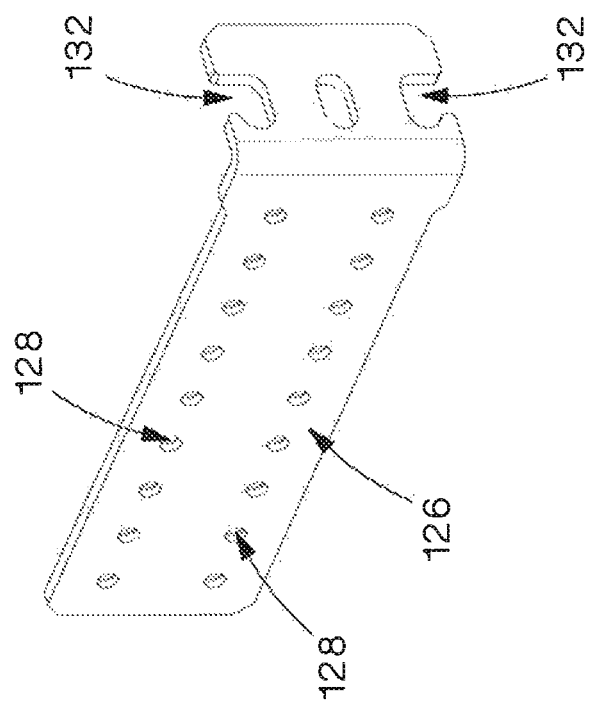
FIG. 19 is an isometric view of a rack mounting bracket.
Figure 18:
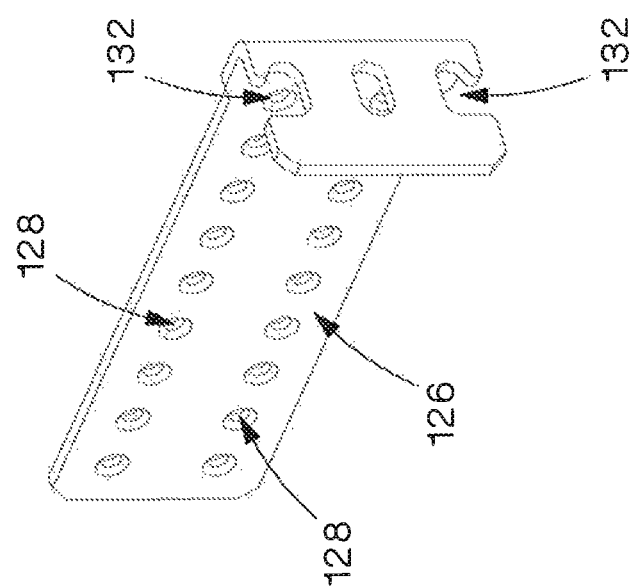
FIG. 18 is an isometric view of a rack mounting bracket.

FIGS. 16 and 17 illustrate the chassis 100 with the cassette trays 200 and the cassettes 400 removed. As shown in FIG. 17, rack mounting brackets 126 provide the connection between the chassis 100 and the high density fiber enclosure system 2. As shown in FIGS. 18 and 19, the rack mounting brackets 126 may contain two rows of countersink thru holes 128 which allow the rack mounting bracket 126 to be adjustably mounted to the chassis 100. A variety of mounting location options are provided by the two rows of countersink thru holes 128, allowing the installer to align the front portion of the chassis 100 with the front portion of the high density fiber enclosure system 2. The rack mounting brackets 126 also include slotted and cut openings 132 on the top and bottom of the forward-most portion of the rack mounting brackets 126. Notably, the forward-most portion of the rack mounting brackets 126 may be bent 90 degrees such that the slotted and cut openings 132 face the front of the chassis 100 when installed. The slotted and cut openings 132 allow the chassis 100 to be pre-installed by allowing the installer to rest the chassis 100 on two pre-installed screws located on the high density fiber enclosure system 2. The pre-installed screws may then be tightened to install the chassis 100 in the high density fiber enclosure system 2.

Figure 20:
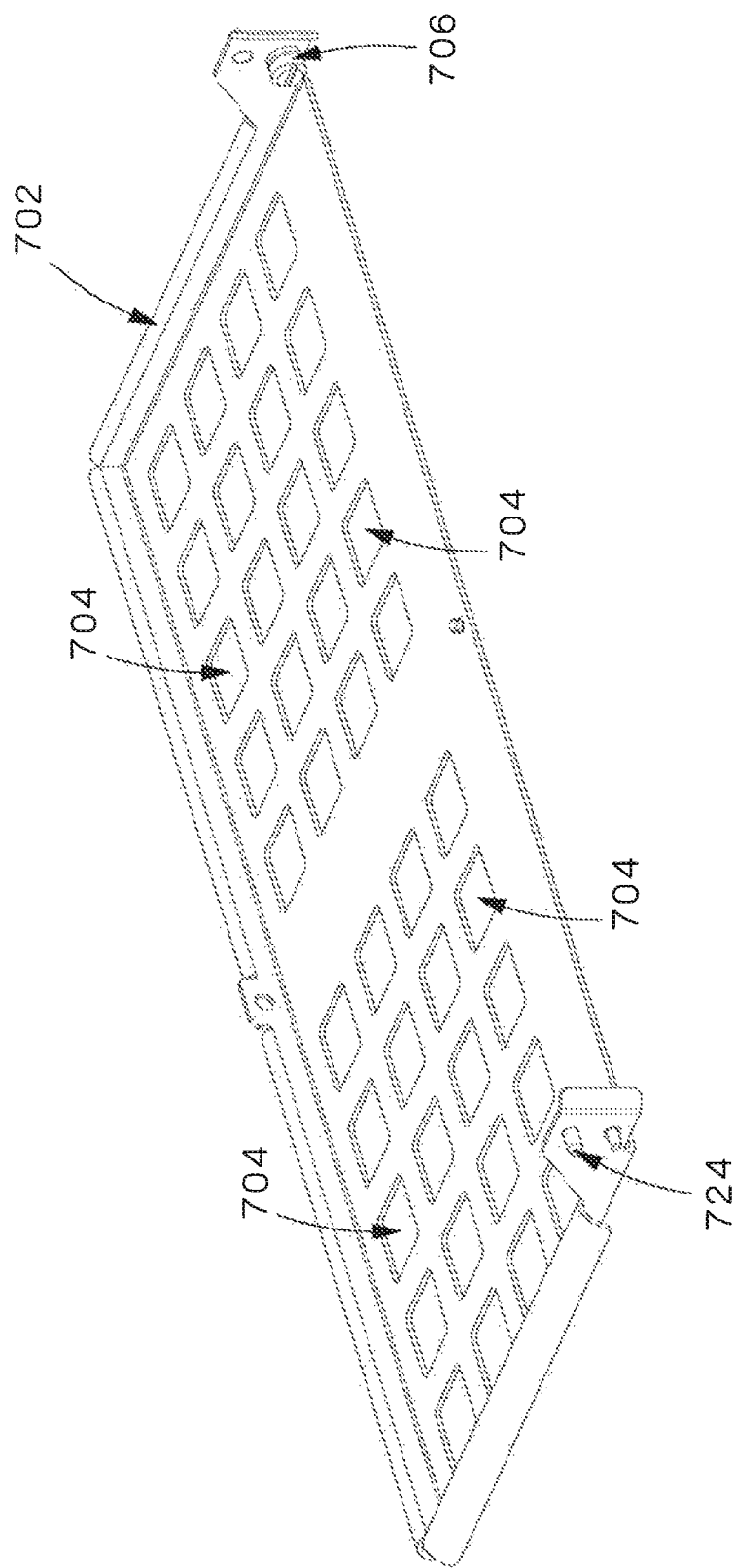
FIG. 20 is an isometric view of a slack management plate.

FIG. 20 illustrates an embodiment of the slack management plate 702 which includes cutouts 704. Slack management plate 702 may also optionally include a divider 726 as shown in FIGS. 1-5. Divider 726 may be formed of a removable or permanent wall or other structure disposed perpendicular to the plane of slack management plate 702 which allows a user to organize trunk cable furcation legs 6. One embodiment of divider 726 is shown in FIGS. 21A and 21B.

Figure 22:
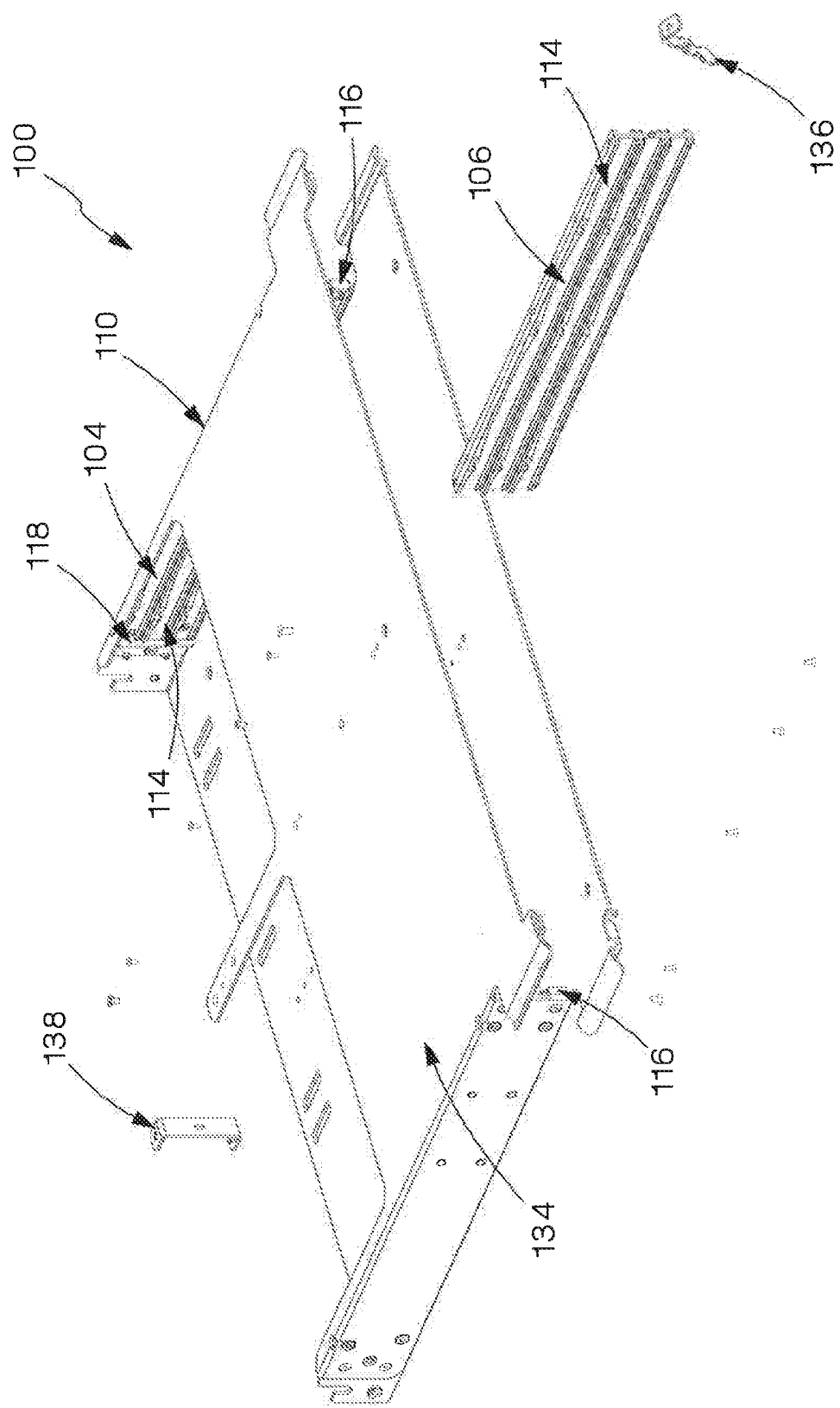
FIG. 22 is a partially exploded isometric view of the chassis of FIG. 16.
Figure 23:
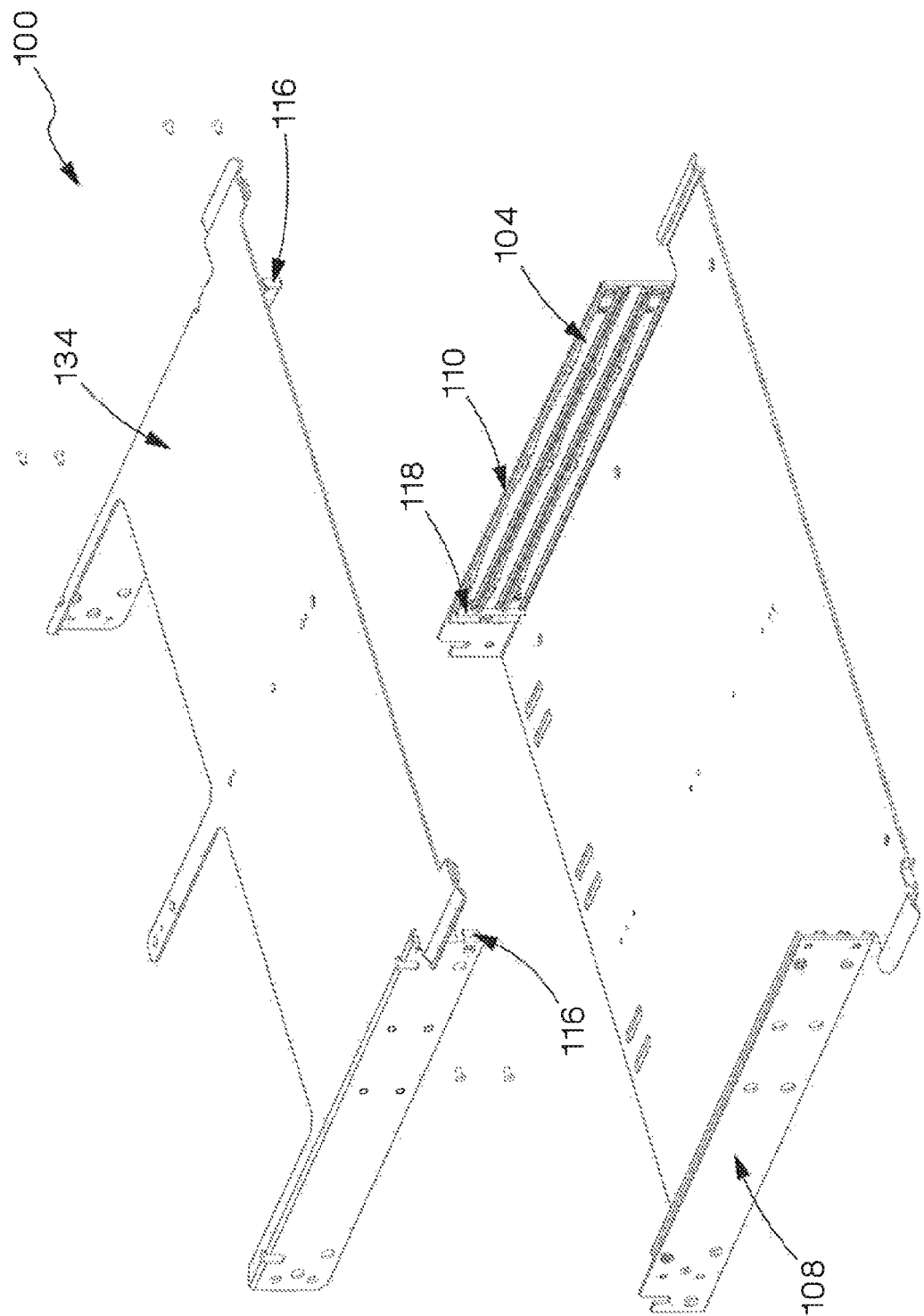
FIG. 23 is a partially exploded isometric view of the chassis of FIG. 16 with the center tray guide removed.
Figure 24:
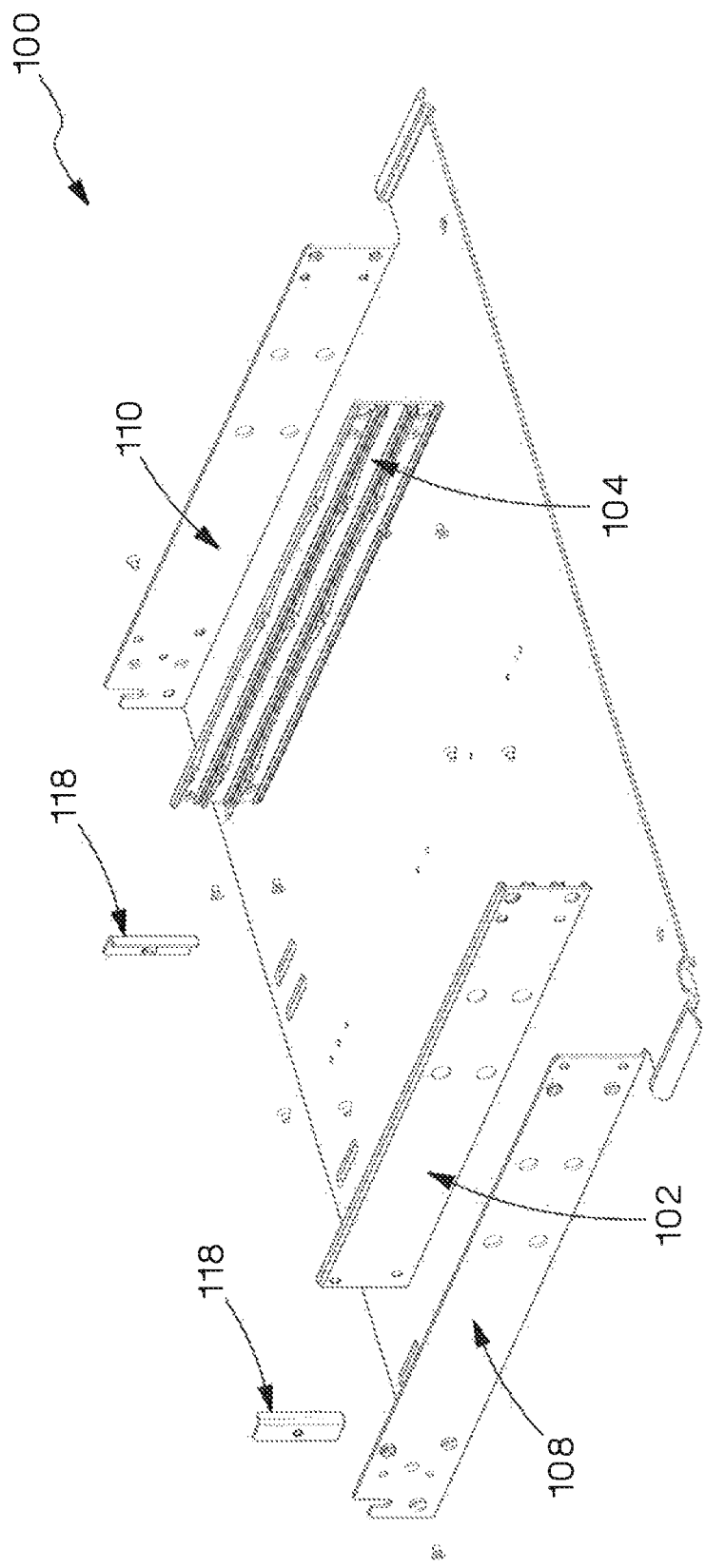
FIG. 24 is a partially exploded isometric view of the chassis of FIG. 16 with the chassis cover removed.

FIG. 22 illustrates the center tray guide 106 removed from the chassis 100. Left tray guides 102 and right tray guides 104 are attached to the chassis 100 as shown in FIGS. 22, 23, and 24. In particular, a left tray guide 102 is attached to the left side wall 108 of the chassis 100, a right tray guide 104 is attached to the right side wall 110 of the chassis 100. A center tray guide 106 is attached to chassis 100. Alternatively, a center tray guide 106 may be integrally formed such that it comprises both a left tray guide 102 and right tray guide 104. Left tray guides 102 and right tray guides 104 are mirror images of one another. Each of the tray guides 102, 104 and 106 have three tray guide channels 114 which serve to support the cassette trays 200 as they slide in and out of the chassis 100.

FIGS. 22-24 further illustrate rear limiting brackets 118 and center rear limiting brackets 138. Rear limiting brackets 118 are brackets disposed or attached proximate to the rearward-most edge of the left tray guide 102, right tray guide 104, and center tray guide 106. The rear limiting brackets engage with the cassette trays 200 in the home position. The center rear limiting brackets 138 attached to the center tray guide 106 are shaped to engage with both of the cassette trays 200 located in the same row of the chassis 100 in the home position. Once the cassette trays 200 are installed within tray guides 102, 104, and 106 and the limiting brackets 118 and 138 are installed on the chassis 100, cassette trays 200 are maintained within the chassis 100 and cannot be removed without first removing the rear limiting brackets 118 and 138.

Figure 25A:
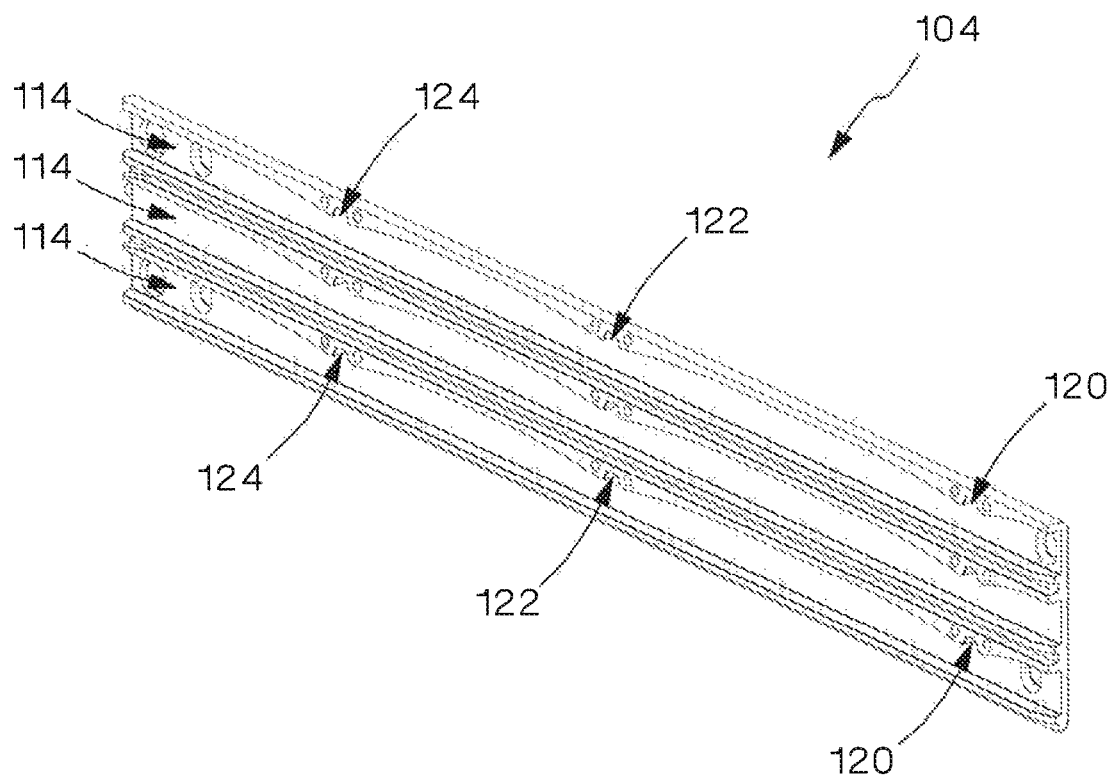
FIGS. 25A and 25B are isometric views of a right tray guide.
Figure 25B:
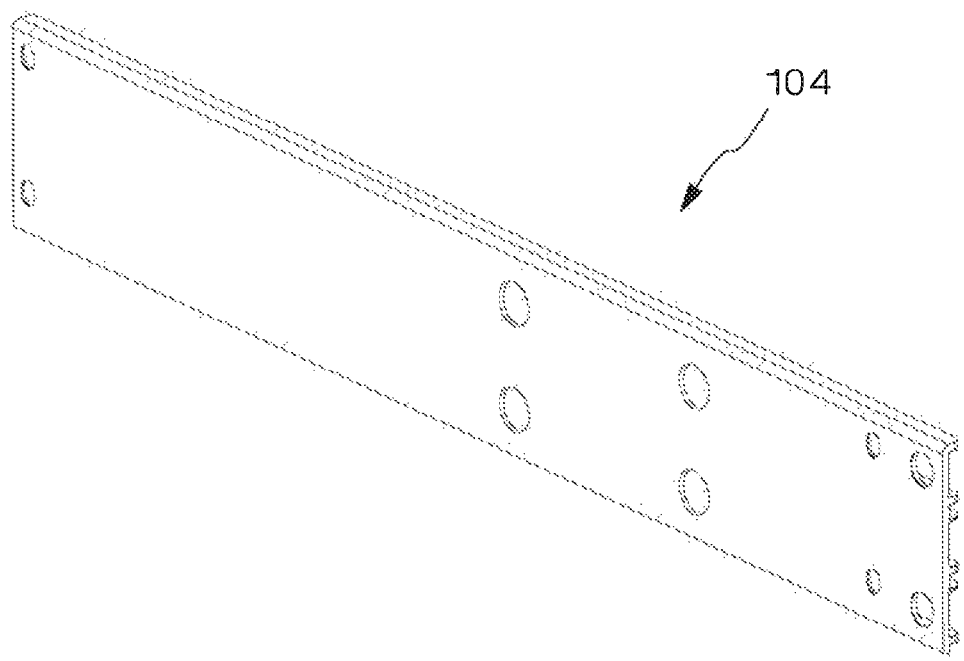

FIGS. 25A and 25B illustrate a right tray guide 104. Right tray guide 104 comprises a plurality of tray guide channels 114 running lengthwise down one side of the tray guide 104 and approximately parallel to one another. In one embodiment three tray guide channels 114 comprise a right tray guide 104. Additionally, each tray guide channel 114 includes a front detent 120, a center detent 122, and a rear detent 124 as shown in FIG. 25A.

Figure 26A:
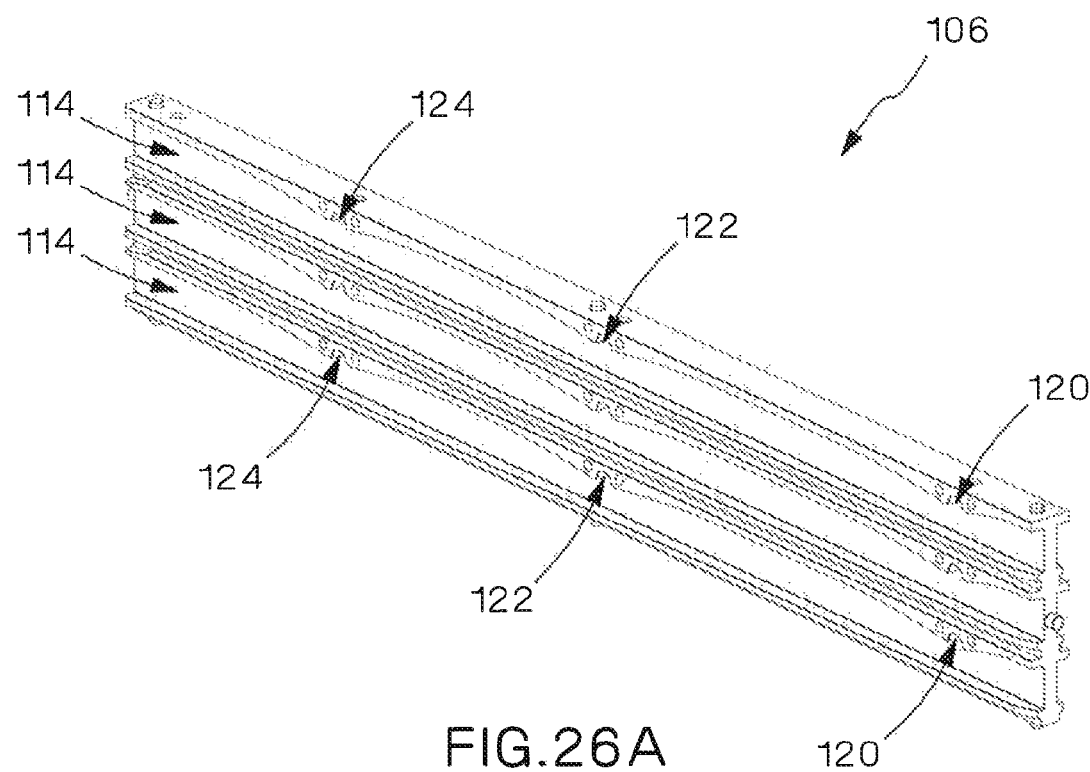
FIGS. 26A and 26B are isometric views of a center tray guide.
Figure 26B:
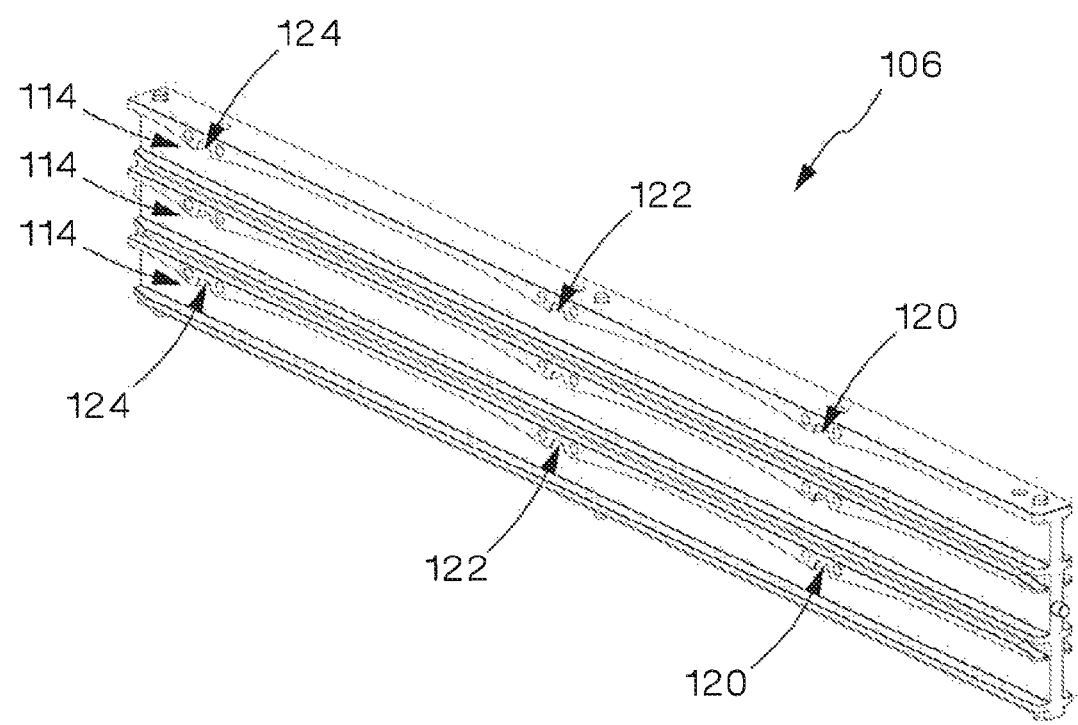

FIGS. 26A and 26B illustrate a center tray guide 106. Center tray guide 106 comprises a plurality of tray guide channels 114 running lengthwise down both sides of the tray guide 106 and approximately parallel to one another. In one embodiment three tray guide channels 114 disposed on each side of the center tray guide 106 comprise a center tray guide 106. Additionally, each tray guide channel 114 includes a front detent 120, a center detent 122, and a rear detent 124 as shown in FIG. 26A.

Figure 27A:
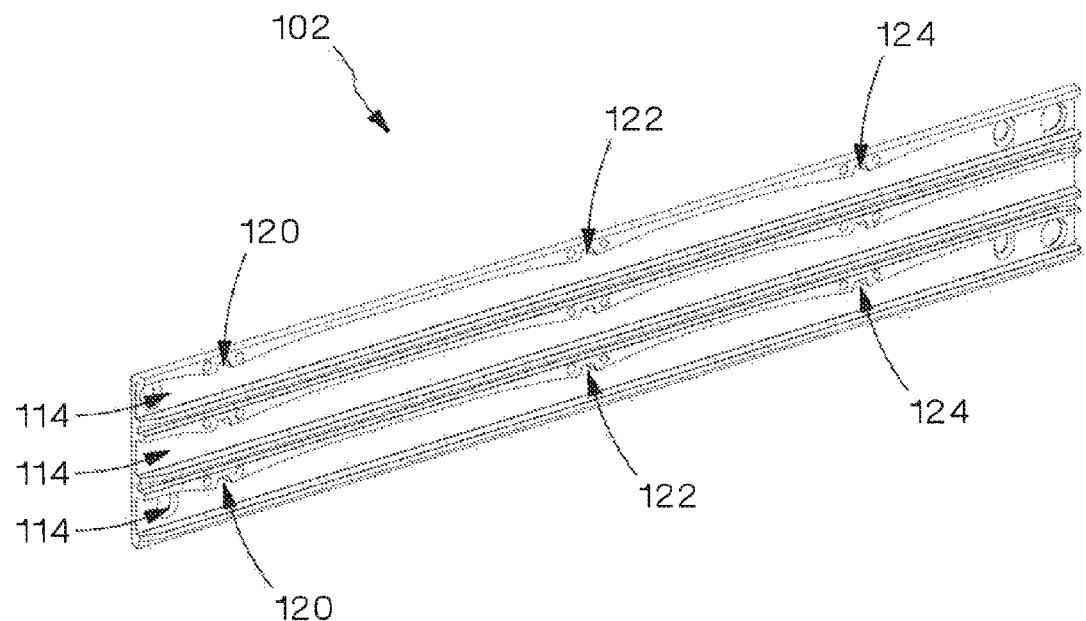
FIGS. 27A and 27B are isometric views of a left tray guide.
Figure 27B:
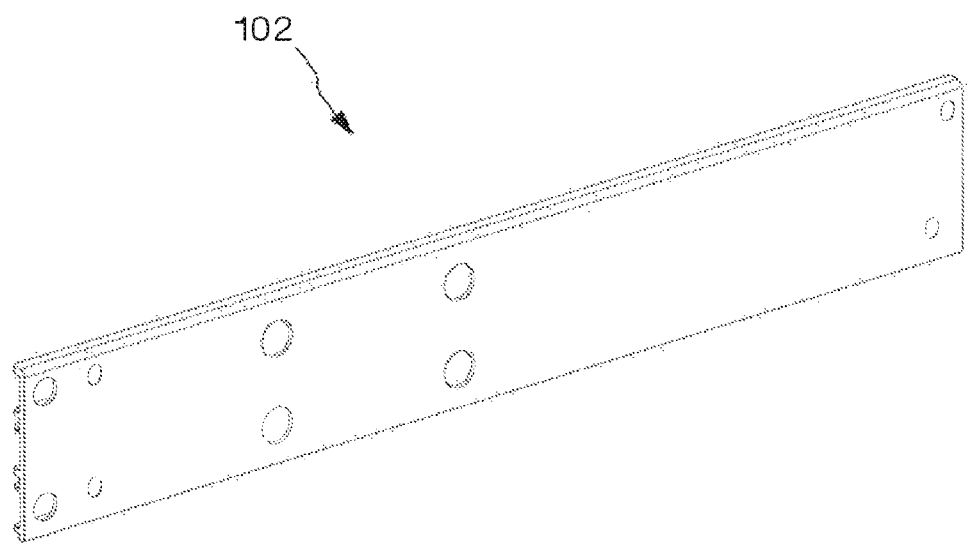

FIGS. 27A and 27B illustrate a left tray guide 102. Left tray guide 102 comprises a plurality of tray guide channels 114 running lengthwise down one side of the tray guide 102 and approximately parallel to one another. In one embodiment three tray guide channels 114 comprise a left tray guide 106. Additionally, each tray guide channel 114 includes a front detent 120, a center detent 122, and a rear detent 124 as shown in FIG. 25A. In an embodiment, left tray guides 102 and right tray guides 104 are mirror images of one another.

Figure 28:
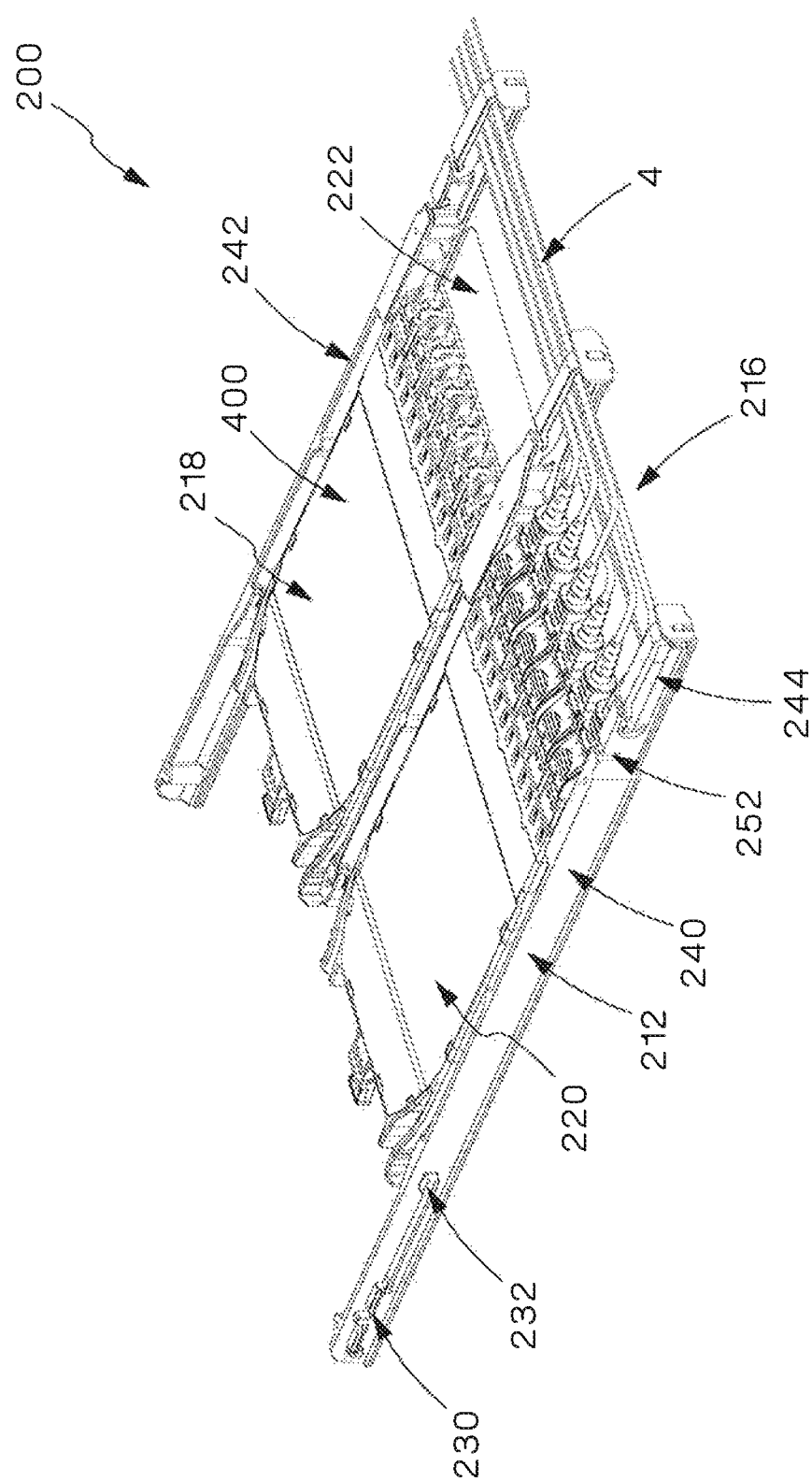
FIG. 28 is an isometric view of a cassette tray.
Figure 29:
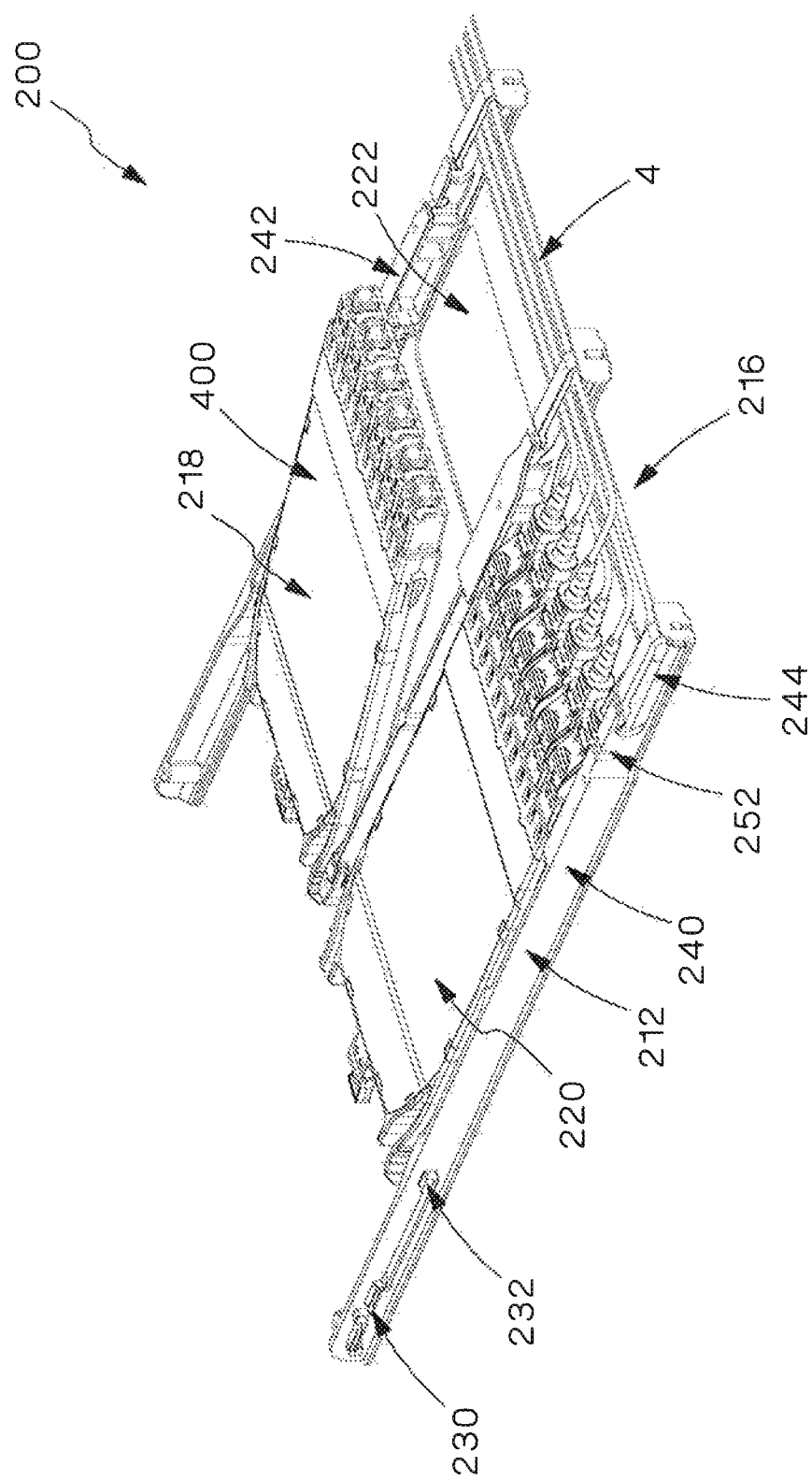
FIG. 29 is an isometric view of the cassette tray of FIG. 28 with one cassette in the process of being removed from the cassette tray.
Figure 30:
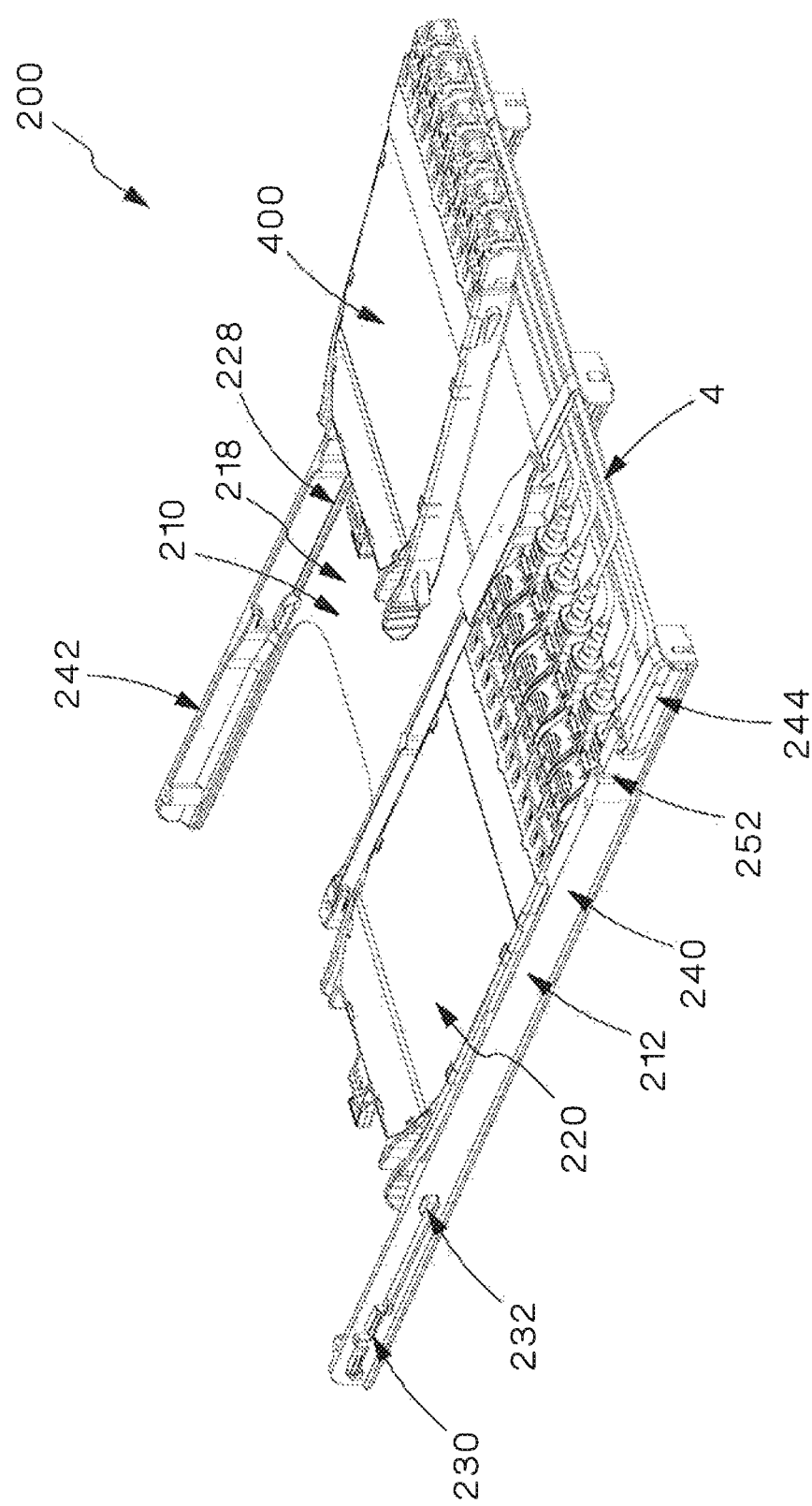
FIG. 30 is an isometric view of the cassette tray of FIG. 28 with one cassette further in the process of being removed from the cassette tray.
Figure 31:
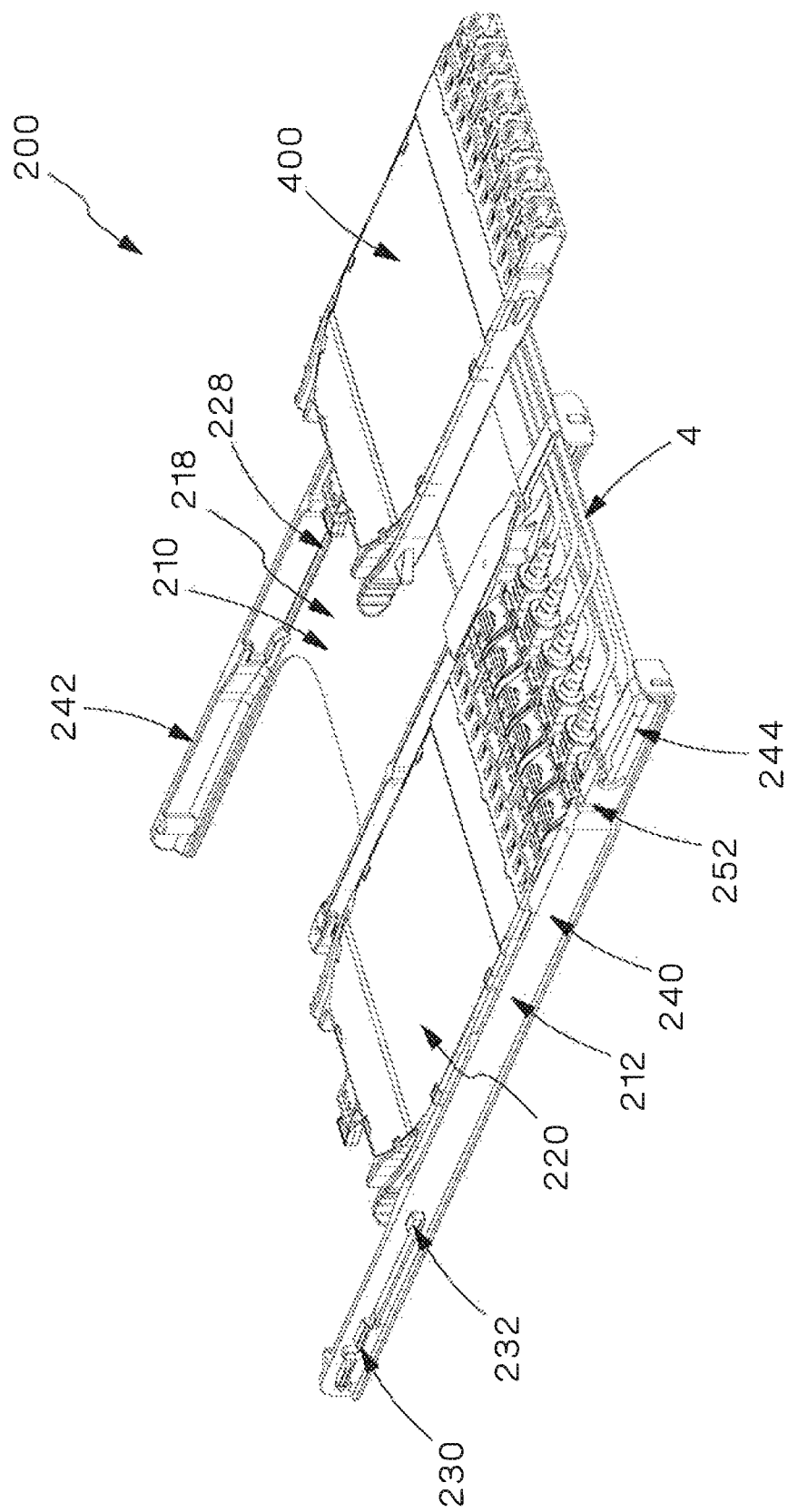
FIG. 31 is an isometric view of the cassette tray of FIG. 28 with one cassette further in the process of being removed from the cassette tray.

As shown in FIGS. 28, 29, 30, 31, 32 and 33, each cassette tray 200 consists of a tray base 210, cassette tray rails 212, and cassette flex beam 214. The tray base 210 is preferably comprised of a sheet metal base. The tray base 210 includes a front recessed area 216 which provides maximum allowable reach for an installer or user to access patch cords 4 (not shown). The tray base 210 also has a right cassette bay 218 and a left cassette bay 220. Each cassette bay 218 and 220 includes a cassette opening 222 which allows an installer to access installed patch cords 4 from the bottom and top of the cassette tray 200. Finally, left and right cassette tray rails 240 and 242 are disposed upon the cassette tray 200 within each cassette bay 218 and 220 such that each cassette bay 218 and 220 includes a left cassette tray rail 240 disposed on the left side of the cassette bay 220, and a right cassette tray rail 242 disposed on the right side of the cassette bay 218. Alternatively, if a center cassette tray rail 276 is used, a right cassette bay 218 may have a cassette tray rail 242 disposed on the right side of right cassette bay 218 and a center cassette tray rail 276 disposed on the left side of right cassette bay 218, and a left cassette bay 220 may have a left cassette tray rail 240 disposed on the left side of left cassette bay 220 and a center cassette tray rail 276 disposed on the right side of left cassette bay 220. As further discussed herein with reference to the use of the high density fiber enclosure system 2, FIGS. 29-31 show the cassette tray 200 in different stages of removal of a cassette 400 from the front of the chassis 100.

Figure 32:
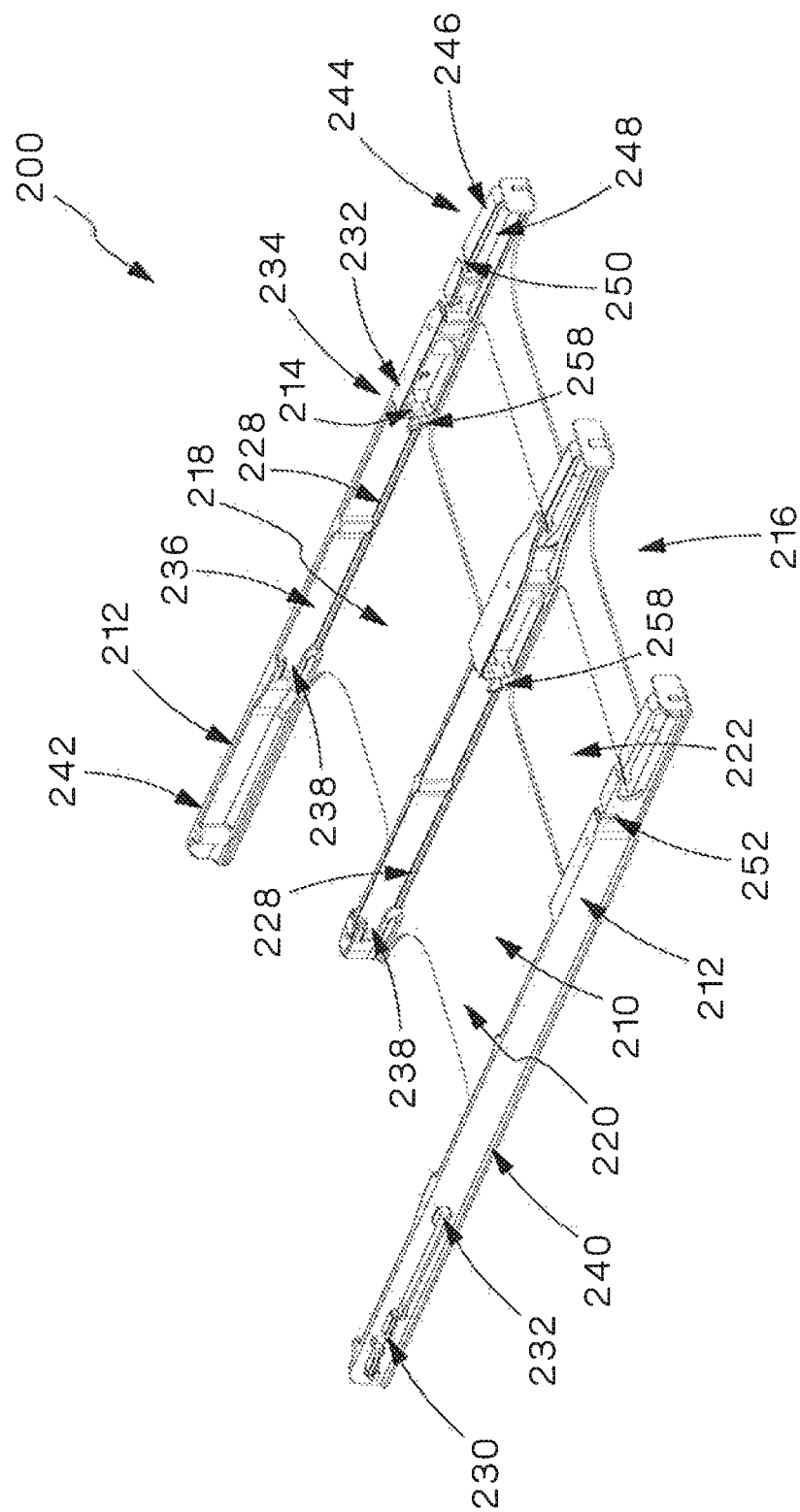
FIG. 32 is an isometric view of a cassette tray with the cassettes removed.
Figure 33:
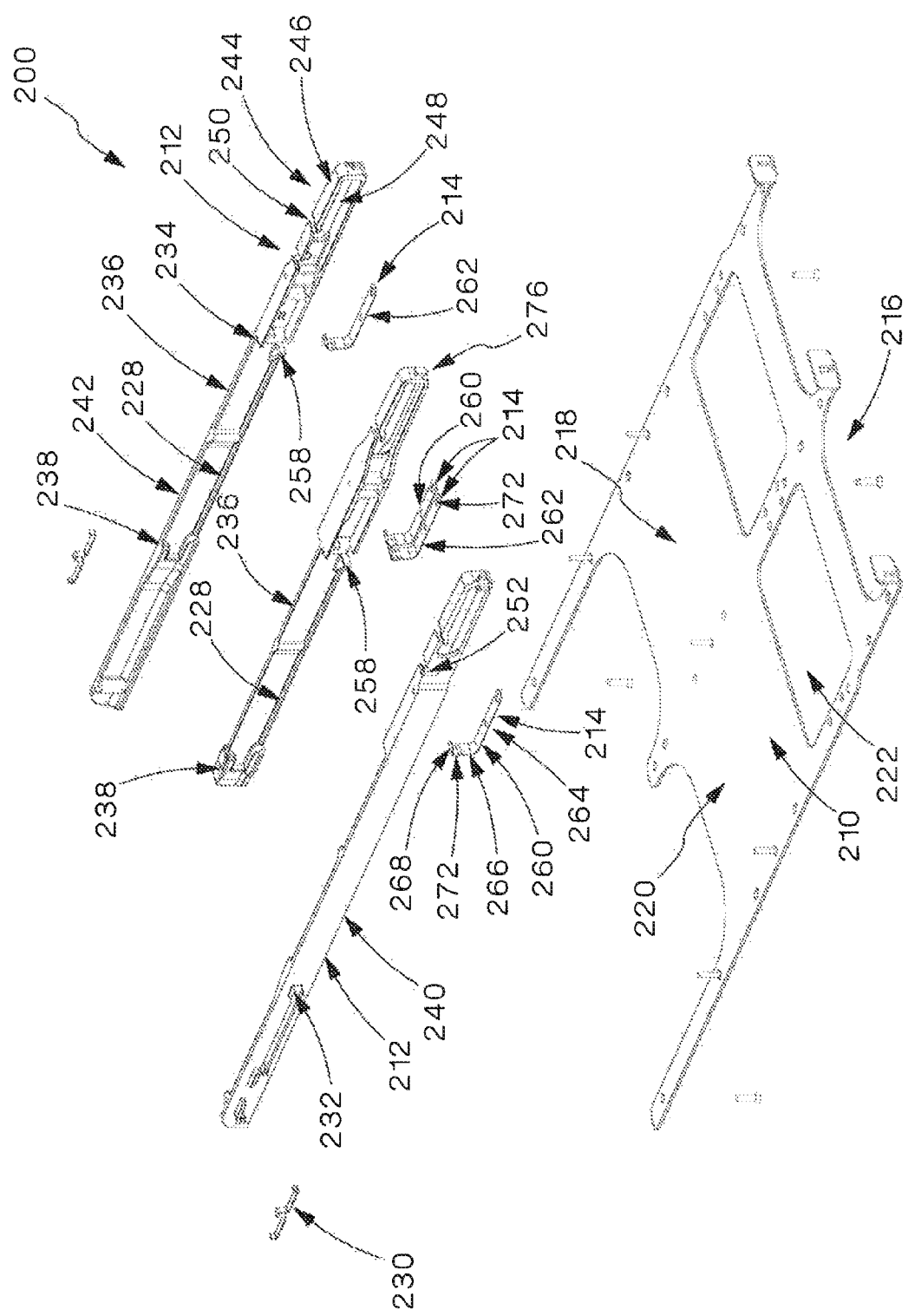
FIG. 33 is an exploded isometric view of the cassette tray of FIG. 32.

As shown in FIGS. 32 and 33, the front patch cord management loop 244 is disposed at the forward-most portion of the cassette tray rail 212. The front patch cord management loop 244 provides an organization structure for patch cords 4 consisting of a front loop 246 and an opening 248 to route patch cords 4 through. The opening 248 allows the patch cords 4 to travel from right to left or left to right through the front loop 246. The front loop 246 has a slot 250 on its topmost portion which is wide enough to allow patch cords 4 to pass through. Therefore, patch cords 4 may enter and leave the front loop 246 via the slot 250 without either end of the patch cord 4 being disconnected. A unification clip slot 252 is located just behind the front patch cord management loop 244 on the cassette tray rail 240 or 242. Unification clip slot 252 is located on the outside of the cassette tray rail 240 or 242. Center cassette tray rails 276 do not include unification clip slots 252. Disposed further rearward on the cassette tray rail 212 is the front post stop area 234. The front post stop area 234 interacts with the cassette front post 410 to properly seat the cassette 400 into the cassette tray rail 212. Disposed proximate and to the rear of the front post stop area 234 is the post stops discontinuity 236. The post stops discontinuity 236 is a smooth portion of the cassette tray rail 212 which ensures the front post 410 and rear post 412 of the cassette 400 do not engage with the cassette tray rail 212 within the post stops discontinuity 236. Disposed proximate and to the rear of the post stops discontinuity 236 is the rear post stop 238. The rear post stop 238 is a notch designed to interact with the rear post 412 of the cassette 400 such that the rear post stop 238 captures the rear post 412 on three sides and blocks the cassette 400 from moving upwards or rearwards.

As further shown in FIGS. 32 and 33, a cassette centering feature 258 is also integrated into the cassette tray rails 212. The cassette centering feature 258 is a triangular-shaped protuberance located on the bottom portion of the cassette tray rail 212 just proximate to and rear of the front post stop area 234. The cassette centering feature 258 is designed such that, when a cassette 400 is loaded from the rear of the chassis 100, an outer shuttered LC adapter 504 or MPO patch cord adapter 604 makes contact with the cassette centering feature 258 and, due to the continued forward movement of the cassette 400, urges the cassette 400 into proper alignment with the cassette tray rails 240 or 242 such that the front posts 410 engage with the front post stop areas 234 and the rear posts 412 engage with the rear post stops 238 essentially simultaneously.

FIG. 33 illustrates a left cassette tray rail 240, right cassette tray rail 242, and center cassette tray rail 276. The cassette tray rails 212 each consist of a support rib 228, spring protrusion 230, front post stop area 234, post stops discontinuity 236, and rear post stop 238. Left cassette tray rails 240 and right cassette tray rails 242 may be mirror images of one another. In an embodiment, a center cassette tray rail 276 consists of a spring protrusion 230, front post stop area 234, post stops discontinuity 236, and rear post stop 238 on both sides of center cassette tray rail 276. In an alternative embodiment, a center cassette tray rail 276 comprises a left cassette tray rail 240 and right cassette tray rail 242 disposed back-to-back. Center cassette tray rails 276 do not include support ribs 228. Left cassette tray rails 240 travel within a left tray guide 102 and right cassette tray rails 242 travel within a right tray guide 104. The support rib 228 of the cassette tray rail 212 travels along the top portion of a tray guide 102, 104, or 106 to support the cassette tray rail 240 or 242 and cassette tray 200. The support rib 228 of the cassette tray rail 240 or 242 extends along the bottom portion of the cassette tray rail 240 or 242 from the rear of the cassette tray rail 240 to 242 to a front patch cord management loop 244.

As shown in FIGS. 13 and 14, additional features of the cassette tray rail 212 are designed to facilitate the movement of the cassette tray 200 and cassette 400 in and out of the high density fiber enclosure 2 in three different positions. The stopping block 232 interacts with the forward limiting flange 116 to limit forward movement of the cassette 400 at the cassette replacement or addition position. The cassette replacement or addition position is the forward-most disposition of the cassette tray 200 and cassette 400 and allows a user to replace or add cassettes to the chassis 100. The stopping block 232 (as shown in FIGS. 34A and 34B) is disposed near the rear of the cassette tray rail 212 such that the forward motion of the cassette 400 is halted at the cassette replacement or addition position.

Figure 34B:
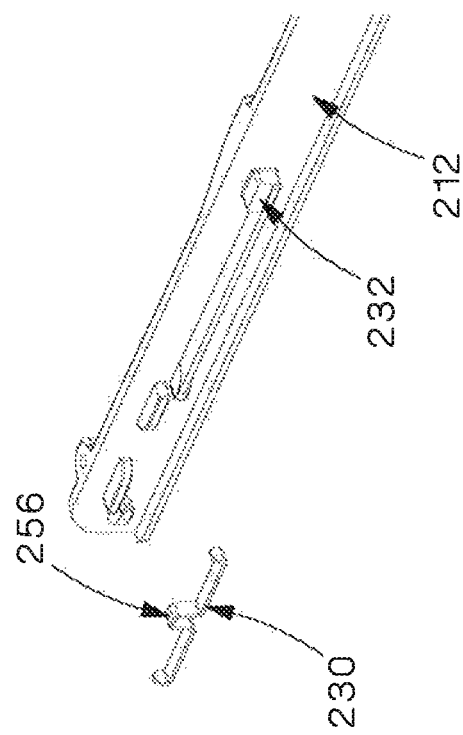
FIG. 34B is a partially exploded isometric view of the spring protrusion and cassette tray rail of FIG. 34A.
Figure 34A:
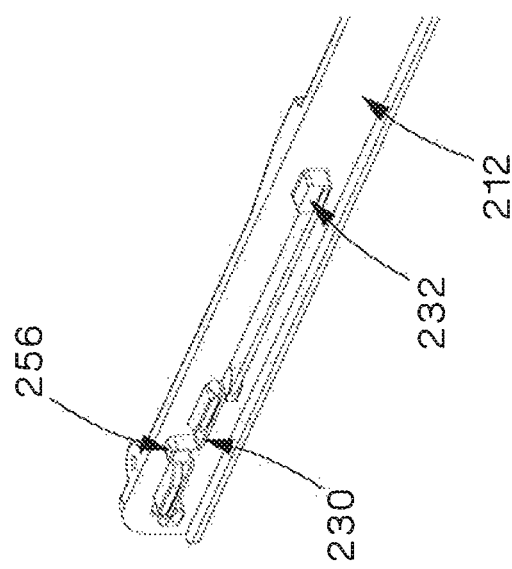
FIG. 34A is an isometric views of the spring protrusion and portion of the cassette tray rail.

As shown in FIGS. 34A and 34B, a spring protrusion 230 is disposed on the most rearward portion of the cassette tray rails 240 and 242. Center cassette tray rails 276 do not include spring protrusions 230. The spring protrusion 230 interferes with the detents 120, 122, and 124 in order to position the cassette 400 and cassette tray 200 in the home, cord move or change, and cassette replacement or addition positions. In particular, the spring protrusion 230 is disposed within the front detent 120 at the cassette replacement or addition position. The spring protrusion 230 is disposed within the center detent 122 in the cord move or change position. Finally, the spring protrusion 230 is disposed within the rear detent 124 in the home position. Spring protrusion 230 comprises a flat piece of flexible material with a protuberance 256 in its center. The spring protrusion 230 is preferably comprised of a flexible metal such as steel. The protuberance 256 of spring protrusion 230 is of a shorter length than detents 120, 122, and 124 in the direction of the cassette tray rail 240 or 242 and is preferably shaped to engage with detents 120, 122, and 124. As shown in FIG. 15, spring protrusion 230 flexes in the opposite direction of the protuberance 256 such that, when enough force is applied to slide the cassette tray 200 and cassette 400 in the forward or rearward direction, the protuberance 256 escapes from detents 120, 122, and 124 and allows the cassette tray rails 240 or 242 to move freely along tray guides 102, 104, or 106. When the protuberance 256 encounters another detent 120, 122, or 124, the protuberance 256 engages with the detent 120, 122, or 124 and fixes the cassette tray 200 and cassette 400 in position until enough force is applied to slide the cassette tray 200 and cassette 400 to another position.

As shown in FIGS. 35A and 35B, cassette flex beam 214 is formed of a beam shaped to engage with the cassette 400 such that the cassette 400 is securely installed in the cassette tray 200 and no unwanted motion of the cassette 200 within the cassette tray 400 occurs. Left cassette flex beams 260 are disposed on left cassette tray rails 240; right cassette flex beams 262 are disposed on right cassette tray rails 242. Left cassette flex beams 260 are mirror images of right cassette flex beams 262. Cassette flex beam 214 has a beam portion 264, catch wall 266, front lead-in 268, and mounting hole 270. The beam portion 264 of cassette flex beam 214 is disposed between the catch wall 266 and mounting hole 270 and is generally horizontal. The catch wall 266 of cassette flex beam 214 is disposed on the rear-most portion of the beam portion 264 and is generally vertical. The catch wall 266 includes a divot 272 which is shaped to engage with front post 410 of the cassette 400 such that catch wall 266 prohibits the cassette 400 from upward movement until sufficient upward force is applied to the cassette 400 to deflect the flex beam 214. Catch wall 266 also applies rearward pressure on the front post 410 of the cassette 400 to minimize rattling or other unwanted movement while the cassette 400 is in an installed position. Front lead-in 268 is a portion of the catch wall 266 which protrudes rearwardly from the rest of catch wall 266. Front lead-in 268 guides the front post 410 of the cassette 400 into the divot 272 during front cassette installation. Front lead-in 268 also forms the top portion of divot 272. Mounting hole 270 is disposed on the front-most portion of the beam portion 264 of cassette flex beam 214. Mounting hole 270 is configured to mount the flex beam 214 on the cassette tray rail 240 or 242 when the flex beam 214 is assembled with the cassette tray rail 212. Cassette flex beam 214 may also be integrally formed with a cassette tray rail 212. If cassette flex beam 214 is integrally formed with cassette tray rail 212, mounting hole 270 is not necessary.

Figure 36A:
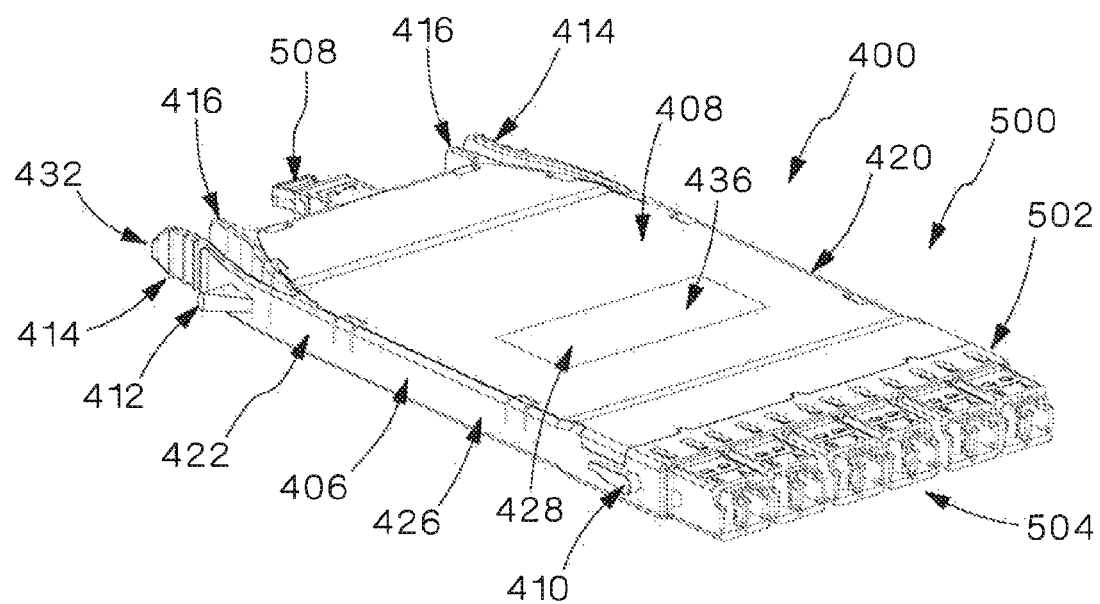
FIG. 36A is an isometric view of an LC-MPO cassette in an upright first position.
Figure 36B:
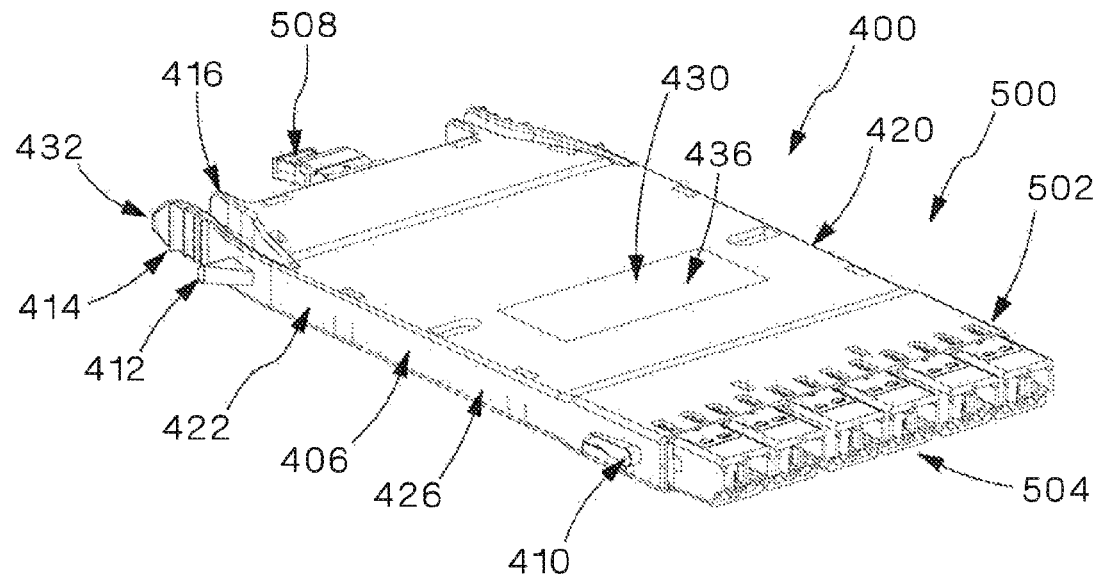
FIG. 36B is an isometric view of an LC-MPO cassette in an upside down second position.
Figure 37:
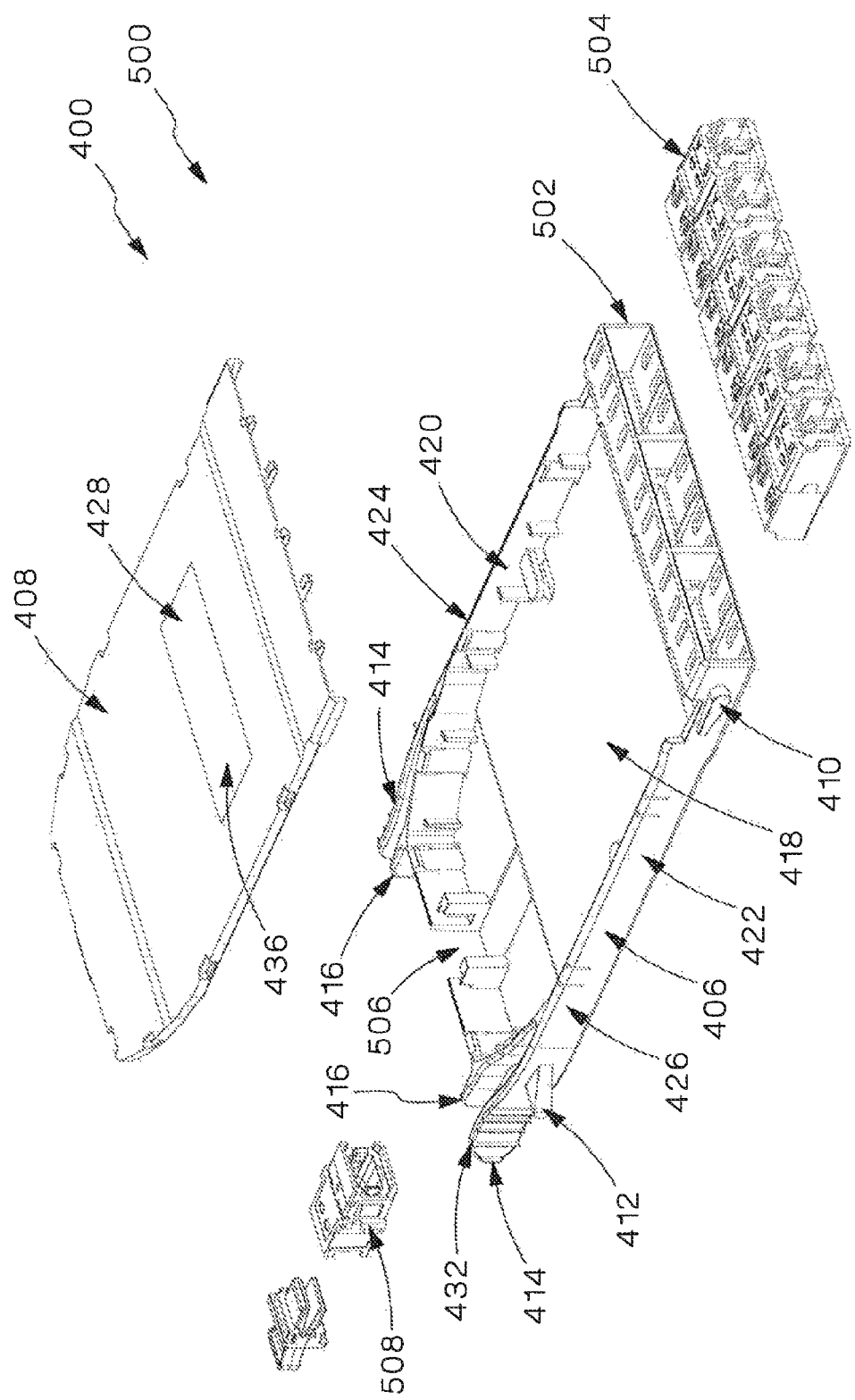
FIG. 37 is a partially exploded isometric view of an LC adapter cassette.
Figure 38:
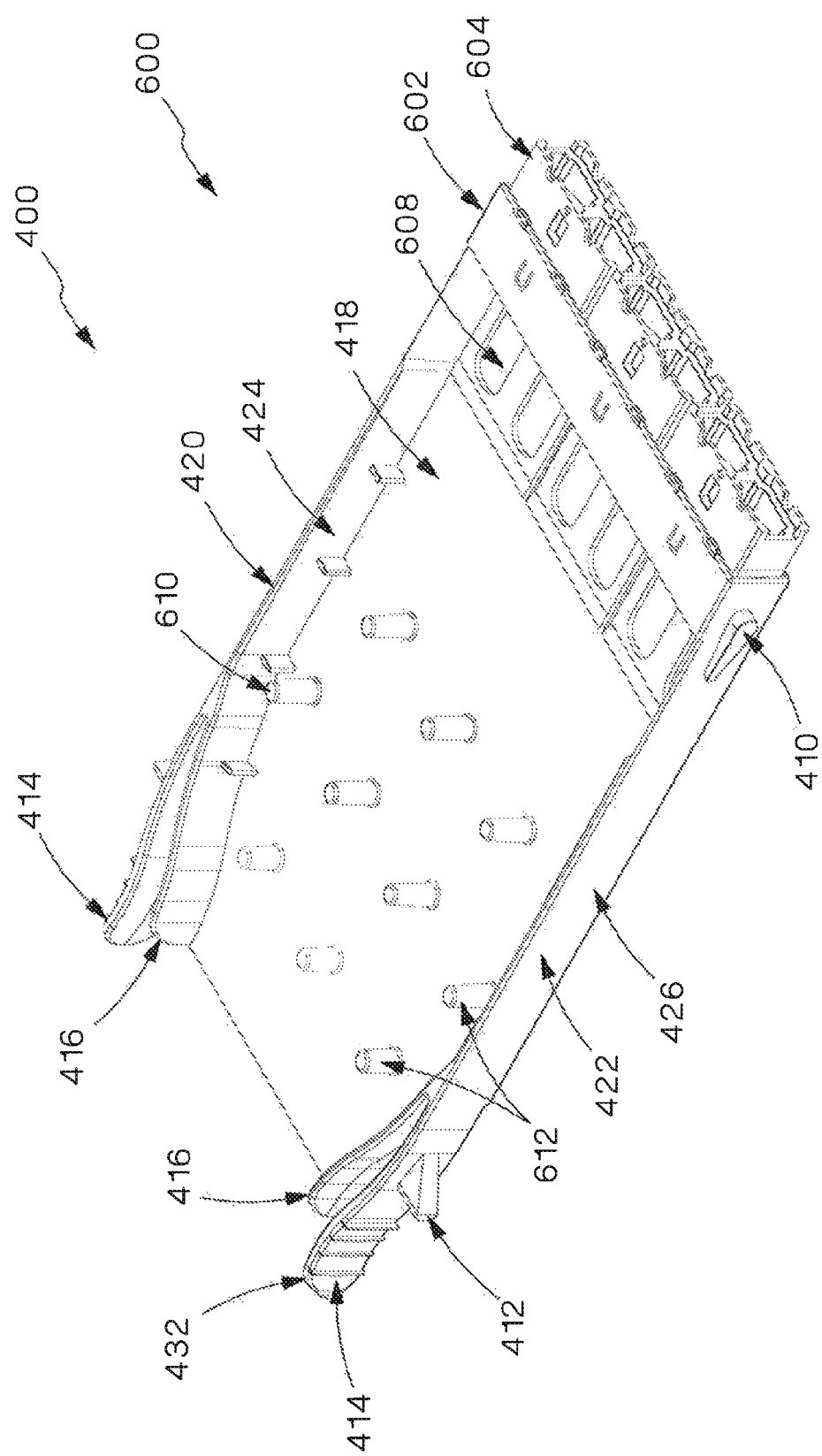
FIG. 38 is an isometric view of an MPO fiber adapter panel.
Figure 39:
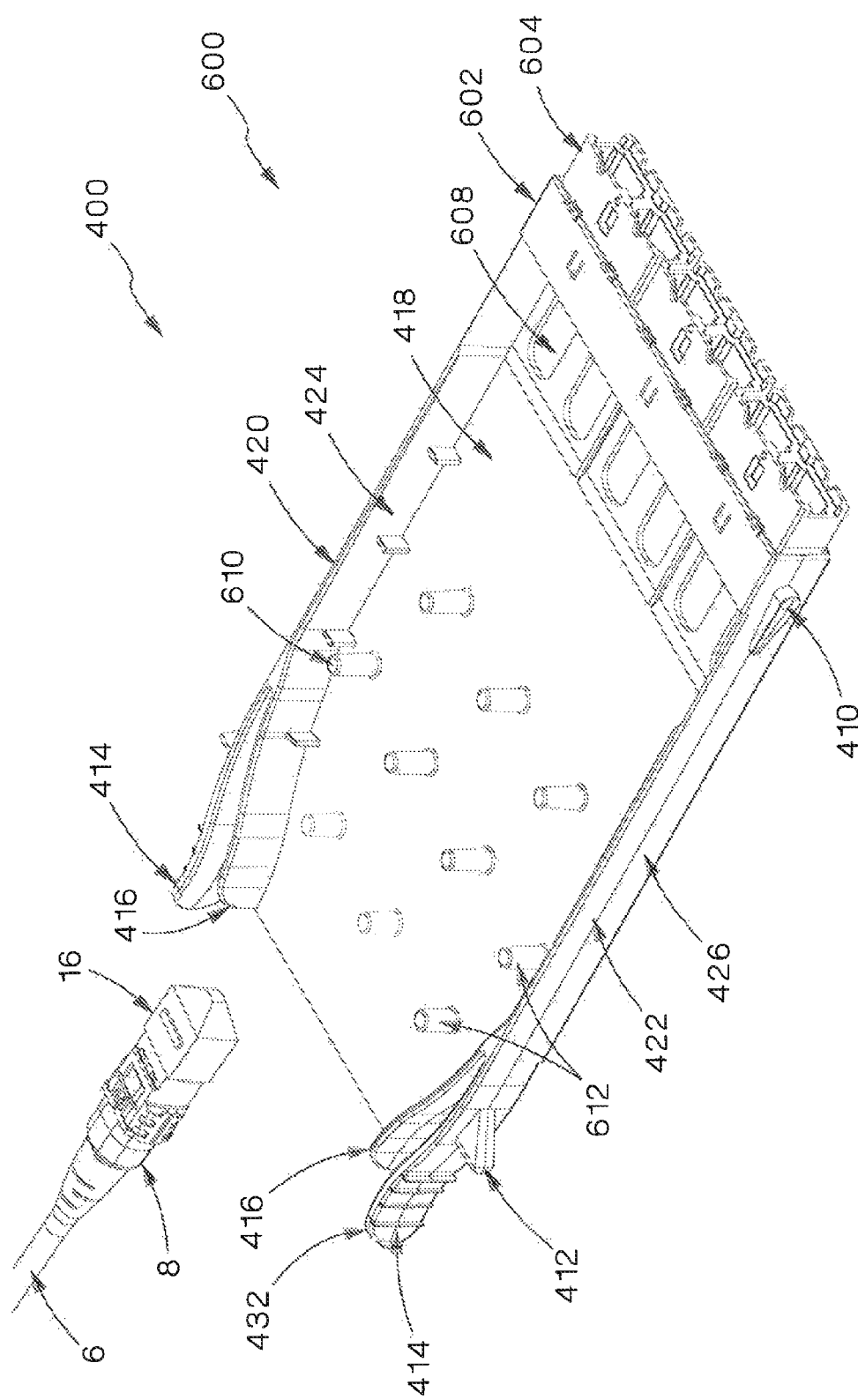
FIG. 39 is an isometric view of the MPO fiber adapter panel of FIG. 38 and advancing trunk cable furcation leg to be installed into the MPO fiber adapter panel.

Two different types of cassettes 400 are disclosed for use with the high density fiber enclosure system 2, an LC-MPO cassette 500 (FIGS. 36A, 36B and 37) and an MPO fiber adapter panel ("herein after "MPO FAP") 600 (FIGS. 38, 39, 40, and 41), although other types of cassettes 400 may also be used. Cassettes 400 used with the high density fiber enclosure system 2 may have a cassette body 406, a cassette cover 408, cassette front posts 410, cassette rear posts 412, cassette rear post release latches 414, and cassette rear release latch stops 416. Cassette body 406 is of generally rectangular shape, and has a base 418, right side 420, and left side 422. Right and left sides 420 and 422 have a right wall 424 and left wall 426, respectively, and are attached at a generally 90 degree angle to base 418 at the right and left sides 420 and 422 of base 418. A cassette cover 408 is provided which extends parallel to the base 418 of the cassette body 406 from the right wall 424 to the left wall 426. Cassette cover 408 is provided to protect the components of cassette 400. Cassette 400 may also include top side indicator 428 and bottom side indicator 430. Top side indicator 428 is disposed on the outside portion of cassette cover 408 and indicates that, when visible as viewed from above an installed cassette 400, the cassette 400 is disposed in an upright first position (see FIG. 36A). Bottom side indicator 430 is disposed on the outside portion of cassette body 406 and indicates that, when visible as viewed from above an installed cassette 400, the cassette 400 is disposed in an upside down second position (see FIG. 36B). Top side indicator 428 and bottom side indicator 430 may be comprised of raised embossing, a plate or label attached to the cassette 400, a painted area, or any other form of marking. Top side indicator 428 and bottom side indicator 430 may be a word, number, phrase, symbol, or combination thereof sufficient to inform the user whether the cassette 400 is in the upright first position or upside down second position. Alternatively, a recess 436 may be provided on the top and bottom sides of cassette 400 to allow a user a location to affix his or her own label to both sides of cassette 400. Recess 436 may be of any shape, but is preferably of a rectangular shape.

As described above, cassette front posts 410 are designed to interact with the cassette tray rail front post stop areas 234 such that at the installed position, the cassette front posts 410 rest inside the cassette tray rail front post stop areas 234 and are blocked from forward movement by a catch wall 266 of cassette flex beam 214 located in the cassette tray rail front post stop area 234. Cassette rear posts 412 are designed to interact with the cassette tray rail rear post stops 238 in the cassette installed position. At the cassette installed position the cassette rear posts 412 are maintained inside the cassette tray rail rear post stops 238 blocking rearward and upward movement of the cassette 400.

Shown in FIGS. 36A, 36B, 37, 38, 39, 40, and 41, cassette rear post release latches 414 are designed to disengage the cassette rear posts 412 from the cassette tray rail rear post stops 238 when a user desires to uninstall a cassette 400. Cassette rear post release latches 414 are preferably comprised of a protrusion 432 from the rear of cassette rear post 412 and an opening 434 between the body of the cassette 400 and the rear post 412. Cassette rear post release latches 414 are comprised of a resilient material which allows the rear post 412 to flex inwardly when pressure is placed on cassette rear post release latches 414. When a user desires to uninstall a cassette 400, the user places inwardly directed pressure on cassette rear post release latch 414. The cassette rear post 412 then travels inwardly and disengages with the cassette tray rail rear post stop 238. Cassette 400 may then be removed from the cassette tray 200. Cassette rear post release latch stop 416 is disposed on the body of the cassette 400 in a position to engage with the cassette rear post release latch 414 when inwardly directed pressure is placed on cassette rear post release latches 414. The cassette rear post release latch stop 416 is positioned to allow the cassette rear post 412 to travel a sufficient distance in the inward direction to disengage from the cassette tray rail rear post stop 238 while blocking the cassette rear post 412 from over traveling in the inward direction. Blocking over travel of cassette rear post 412 in the inward direction may minimize unnecessary material fatigue and/or the failure of cassette rear post release latch 414, prolonging the useable life of cassette 400. Cassette rear post release latch stop 416 may be comprised of a post or other protrusion extending from the body of the cassette 400. Alternatively, cassette rear post release latch stop 416 may be part of the body of the cassette 400.

As noted above, at least two different types of cassettes 400 may be used in the high density fiber enclosure system 2—LC-MPO cassettes 500 (FIGS. 36A, 36B and 37) and MPO FAP 600 (FIGS. 38, 39, 40, and 41). In addition to the cassette features described above, LC-MPO cassettes 500 also include a front LC mounting face 502, shuttered LC adapters 504, rear MPO mounting window 506, and an MPO trunk adapter 508. The front LC mounting face 502 is located on the front portion of LC-MPO cassette 500 and provides a location for mounting shuttered LC adapters 504. Shuttered LC adapters 504 are standard adapters known and used in the art for connecting patch cords 4 within data management centers, for example, shuttered LC adapters. Alternatively, for example, shuttered LC adaptors or non-shuttered LC adaptors may be used. Front LC mounting face 502 provides space for up to 6 shuttered LC adapters 504. MPO trunk adapter 508 is located at the rear of cassette body 406 and connects to trunk cable furcation legs 6 which each include a dust cap 16. Dust caps 16 are removed from trunk cable furcation legs 6 prior to installation of trunk cable furcation legs 6 in MPO trunk adapters 508. MPO trunk adapters 508 are standard adapters known in the art, for example Panduit's SC style simplex form adapter. Rear MPO mounting windows 506 are located on the rear portion of cassette body 406 and each provide a location on the cassette body 406 for mounting MPO trunk adapters 508 to the cassette body 406. In one embodiment, four MPO mounting windows 506 are located on the cassette body 406 which allows up to four MPO trunk adapters 508 to be mounted on cassette body 406.

As an alternative to LC-MPO cassettes 500 (or other types of cassettes 400), MPO FAP 600 may be used as shown in FIGS. 38, 39, 40, and 41. In addition to the cassette features described above, MPO FAP 600 also include a front MPO mounting face 602, MPO patch cord adapters 604, bottom window 608, and population feature 610. Front MPO mounting face 602 is located on the front portion of cassette body 406 and provides a location for mounting up to six MPO patch cord adapters 604. MPO patch cord adapters 604 are configured to connect patch cords 4 with the cassette 600. Up to six MPO patch cord adapters 604 provide a location for connecting up to six trunk cable furcation legs 6 which each have a dust cap 16. Dust cap 16 is removed from trunk cable furcation legs 6 prior to installing trunk cable furcation legs 6 into MPO patch cord adapters 604. Bottom windows 608 are disposed on the cassette body base 418 just behind the front MPO mounting face 602. Bottom windows 608 allow a user to access the MPO trunk cable furcation legs 6 from the top and bottom to allow a user to connect or disconnect trunk cable furcation legs 6 to and from MPO trunk adapters 604.

As shown in FIGS. 38-41, population feature 610 provides a trunk cable furcation legs 6 capture and routing system for installing, adding, or changing trunk cable furcation legs 6 attached to MPO trunk adapters 604 in an MPO FAP 600. Population feature 610 is comprised of a plurality of rows of offset pegs 612 disposed on the base 418 of the MPO FAP 600. Pegs 612 may be of any shape, including cylindrical, triangular, rectangular, etc. Preferably, three to four pegs 612 are provided in each row. When installing a trunk cord 6, the user routes the trunk cable furcation legs 6 through the rows of pegs 612. The offset nature of the rows of pegs 612 loosely holds the trunk cable furcation legs 6 in position while cassette 600 is translated via the movement of the cassette tray 200 to the cassette remove or addition position. Once cassette tray 200 is in the cassette remove or addition position, the MPO connector 8 is disengaged from the pegs 612 and trunk cable furcation legs 6 are extended to reach the MPO trunk adapters 604, at which point the MPO connector dust cap 16 may be removed. Then the trunk cable MPO Connectors 8 are connected to MPO trunk adapters 604; the trunk cable furcation legs 6 may remain routed through the rows of pegs 612.

Figure 42:
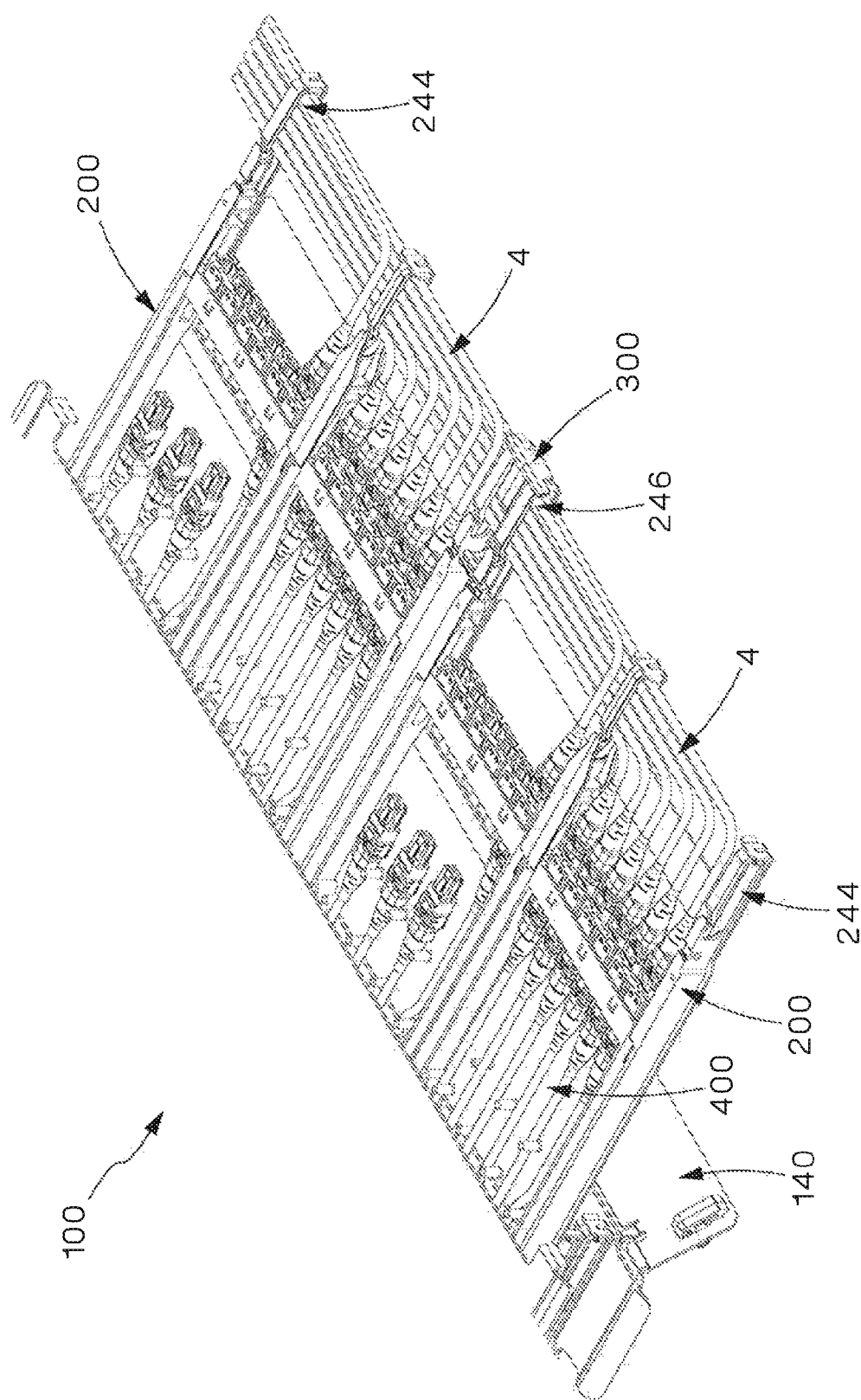
FIG. 42 is an isometric view of a chassis applying a unidirectional patch cord routing scheme in accordance with an embodiment of the present invention.
Figure 43:
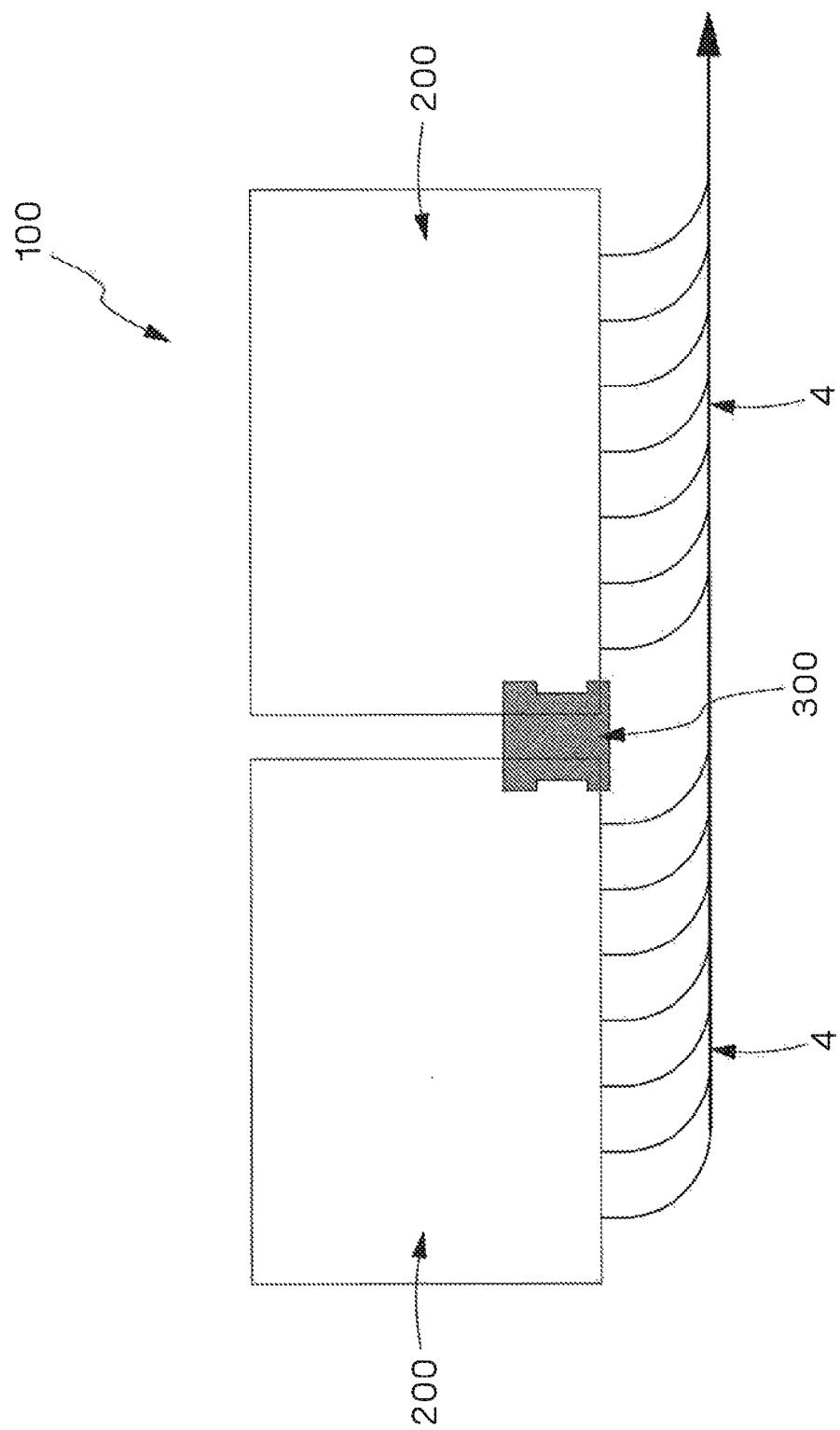
FIG. 43 is a plan view which illustrates a unidirectional patch cord routing scheme schematically.
Figure 44:
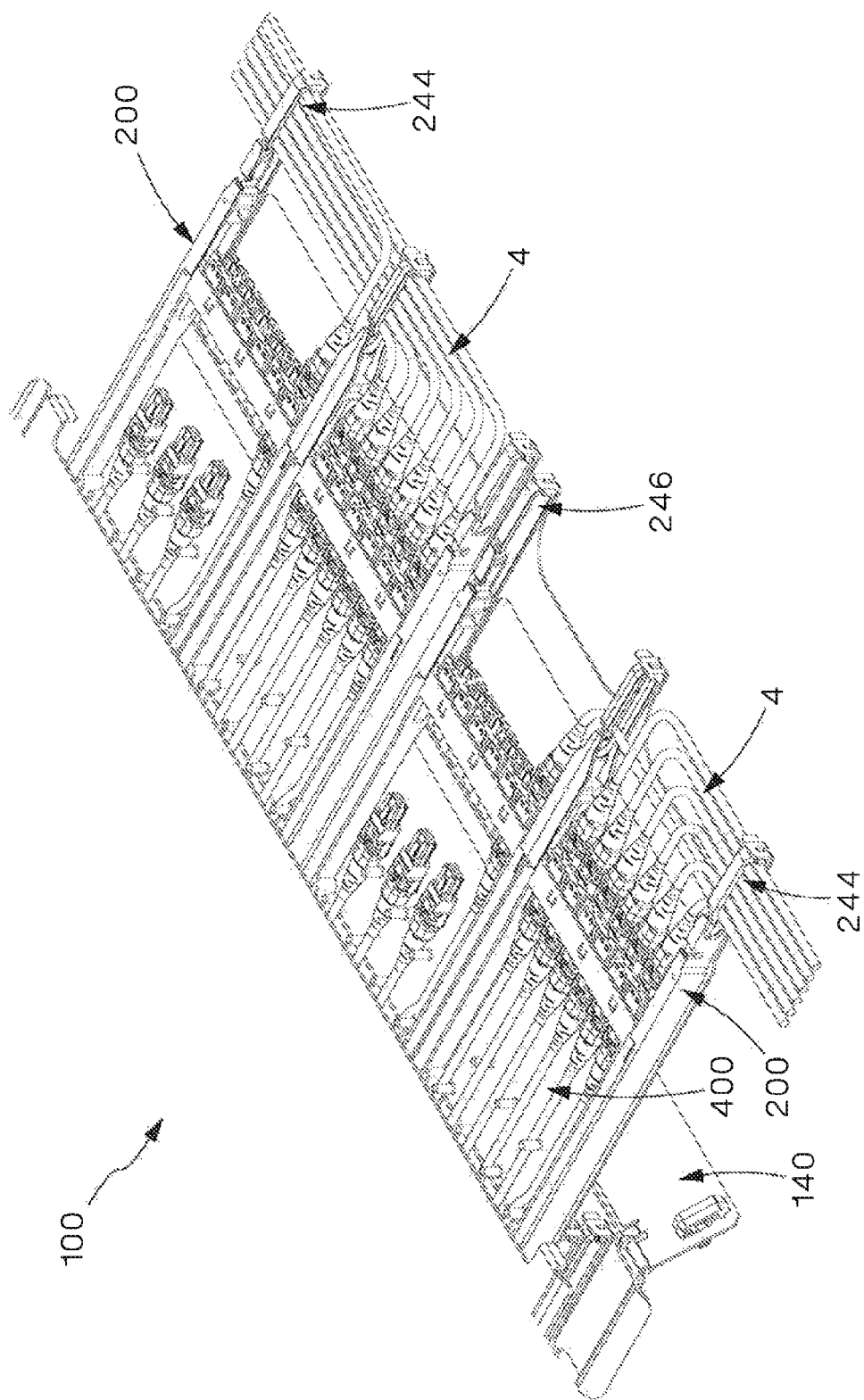
FIG. 44 is an isometric view of a chassis applying a split patch cord routing scheme in accordance with another embodiment of the present invention.
Figure 45:
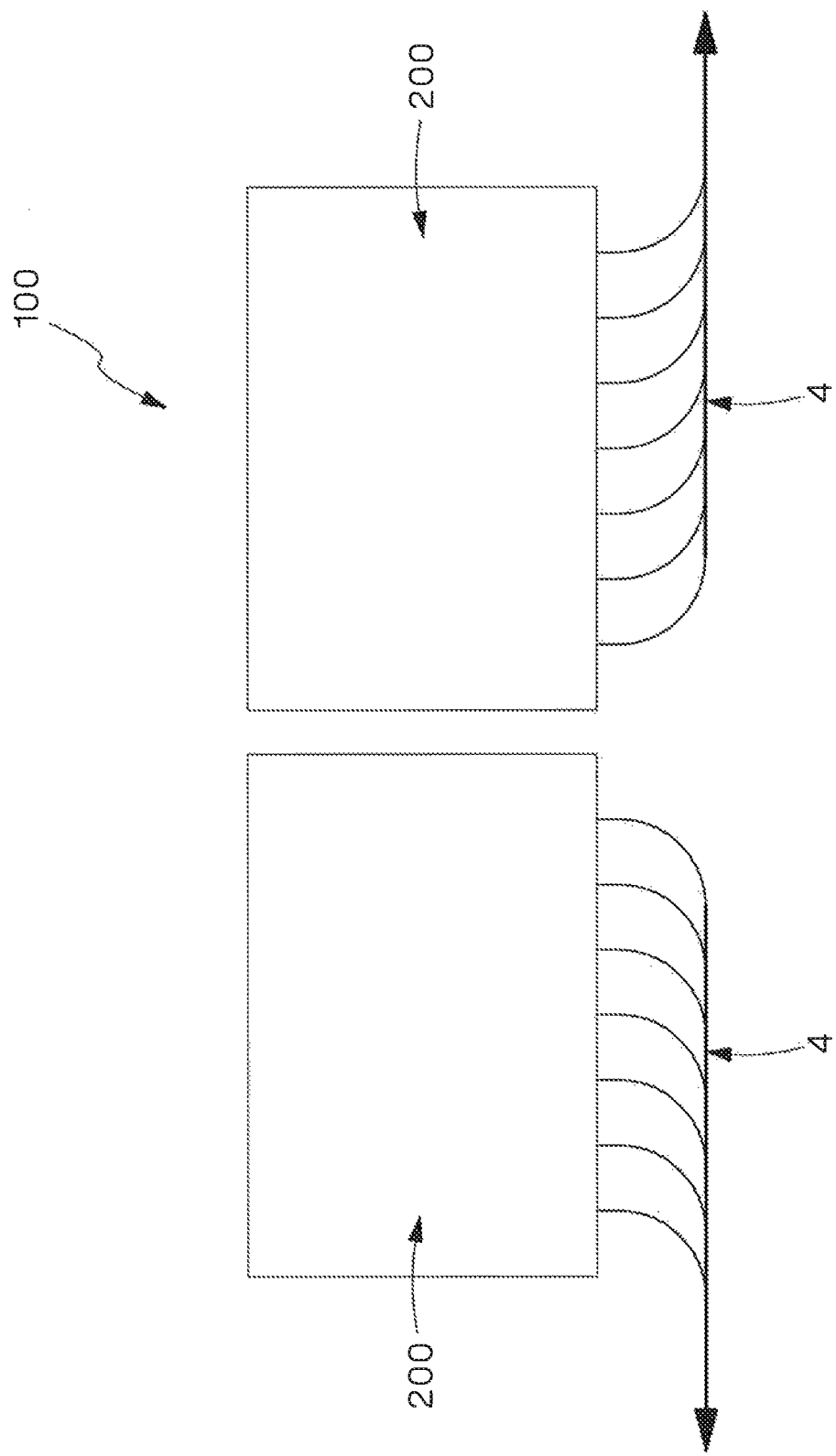
FIG. 45 is a plan view which illustrates a split patch cord routing scheme schematically.

FIGS. 42, 43, 44, and 45 illustrate multiple embodiments of cable management within the cassette trays 200. FIG. 42 illustrates a unidirectional cable management scheme in which the patch cables 4 are routed through the front patch cord management loops 244 in one direction. As shown in FIGS. 42 and 43, a unification clip 300 is typically installed when using a unidirectional scheme. FIG. 43 illustrates an overhead view of cable flow as shown in FIG. 42. FIG. 44 illustrates a split routing cable management scheme in which the patch cables 4 are routed through the front patch cord management loops 244 in two separate directions. Specifically, as shown in FIG. 44, the patch cables 4 exiting a cassette tray 200 installed on the left side of a chassis 100 are routed to the left of the chassis 100, and patch cables 4 exiting a cassette tray 200 installed on the right side of a chassis 100 are routed to the right side of the chassis 100. FIG. 45 illustrates an overhead view of cable flow shown in FIG. 44.

Figure 46:
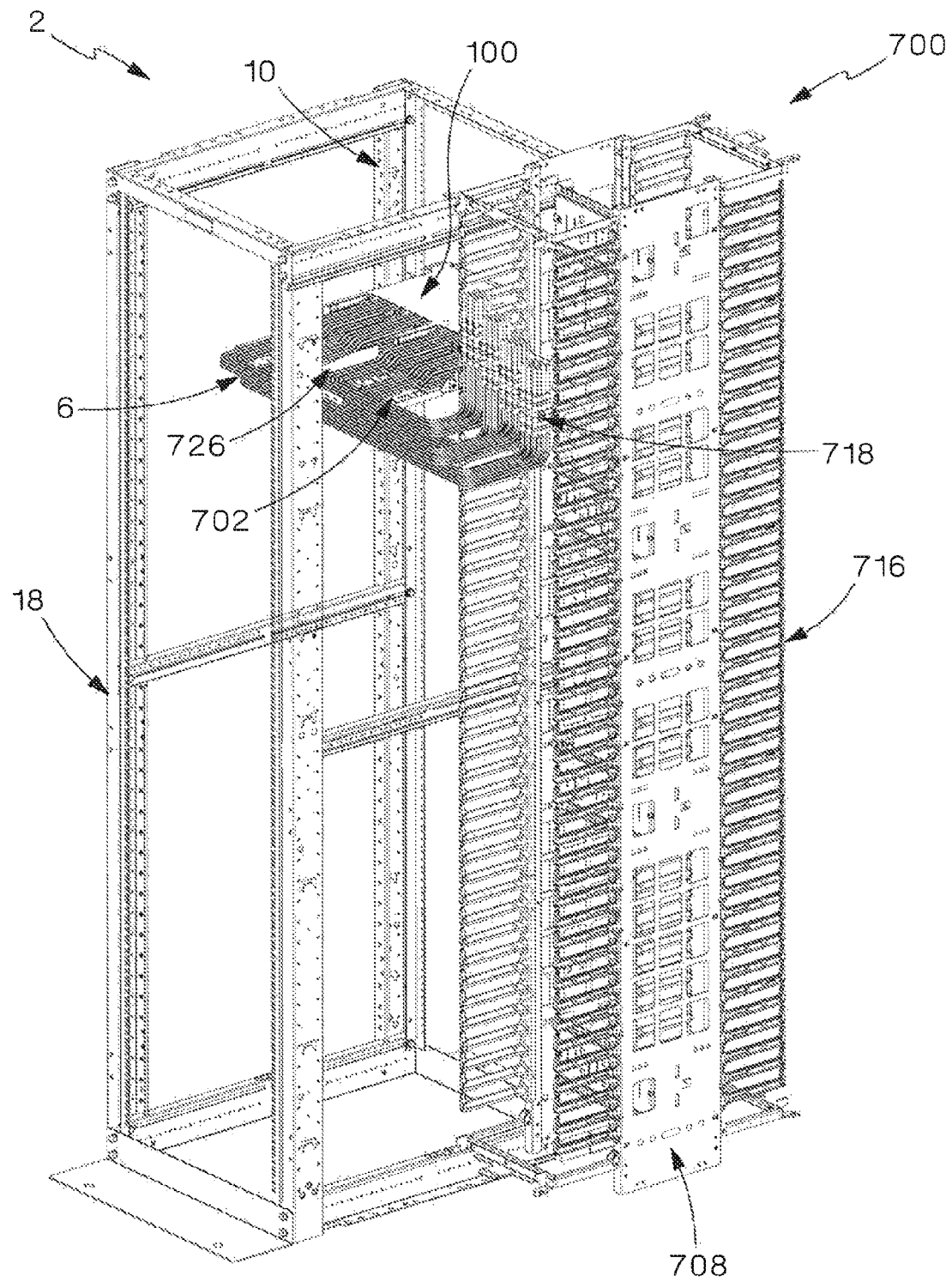
FIG. 46 is an isometric view of the trunk cable management system in accordance with an embodiment of the present invention.

As illustrated in FIG. 46, the high density fiber enclosure system 2 may also include a trunk cable management system 700. The trunk cable management system 700 includes a slack management plate 702 and a vertical cable manager 708.

As illustrated in FIG. 46 (as well as FIGS. 1-5), the slack management plate 702 is mounted to a chassis 100 by attaching the front most portion of the slack management plate 702 to the rear most portion of the left and right side walls of the chassis 108 and 110 using spring loaded fasteners 706 and support pin 724 (shown in FIG. 20). The support pin 724 is connected to the slack management plate 702 such that the slack management plate 702 may be rotated about the support pin 724. The spring loaded fasteners 706 secure the slack management plate 702 to the left and right side walls of the chassis 108 and 110. The slack management plate 702 provides a relatively level surface upon which the portion of trunk cable furcation legs 6 which exit the chassis 100 may rest to reduce the strain upon the trunk cable furcation legs 6. In addition, the slack management plate 702 allows for management of trunk cable furcation legs 6 slack which is adequate to allow full extension of cassette trays 200 to further reduce the strain upon the trunk cable furcation legs 6. The slack management plate 702 preferably includes cutouts 704 which allow the pins, fasteners, separators, cable ties, and/or other features for removably and securely organizing the trunk cable furcation legs 6 as they rest upon the slack management plate 702. Cutouts 704 may be of any shape, but as shown in FIGS. 1-5 they are preferably of a square or rectangular shape. Preferably the trunk cable furcation legs 6 installed on one cassette 400 may be disposed on one side of divider 726 and the trunk cable furcation legs 6 installed in the other cassette 400 may be disposed on the other side of divider 726. A slack management plate 702 is preferably mounted to each chassis 100.

Figure 47:
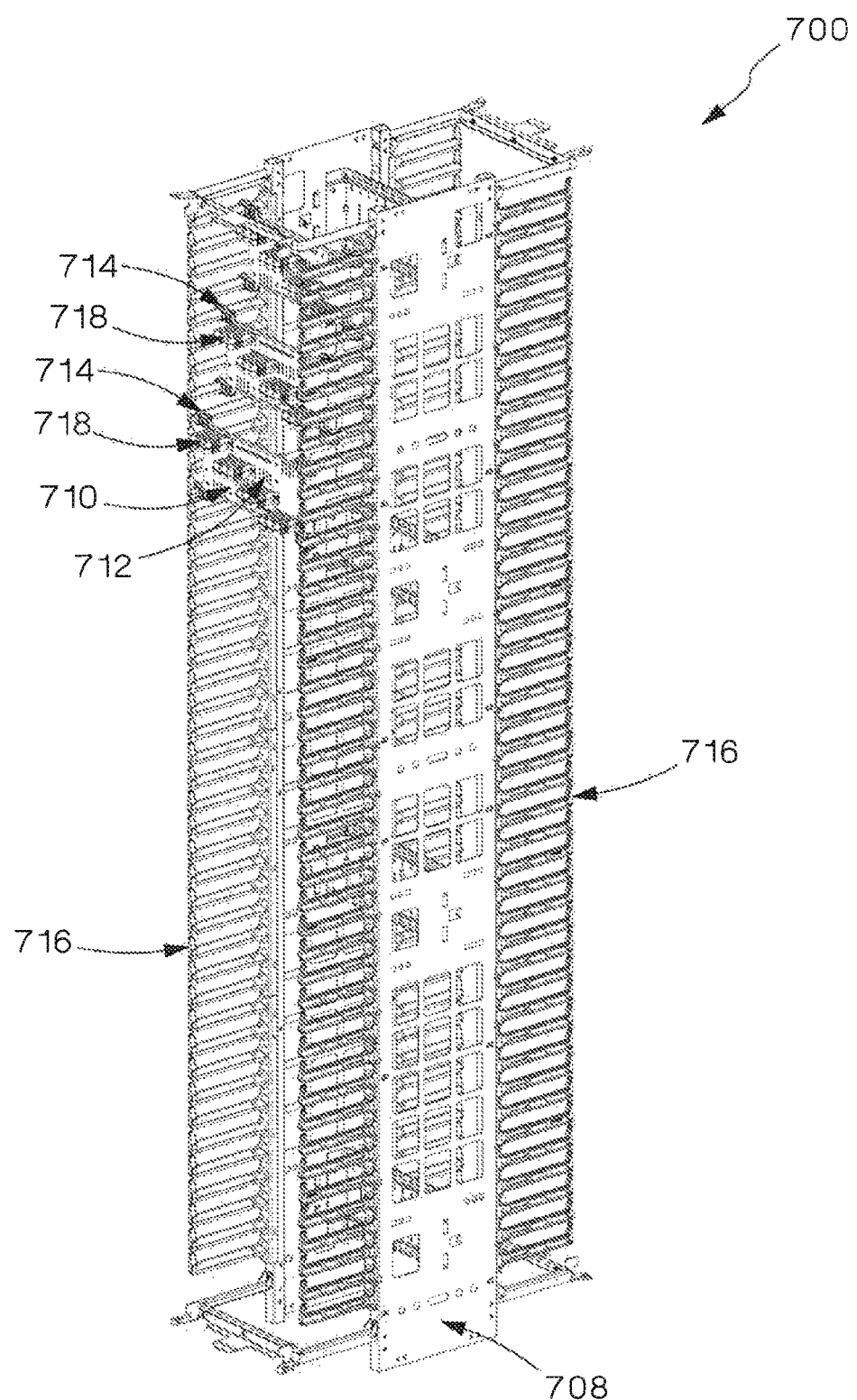
FIG. 47 is an isometric view of the vertical cable manager.
Figure 48:
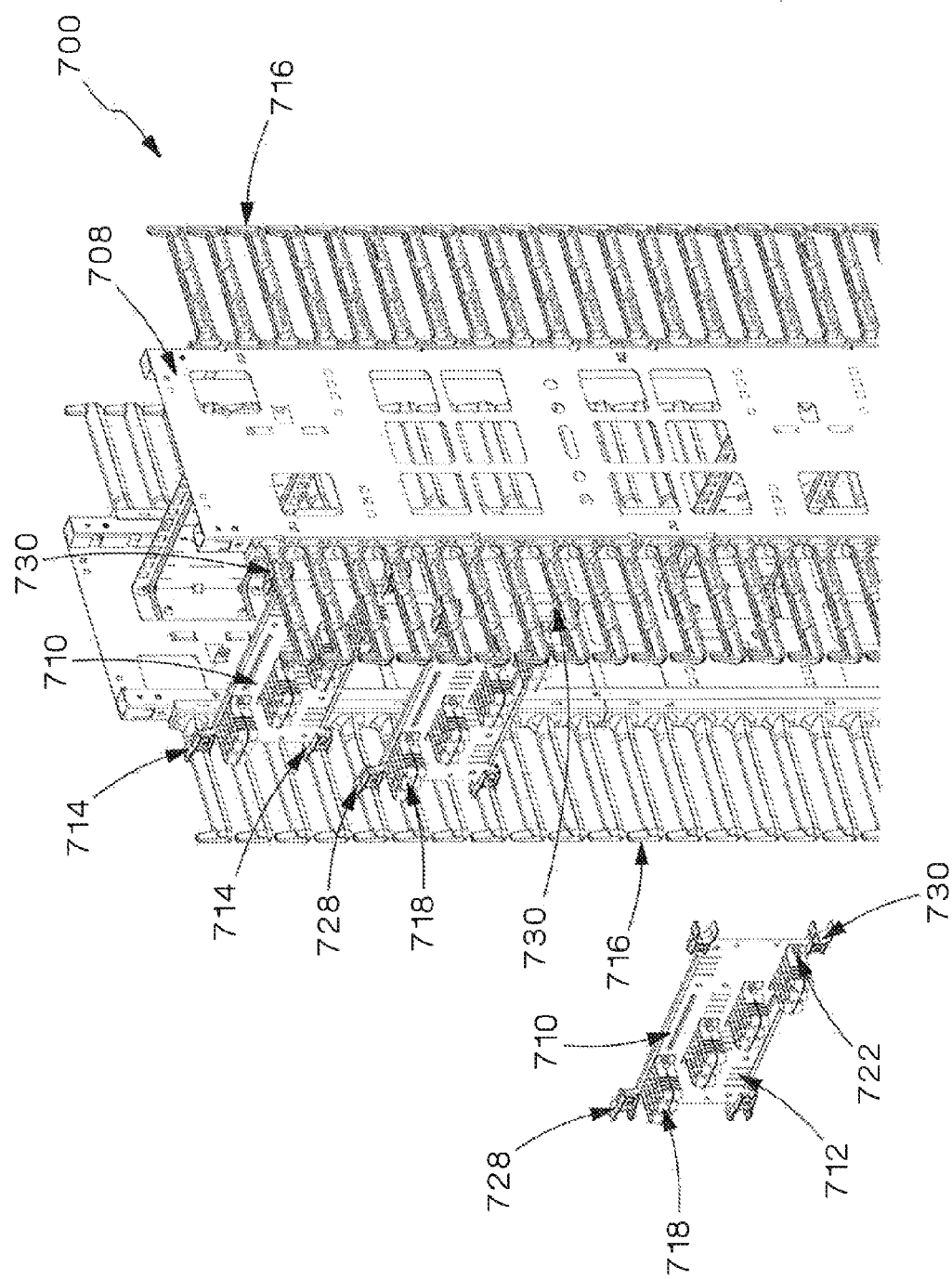
FIG. 48 is a partial, partially exploded isometric view of the vertical cable manager of FIG. 47.
Figure 49:
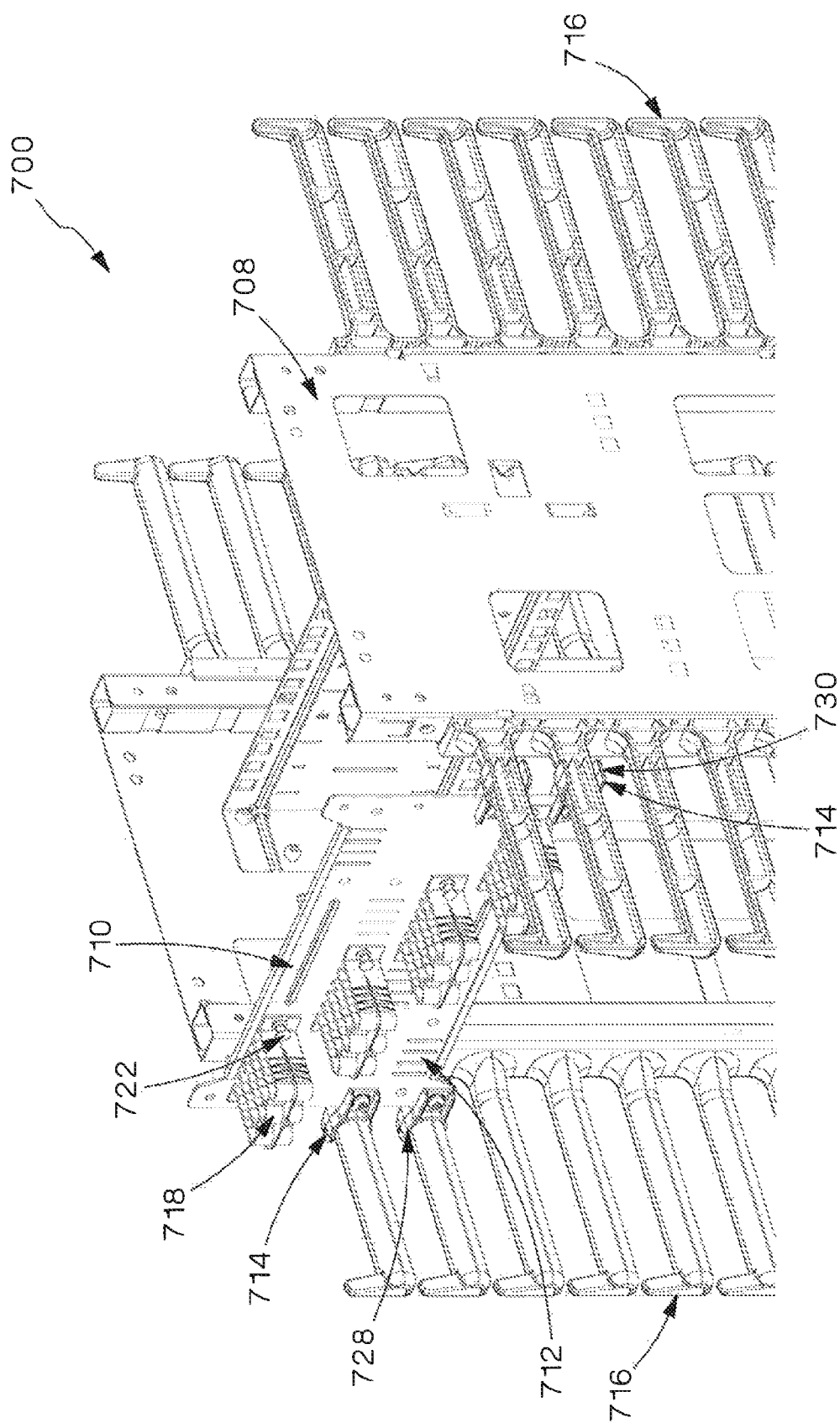
FIG. 49 is a partial isometric view of the vertical cable manager of FIG. 47.
Figure 50:
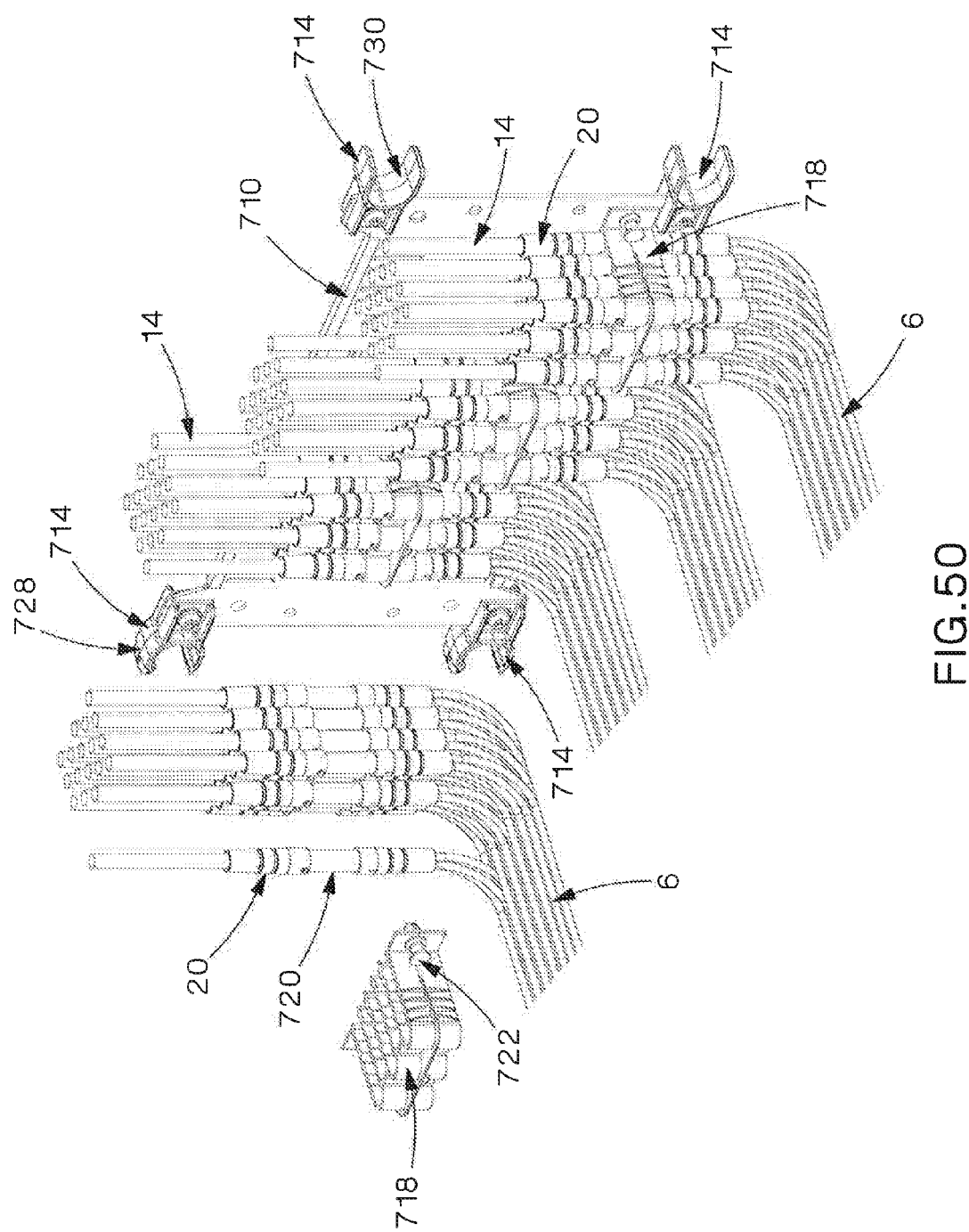
FIG. 50 is an isometric view of a transition management panel with transition bundling clips.
Figure 52:
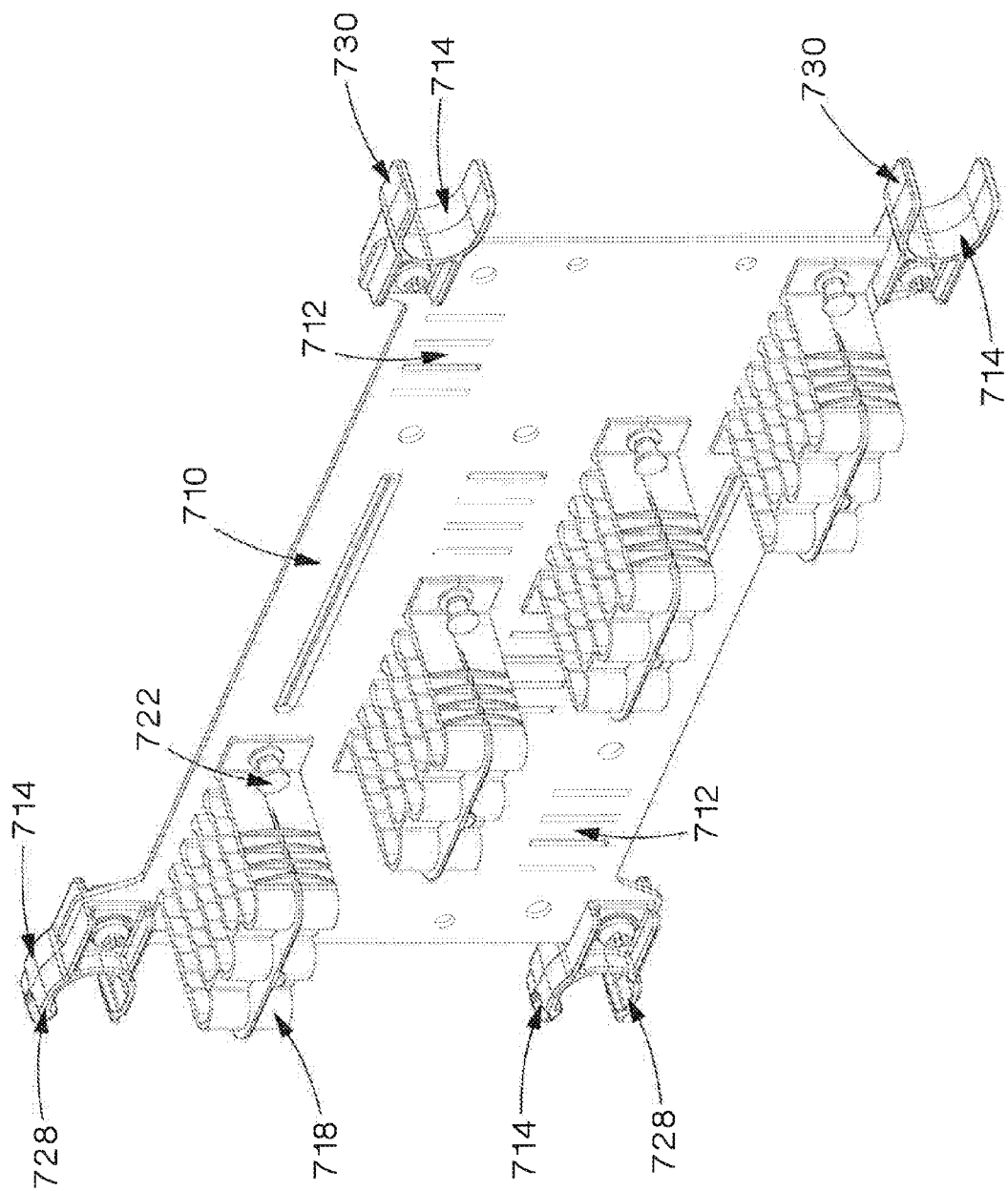
FIG. 52 is an isometric view of a transition management panel with transition bundling clips installed.

As shown in FIGS. 46, 47 and 48, the vertical cable manager 708 is mounted to the side of the high density fiber enclosure system 2 and provides structure for organizing and reducing the strain upon the trunk cables 14 and trunk cable furcation legs 6. The vertical cable manager 708 consists of transition management panels 710 with attachment points 712 and panel attachment clips 714, cable management fingers 716, and transition bundling clips 718 with transition indentations 720 and bundling clip fasteners 722. As shown in FIG. 49, transition management panels 710 are mounted on the trunk cable management system 700 such that they are generally perpendicular and offset to the slack management plates 702. The transition management panels 710 include attachment points for transition bundling clips 712. As shown in FIG. 52, attachment points for transition bundling clips 712 are slots configured within the transition management panels 710 such that transition bundling clips 718 securely engage transition management panels 710, or allow pins, fasteners, separators, cable ties, and/or other features for removably and securely organizing the trunk cables 14 or trunk cable transitions 20. A plurality of attachment points 712 are preferably disposed on each transition management panel 710, and attachment points 712 are preferably arranged in a number of rows of multiple attachment points 712 such that transition bundling clips 718 may be attached in a staggered fashion to transition management panel 710. Panel attachment clips 714 are generally located at each corner of generally rectangular shaped transition management panels 710 and are configured such that the transition management panels 710 are securely affixed to cable management fingers 716.

As shown in FIGS. 47, 48, and 49, cable management fingers 716 protrude from the vertical cable manager 708 toward the front and rear of chassis 100. The cable management fingers 716 preferably include a perpendicular portion at the end of the fingers 716 furthest from chassis 100 to more securely confine cables. Transition management panels 710 are preferably mounted upon cable management fingers 716 such that each panel attachment clip 714 of each transition management panel 710 is disposed on a different cable management finger 716. The transition management panels 710 can be secured to the cable management fingers 716 at any point along the length of the cable management fingers 716, which allows a user to stagger the cable management panels 710 such that some transition management panels 710 are located closer to the vertical cable manager 708 than other transition management panels 710. This allows a greater number of trunk cables 14 and trunk cable furcation legs 6 to be better managed in a smaller area with less strain to the trunk cables 14.

Figure 51:
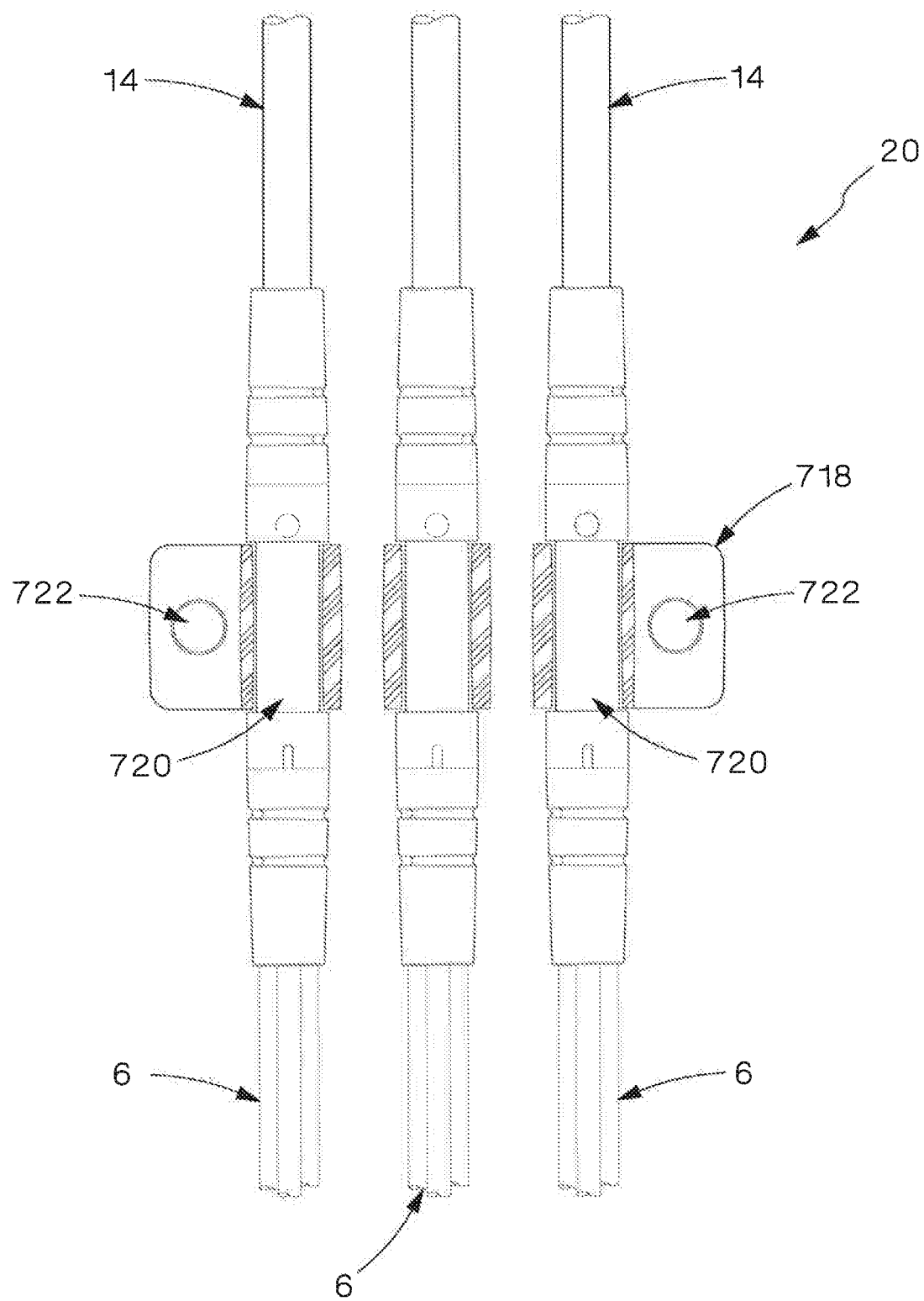
FIG. 51 is plan view of the transition bundling clips.

As shown in FIGS. 47, 48, 49, and 50 transition bundling clips 718 are mounted upon transition management panels 710 via attachment points 712. As shown in FIG. 51, transition bundling clips 718 include a transition indentation 720. The transition indentation 720 is preferably disposed within trunk cable transition 20 between trunk cables 14 and trunk cable furcation legs 6 such that the trunk cable transition 20 is securely housed within transition indentation 720 and strain upon the transition is reduced or eliminated.

Figure 53:
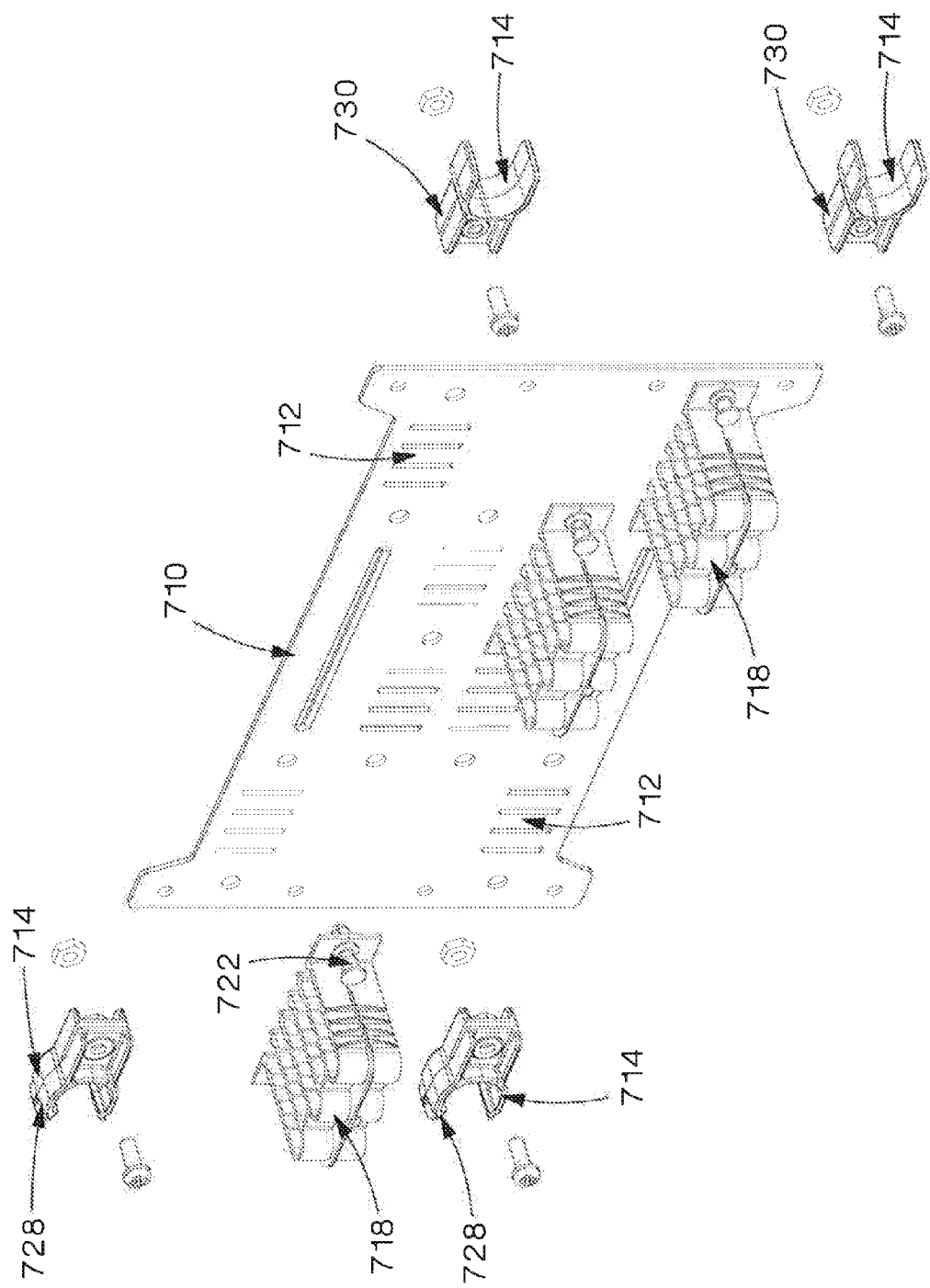
FIG. 53 is a partially exploded isometric view of the transition management panel of FIG. 52.

As shown in FIGS. 52 and 53, panel attachment clips 714 are preferably one of two types of clips—snap fit panel attachment clips 728 or loose fit panel attachment clips 730. Preferably two snap fit panel attachment clips 728 are located on one side of transition management panels 710 and two loose fit panel attachment clips 730 or snap fit panel attachment clips 728 are located on the other side of the transition management panel 710. As shown in FIGS. 54A and 54B, bundling clip fasteners 722 engage the transition bundling clips 718 and transition management panels 710 to securely affix the transition bundling clips 718 to a transition management panel 710.

Figure 55:
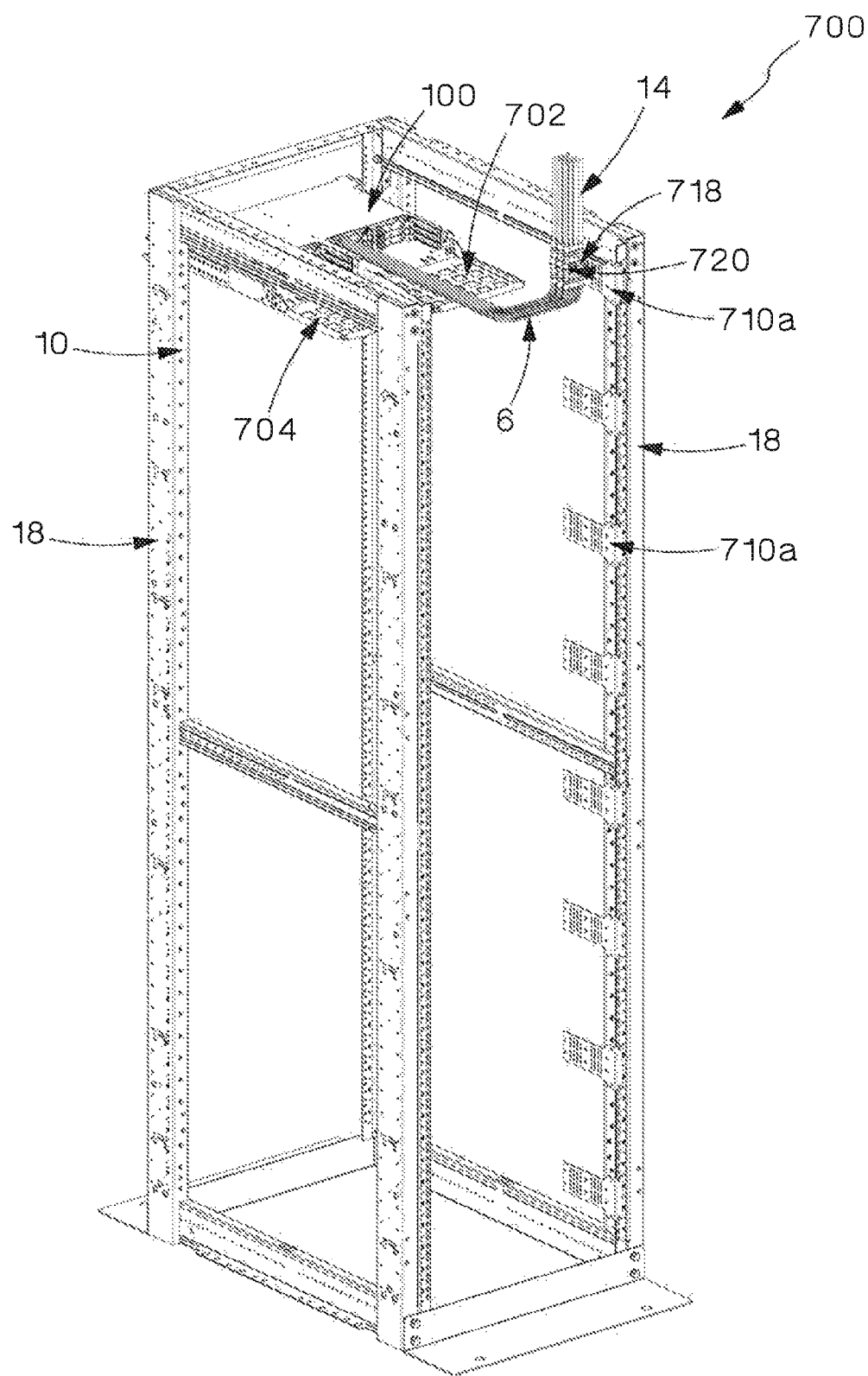
FIG. 55 is an isometric view of a second embodiment of the trunk cable management system.
Figure 56B:
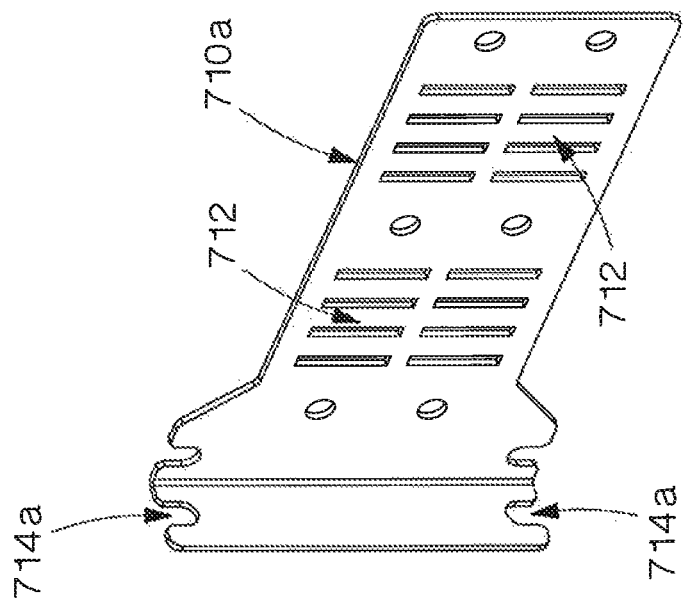
FIGS. 56A and 56B are isometric views of the second embodiment of the transition management panel.
Figure 56A:
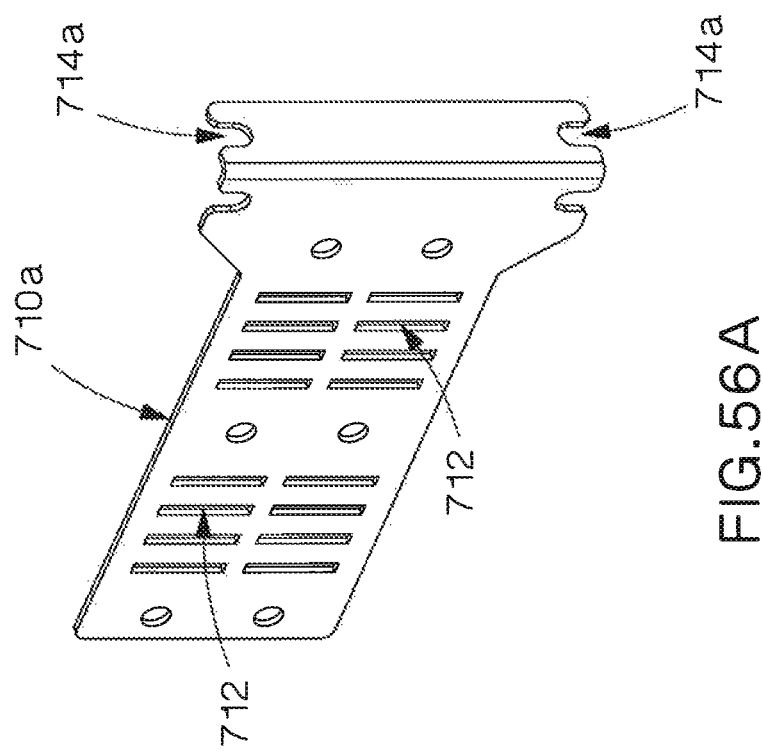

In another embodiment for managing trunk cables 14, trunk cable furcation legs 6, trunk cable transition 20, shown in FIG. 55, transition management panels 710a may be mounted upon the rack equipment rails 18 of the high density fiber enclosure system 2. As shown in FIGS. 56A and 56B, transition management panels 710a include attachment points 712 as well as slotted and cut openings 714a for securing the transition management panels 710a directly to the rack equipment rails 18. Transition management panels 710a may be mounted upon the rack equipment rails 18 of the high density fiber enclosure system 2 such that the transition management panels 710a extend along the side of the high density fiber enclosure system 2 or along the rear portion of high density fiber enclosure system 2. The user may secure the trunk cable transitions 20 between trunk cables 14 and trunk cable furcation legs 6 using transition bundling clips 718 which are mounted upon transition management panels 710a via attachment points 712 and secured with bundling clip fasteners 722. Alternatively, the user may secure the trunk cable transitions 20 upon transition management panels 710a through attachment points 712 with fasteners known in the art, for example hook and loop tape.

Use of the above features of the high density fiber enclosure system 2 will now be described.

To connect a chassis 100 to a high density fiber enclosure system 2, a user connects a rack mounting bracket 126, for example as shown in FIGS. 17, 18 and 19, to the chassis 100 via the countersink thru holes 128 with a chassis screw 130. Several rows of countersink thru holes 128 are provided to allow the user to select the appropriate countersink thru hole 128 that results in the alignment of the front of the chassis 100 with the front of the high density fiber enclosure system 2 in the installed position. The user inserts the chassis screw 130 into the countersink thru hole 128 and into the chassis 100 to attach the mounting bracket 126.

To mount the chassis 100 to the high density fiber enclosure system 2, for example as shown in FIG. 46, the user pre-installs screws into the retainment holes 10 disposed on the high density fiber enclosure system 2 without fully tightening the screws. The user hooks the rack mounting bracket 126 onto the pre-installed screws via the slotted and cut openings 132, as shown in FIGS. 18 and 19 for example, and allows the chassis 100, which is attached to the mounting bracket 126, to rest in a generally horizontal position on the slotted and cut openings 132. Once the chassis 100 is in the desired position, the user then tightens pre-installed screws to secure the chassis 100 into the high density fiber enclosure system 2.

A user may load cassettes 400 into the cassette trays 200 of the chassis 100 from either the rear or front of the chassis 100. To load a cassette 400 into the chassis 100 from the rear of the chassis 100, a user may insert the cassette 400 into a right or left cassette bay 218 or 220, for example as shown in FIG. 28, with the front portion of the cassette 400—i.e. the portion of the cassette 400 nearest the cassette front posts 410—loaded into the cassette bay 218 or 220 first. Cassette front posts 410 are narrower than cassette rear posts 412 and therefore do not engage the rear post stops 238 as they pass the rear post stops 238. The user may advance the cassette 400 into the cassette bay 218 or 220 until the cassette rear post 412 engages with the rear post stops 238. When the cassette rear post 412 engages with the rear post stops 238, the cassette 400 cannot be advanced further into cassette bay 218 or 220. At the same time the cassette rear posts 412 engage the rear post stops 238, the cassette front posts 410 engage with the catch wall 266 of the cassette flex beam 214. The catch wall 266 of the cassette flex beam 214 holds the cassette front posts 410 such that they cannot be advanced further with respect to the cassette bay 218 or 220. The catch wall 266 of the cassette flex beam 214 may apply rearward pressure on the cassette front post 410 to insure the cassette rear posts 412 are securely engaged with rear post stops 238 and the cassette 400 does not rattle or otherwise move unintentionally. The user then may connect patch cords 4 and trunk cable furcation legs 6 to the cassette 400 as necessary. The user may also then route patch cords 4 and trunk cable furcation legs 6 as described below. Alternatively the user may install trunk cable furcation legs 6 into the cassette 400 prior to loading cassette 400 into cassette bay 218 or 220.

To load a cassette 400 from the front of the high density fiber enclosure 2, a user first advances the cassette tray 200 to the cassette addition or replacement position as described below. The user then inserts the cassette 400 into a right or left cassette bay 218 or 220, for example as shown in FIGS. 28 and 29, from the front of the chassis 100 with the rear portion—i.e. the portion of the cassette nearest the cassette rear posts 412—loaded into the cassette bay 218 or 220 first by placing the rear of the cassette 400 on the base 210 of the cassette tray 200 such that the cassette rear posts 412 are located between the front post stop areas 234 and rear post stops 238 of the cassette tray rails 212. The cassette 400 is slightly tilted upward such that the front portion of the cassette 400 is higher than the rear portion of the cassette 400. The user then advances the cassette 400 in the rearward direction, maintaining the tilt of the cassette 400 as the front portion of the cassette 400 is in a somewhat higher position than the rear portion of the cassette 400, until the rear posts 412 engage with the rear post stops 238. By maintaining the front portion higher than the rear portion of the cassette 400, contact with other equipment is minimized. The cassette 400 should clear any patch cords 4 that are connected to other cassettes 400 installed in the chassis 100 and routed through the cassette tray rail patch cord management loops 244. Once the rear posts 412 are seated against the rear post stops 238, the user applies downward pressure to the cassette 400 in the region of front posts 410. As downward pressure is applied, the cassette flex beam 214 flexes to allow front posts 410 to slip past the front lead-in 268 of the catch wall 266 and into engagement with the catch wall 266 of the cassette flex beam 214. The user then may connect patch cords 4 and trunk cable furcation legs 6 to the cassette 400 as necessary as well as route patch cords 4 and trunk cable furcation legs 6 as described below. Alternatively, a user may connect patch cords 4 prior to applying downward pressure to the cassette 400 to seat the front posts 410.

A user may also unload cassettes 400 from the cassette trays 200 of the chassis 100 from either the rear or front of the chassis 100. To unload cassettes 400 from the rear of the chassis 100, a user first disconnects the patch cords 4 from the front of the chassis 100, and then disconnects trunk cable furcation legs 6 from the rear of the chassis 100. The user then locates and applies inward pressure to the rear post release latches 414 on the cassette 400, for example as shown in FIGS. 36A, 36B, 37, 38, 39, 40, and 41. As inward pressure is applied to the rear post release latches 414, the latches 414 flex and rear posts 412 disengage with the rear post stops 238. As the user continues to apply inward pressure to the rear post release latches 414, the user pulls the cassette 400 toward the rear of the chassis 100 until the cassette 400 clears the chassis 100.

FIGS. 29, 30, and 31 illustrate unloading cassettes 400 from the front of chassis 100. To unload cassettes 400 from the front of the chassis 100, a user may first position the cassette tray 200 in the cassette addition or replacement position as described below. A user then disconnect patch cords 4 from the front of the chassis 100. The user may then apply upward pressure on the front portion of cassette 400 near the front posts 410, accessing cassette 400 through the cassette opening 222. The user applies enough upward pressure on the cassette 400 to cause the flex beam 214 to flex enough to allow front posts 410 to pass by the divot 272 of the catch wall 266 of the flex beam 214. Once the front posts 410 have cleared the front lead-in 268 of the catch wall 266 of the flex beam 214, the cassette 400 is tilted such that the front portion of the cassette 400 is higher than the rear portion of the cassette 400 as shown in FIG. 29. A user may then pull the cassette 400 toward the front of the chassis 100 until the cassette 400 clears the chassis 100, generally maintaining the tilt of cassette 400, as shown in FIG. 30. Once the trunk cable furcation legs 6 and MPO trunk adapters 508 or MPO FAP patch cord adapters 604 at the rear of cassette 400 are visible, a user may disconnect trunk cable furcation legs 6 from the MPO trunk adapters 508 or MPO FAP patch cord adapters 604 and cassette 400. As shown in FIG. 31, a user then preferably removes the cassette 400 by positioning the cassette 400 such that the rear posts 412 are level with front posts 410 so that the cassette 400 should clear any patch cords 4 that are connected to other cassettes 400 installed in the chassis 100 and routed through the cassette tray rail patch cord management loops 244, as described below.

Figure 40:
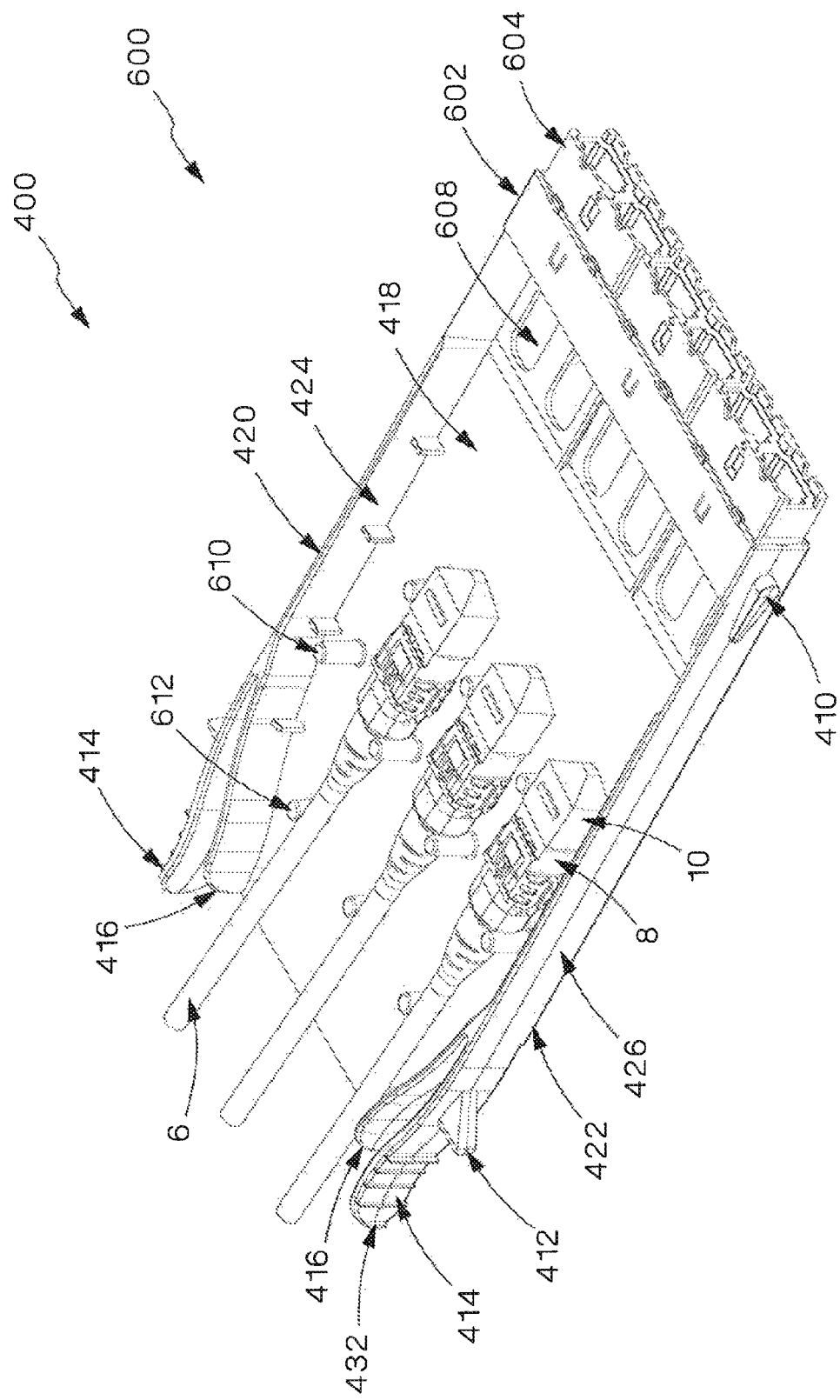
FIG. 40 is an isometric view of the MPO fiber adapter panel of FIG. 38 with three trunk cable furcation legs fixed between the population feature pegs of the MPO fiber adapter panel.
Figure 41:
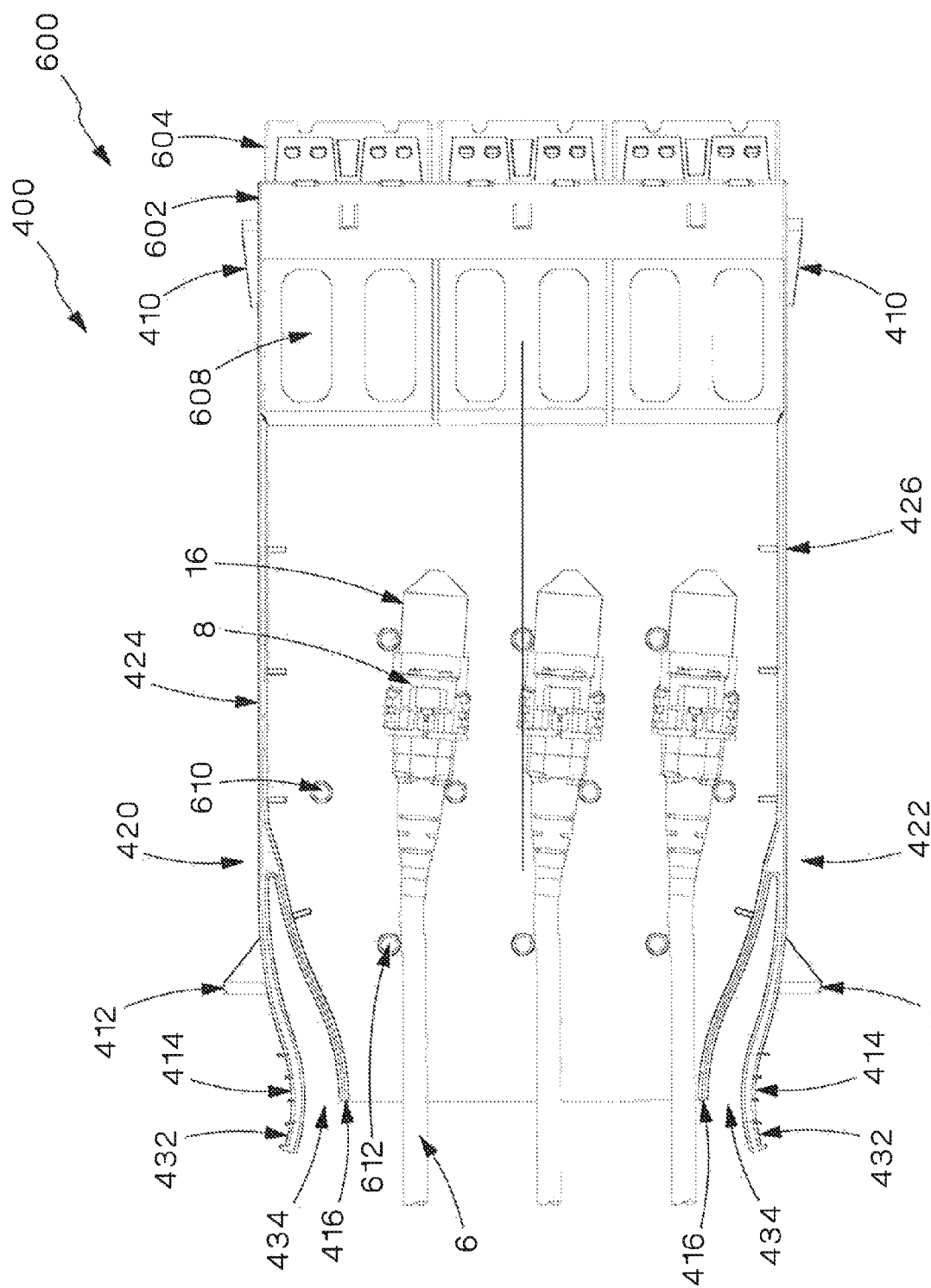
FIG. 41 is a plan view of the MPO fiber adapter panel of FIG. 40.

A user may also replace an LC-MPO cassette 500 with an MPO FAP 600. First, a user may follow the procedures for removing a cassette 400 above in order to remove the LC-MPO cassette 500. Next the user may connect the trunk cable furcation legs 6 to an MPO trunk adapter 604, and insert the new MPO FAP 600 following the instructions for installation of a cassette 400 from the front of the chassis 100 above. If the user desires to add additional trunk cable furcation legs 6 to the MPO FAP 600 (which allows for up to five additional trunk cable furcation legs 6 to attach to five additional MPO trunk adapters 604), the user may route the additional trunk cable furcation legs 6 through the rear of the cassette bay 218 or 220 into the MPO FAP 600 from the rear of the chassis 100. As discussed above, for example with reference to FIGS. 38-41, MPO FAP 600 includes a population feature 610 consisting of a plurality of offset rows of population feature pegs 612. After routing the additional trunk cable furcation legs 6, upon which dust caps 16 are installed, into the rear of the cassette 600, the user may trap the MPO connectors 8 of the trunk cable furcation legs 6 between the population feature pegs 612, by inserting the MPO connector 8 diagonally through the open path created by the offset rows of the population feature 610 and placing the trunk furcation leg 6 on the opposite side of the peg 612 located at the rear most section of the MPO FAP 600 as shown in FIG. 40. The population feature pegs 612 may therefore temporarily lock the trunk cable furcation legs 6 in position, allowing the user to advance the cassette tray 200 to the cassette addition or replacement position described below. Because the trunk cable furcation legs 6 are locked into the population feature 610 of the MPO FAP 600, they are secured from falling out of the rear of the chassis 100 and instead are pulled forward along with the MPO FAP 600. Once the cassette 600 is in the cassette addition or replacement position the user may reach into the MPO FAP 600, remove the dust caps 16, and attach the additional trunk cable furcation legs 6 to any available MPO trunk adapters 604. The user may then add and route any additional patch cords 4 as needed, and return the MPO FAP 600 to the home position.

As discussed above with reference to FIGS. 13, 14 and 15, for example, the tray guides 102, 104, and 106 include three detents, a front detent 120, center detent 122, and rear detent 124. The cassette chassis 100 also includes forward limiting flanges 116 and rear limiting brackets 118. Each of these features interacts with features of the cassette tray 200 to facilitate movement of the cassette tray 200 between three different positions—the home position, cord move or change position, and cassette replacement or addition position. In the home position, shown in FIG. 14, the protuberance 256 of the spring protrusion 230 is disposed within the rear detent 124. Additionally, the rearmost portions of the cassette tray rail support ribs 218 abut against the rear limiting brackets 118, thereby blocking any further rearward movement of the cassette tray 200.

In the patch cord move add or change position, the protuberance 256 of the spring protrusion 230 is located within the center detent 122, as shown in FIG. 14. In order to advance the cassette tray 200 from the home position, a user applies sufficient force toward the front of the chassis 100 to cause the spring protrusion 230 to flex and allow the protuberance 256 to escape from the rear detent 124. The user then continues to apply force toward the front of the chassis 100 until the protuberance 256 reaches the center detent 122, at which point the protuberance 256 interacts with the center detent 122, stopping the forward motion of the cassette tray 200.

If the user wishes to advance the cassette tray 200 to the cassette replacement or addition position, the user applies sufficient force toward the front of the chassis 100 to cause the spring protrusion 230 to flex and allow the protuberance 256 to escape from the center detent 122. The user then continues to apply force toward the front of the chassis 100 until the protuberance 256 reaches the front detent 120. At the same time the protuberance 256 reaches the front detent 120, the cassette tray 200 also engages with the forward limiting flanges 116 to block further forward movement of the cassette tray 200. In order to move the cassette tray 200 from the cassette replacement or addition position to either the home or patch cord move add or change positions, a user applies rearward force to the cassette tray 200 until the protuberance 256 reaches the center detent 122 for the patch cord move add or change position or the rear detent 124 for the home position.

A user may install a unification clip 300 to secure two adjacent cassette trays 200 in the same chassis 100 together such that they are advanced out of and retracted into the chassis 100 at the same time. In order to install the unification clip 300, a user may first advance the cassette trays 200 to the patch cord move add or change position, as shown in FIG. 13. As shown in FIGS. 9 and 10, a user may then insert the mounting posts 302 of the unification clip 300 into the unification clip slot 252 located on each cassette tray rail 212 such that the cable management area 304 of the unification clip 300 is disposed above and between the front patch cord management loops 244 of the cassette trays 200 that are being joined together. The user may then apply downward pressure to the unification clip 300 to cause the alignment posts 308 of the unification clip 300 to engage the top of the front-most portion of the cassette tray rails 240 or 242 to secure the unification clip 300 to the cassette trays 200 as well as align the cable management area 304 of the unification clip 300 with the front patch cord management loops 244 of the cassette trays 200. The joined cassette trays 200 may then be returned to the home position as one unit.

There are two preferred methods of routing patch cables 4 as they exit the front of the chassis 100, a split routing scheme method (for example as shown in FIGS. 44 and 45) and a unidirectional routing scheme method (for example as shown in FIGS. 42 and 43). The split routing scheme method may be used when a unification clip 300 is not installed. To use the split routing scheme, a user may insert patch cords 4 into the front patch cord management loop 244 by slipping the cords through the front patch cord management loop slot 250. The patch cords 4 attached to the cassette 400 installed in the left cassette tray 200 are routed through the left-most front patch cord management loop 244, while the patch cords 4 attached to the cassette 400 installed in the right cassette tray 200 are routed through the right-most front patch cord management loop 244. This arrangement allows each cassette tray 200 to be moved between the home, cord move or change, and cassette replacement or addition positions without disturbing the patch cords 4 attached to the cassettes 400 installed in the other cassette tray 200 contained in the same row as the moving cassette tray 200.

To route the patch cables using a unidirectional routing scheme, a user first installs the unification clip 300. The user then routes the patch cords 4 by routing them to the right or left of the chassis 100. The user may then insert each patch cord 4 into the front patch cord management loops 244 and/or the cable management area 304 of the unification clip 300 as the cords 4 pass by the front patch cord management loops 244 and/or the cable management area 304. The user inserts the patch cords 4 into the front patch cable management loops 244 by slipping the cords 4 through the front patch cord management loop slot 250. The user inserts patch cords 4 into the cable management area 244 of the unification clip 300 by slipping the cables 4 into the cable management area 304 via the top opening 306 of the unification clip 300. Because the patch cables 4 are routed in the same direction for both cassette trays 200 and the cassette trays 200 are joined together with the unification clip 300, both cassette trays 200 move between the home, cord move or change, and cassette replacement or addition positions simultaneously.

The invention claimed is:

1. A method for loading a cassette into a high density enclosure, comprising:
   advancing a cassette tray to a cassette installation position inside a chassis;
   inserting a cassette into a cassette bay formed between two rails disposed on said cassette tray by placing a rear portion of said cassette on the tray so that said rear portion of said cassette is located between a front post stop area and rear post stop on each of said rails, wherein said rails include front patch cord management loops disposed on a front portion of said rails;
   tilting said cassette slightly upward so that a front portion of said cassette is higher than said rear portion of said cassette, wherein said tilting said cassette slightly upward comprises tilting said front portion of said cassette upward until said front portion of said cassette is disposed above said front patch cord management loops;
   pushing said cassette backward into said cassette bay while maintaining said tilt of said cassette until rear posts of said cassette engage with said rear post stops on said rails; and
   applying downward pressure on said front portion of said cassette until front posts of said cassette are secured in said front post stop area.

2. The method of claim 1 further comprising connecting patch cords to said cassette.

3. The method of claim 1 further comprising connecting trunk cables to said cassette prior to pushing said cassette backward into said cassette bay.

4. The method of claim 1 further comprising said cassette having local connector adapters ("LC adapters").

5. The method of claim 1 further comprising said cassette having multi-fiber push-on/pull-off adapters ("MPO adapters").

6. The method of claim 1 wherein advancing said cassette tray to said cassette installation position further comprising advancing said cassette tray until a spring protrusion disposed on the outside of one of the rails engages with a detent located on said chassis.

* * * * *